US011073102B2

(12) United States Patent
Imamura et al.

(10) Patent No.: US 11,073,102 B2
(45) Date of Patent: Jul. 27, 2021

(54) COMBUSTION CHAMBER STRUCTURE FOR ENGINES

(71) Applicant: MAZDA MOTOR CORPORATION, Hiroshima (JP)

(72) Inventors: Satoshi Imamura, Hiroshima (JP); Masaki Fukuma, Hiroshima (JP); Yasushi Nakahara, Higashihiroshima (JP); Atsushi Inoue, Aki-gun (JP); Kota Matsumoto, Aki-gun (JP); Yoshiharu Ueki, Hatsukaichi (JP); Michiharu Kawano, Hiroshima (JP); Yuya Honda, Hiroshima (JP); Kento Onishi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/618,325

(22) PCT Filed: May 31, 2018

(86) PCT No.: PCT/JP2018/020912
§ 371 (c)(1),
(2) Date: Nov. 29, 2019

(87) PCT Pub. No.: WO2018/221639
PCT Pub. Date: Dec. 6, 2018

(65) Prior Publication Data
US 2020/0378335 A1 Dec. 3, 2020

(30) Foreign Application Priority Data

Jun. 2, 2017 (JP) .............................. JP2017-109599
Jun. 2, 2017 (JP) .............................. JP2017-109601

(Continued)

(51) Int. Cl.
*F02F 1/24* (2006.01)
*F02F 1/42* (2006.01)
(Continued)

(52) U.S. Cl.
CPC ............ *F02F 1/242* (2013.01); *F02F 1/4285* (2013.01); *F02F 3/24* (2013.01); *F02F 3/26* (2013.01)

(58) Field of Classification Search
CPC .. F02F 1/242; F02F 1/4285; F02F 3/24; F02F 3/26
(Continued)

(56) References Cited

U.S. PATENT DOCUMENTS 4,709,672 A 12/1987 Ishida
4,920,937 A * 5/1990 Sasaki .................. F02F 3/26
123/305
(Continued)

FOREIGN PATENT DOCUMENTS

CN 106014667 A 10/2016
EP 0558072 A1 9/1993
(Continued)

OTHER PUBLICATIONS

Japanese Office action dated Jan. 29, 2019 for JP Application No. 2017-205150, which is related to JP Application No. 2017-205151.
(Continued)

*Primary Examiner* — Joseph J Dallo
*Assistant Examiner* — Yi-Kai Wang
(74) *Attorney, Agent, or Firm* — Studebaker & Brackett PC

(57) ABSTRACT

A structure of a combustion chamber for an engine includes a crown surface of a piston, a cylinder wall surface, a combustion chamber ceiling surface, and an ignition plug which includes an ignition portion. The crown surface of the
(Continued)

piston includes: a cavity recessed in the cylinder axis direction; a parallel surface portion which is in parallel to a corresponding region on the combustion chamber ceiling surface at a position above the cylinder axis direction with a gap, when the piston is at a compression top dead center; and an inclined surface portion formed to continue to the parallel surface portion in such a way as to be directed to the ignition plug, when the piston is at a compression top dead center. The parallel surface portion and the corresponding region, in combination, constitute a squish flow generation portion generating a squish flow when the piston is lifted.

10 Claims, 43 Drawing Sheets

(30) Foreign Application Priority Data

| Aug. 25, 2017 | (JP) | JP2017-162679 |
|---|---|---|
| Aug. 25, 2017 | (JP) | JP2017-162680 |
| Oct. 24, 2017 | (JP) | JP2017-205151 |

(51) Int. Cl.
  *F02F 3/24* (2006.01)
  *F02F 3/26* (2006.01)

(58) Field of Classification Search
  USPC .................................................. 123/307
  See application file for complete search history.

(56) References Cited

U.S. PATENT DOCUMENTS

| 5,115,774 | A | 5/1992 | Nomura et al. |
|---|---|---|---|
| 5,215,053 | A | 6/1993 | Ito |
| 5,271,362 | A | 12/1993 | Kobayashi et al. |
| 5,305,720 | A | 4/1994 | Ando et al. |
| 5,711,269 | A | 1/1998 | Oda et al. |
| 5,727,520 | A | 3/1998 | Wirth et al. |
| 5,813,385 | A | 9/1998 | Yamauchi et al. |
| 5,927,244 | A | 7/1999 | Yamauchi et al. |
| 5,960,767 | A | 10/1999 | Akimoto et al. |
| RE36,500 | E | 1/2000 | Ando et al. |
| 6,009,849 | A | 1/2000 | Yamamoto et al. |
| 6,035,824 | A | 3/2000 | Lee |
| 6,125,103 | A | 9/2000 | Bäuml et al. |
| 6,378,490 | B1 | 4/2002 | Ottowitz et al. |
| 6,460,509 | B1 | 10/2002 | Muramatsu et al. |
| 6,725,828 | B1 | 4/2004 | Han et al. |
| 10,570,808 | B2 | 2/2020 | Fukuda et al. |
| 2002/0073956 | A1 | 6/2002 | Suzuki et al. |
| 2005/0109328 | A1 | 5/2005 | Sakai et al. |
| 2008/0276900 | A1 | 11/2008 | Umierski et al. |
| 2010/0000493 | A1* | 1/2010 | Nishimoto ............... F02F 3/26 123/261 |
| 2010/0006061 | A1* | 1/2010 | Shibata ............... F02B 23/0696 123/307 |
| 2010/0175660 | A1 | 7/2010 | Nishimoto et al. |
| 2012/0234285 | A1 | 9/2012 | Venugopal et al. |
| 2013/0092116 | A1* | 4/2013 | Teshima ............... F02B 23/104 123/193.4 |
| 2015/0007802 | A1 | 1/2015 | Imafuku |
| 2015/0308371 | A1 | 10/2015 | Eismark |
| 2016/0186687 | A1 | 6/2016 | Minooka |
| 2016/0201551 | A1 | 7/2016 | Uchida et al. |
| 2016/0281663 | A1 | 9/2016 | Sasaki et al. |
| 2016/0319729 | A1 | 11/2016 | Sakai |
| 2017/0009698 | A1 | 1/2017 | Tsugawa et al. |
| 2017/0082058 | A1 | 3/2017 | Katakura et al. |
| 2017/0356330 | A1 | 12/2017 | Narahara et al. |
| 2018/0258884 | A1 | 9/2018 | Hikita et al. |
| 2018/0340488 | A1 | 11/2018 | Fukuda et al. |
| 2020/0141306 | A1 | 5/2020 | Imamura et al. |
| 2020/0166003 | A1 | 5/2020 | Imamura et al. |
| 2020/0232380 | A1 | 7/2020 | Kim et al. |

FOREIGN PATENT DOCUMENTS

| EP | 1 069 291 | A2 | 1/2001 |
|---|---|---|---|
| EP | 1533491 | A1 | 5/2005 |
| JP | H04-107485 | U | 9/1992 |
| JP | H09-280055 | A | 10/1997 |
| JP | H10-115223 | A | 5/1998 |
| JP | H10-131756 | A | 5/1998 |
| JP | H10-131757 | A | 5/1998 |
| JP | H10-131758 | A | 5/1998 |
| JP | H11-107759 | A | 4/1999 |
| JP | H11-182248 | A | 7/1999 |
| JP | 2001-159315 | A | 6/2001 |
| JP | 2003-214167 | A | 7/2003 |
| JP | 2003-322021 | A | 11/2003 |
| JP | 2004-232583 | A | 8/2004 |
| JP | 2004-324532 | A | 11/2004 |
| JP | 2005-171879 | A | 6/2005 |
| JP | 2006-322334 | A | 11/2006 |
| JP | 2014-047645 | A | 3/2014 |
| JP | 2015-001166 | A | 1/2015 |
| JP | 2016-094925 | A | 5/2016 |
| JP | 2016-121630 | A | 7/2016 |
| JP | 2017-061907 | A | 3/2017 |
| WO | 2014/096956 | A1 | 6/2014 |
| WO | 2015/097514 | A1 | 7/2015 |

OTHER PUBLICATIONS

Japanese Office action dated Jan. 29, 2019 for JP Application No. 2017-205151.
Japanese Office action dated Jan. 29, 2019 for JP Application No. 2017-205153, which is related to JP Application No. 2017-205151.
Japanese Office action dated Jan. 29, 2019 for JP Application No. 2017-205154, which is related to JP Application No. 2017-205151.
Japanese Office action dated Jul. 2, 2019 for JP Application No. 2017-205151.
International Search Report dated Aug. 28, 2018 and issued in PCT/JP2018/019593, which is related to PCT/JP2018/020912.
The extended European search report issued by the European Patent Office dated Jan. 14, 2020, which corresponds to European Patent Application No. 18808949.4-1004 and is related to U.S. Appl. No. 16/618,325.
The extended European search report issued by the European Patent Office dated Jan. 14, 2020, which corresponds to European Patent Application No. 18809373.6-1004 and is related to U.S. Appl. No. 16/618,325.
Communication pursuant to Article 94(3) EPC issued by the European Patent Office dated Sep. 25, 2020, which corresponds to European Patent Application No. 18 809 373.6-1004 and is related to U.S. Appl. No. 16/618,325.
Extended European Search Report issued in EP 18 809 644.0 by the European Patent Office dated Jun. 9, 2020, which is related to U.S. Appl. No. 16/618,325.
An Office Action issued by the United States Patent and Trademark Office dated Nov. 5, 2020, which corresponds to U.S. Appl. No. 16/618,321 and is related to U.S. Appl. No. 16/618,325.
The extended European search report issued by the European Patent Office dated Feb. 5, 2020, which corresponds to European Patent Application No. 18809101.1-1004 and is related to U.S. Appl. No. 16/618,325.
Communication pursuant to Article 94(3) EPC issued by the European Patent Office dated Dec. 7, 2020, which corresponds to European Patent Application No. 18 809 101.1-1004 and is related to U.S. Appl. No. 16/618,325.
An Office Action mailed by China National Intellectual Property Administration dated Jan. 4, 2021, which corresponds to Chinese Patent Application No. 201880035100.4 and is related to U.S. Appl. No. 16/618,325; with English language summary.

(56) References Cited

OTHER PUBLICATIONS

An Office Action issued by the United States Patent and Trademark Office dated Nov. 27, 2020, which corresponds to U.S. Appl. No. 16/618,074 and is related to U.S. Appl. No. 16/618,325.
An Office Action issued by the United States Patent and Trademark Office dated Nov. 30, 2020, which corresponds U.S. Appl. No. 16/618,041 and is related to U.S. Appl. No. 16/618,325.

\* cited by examiner

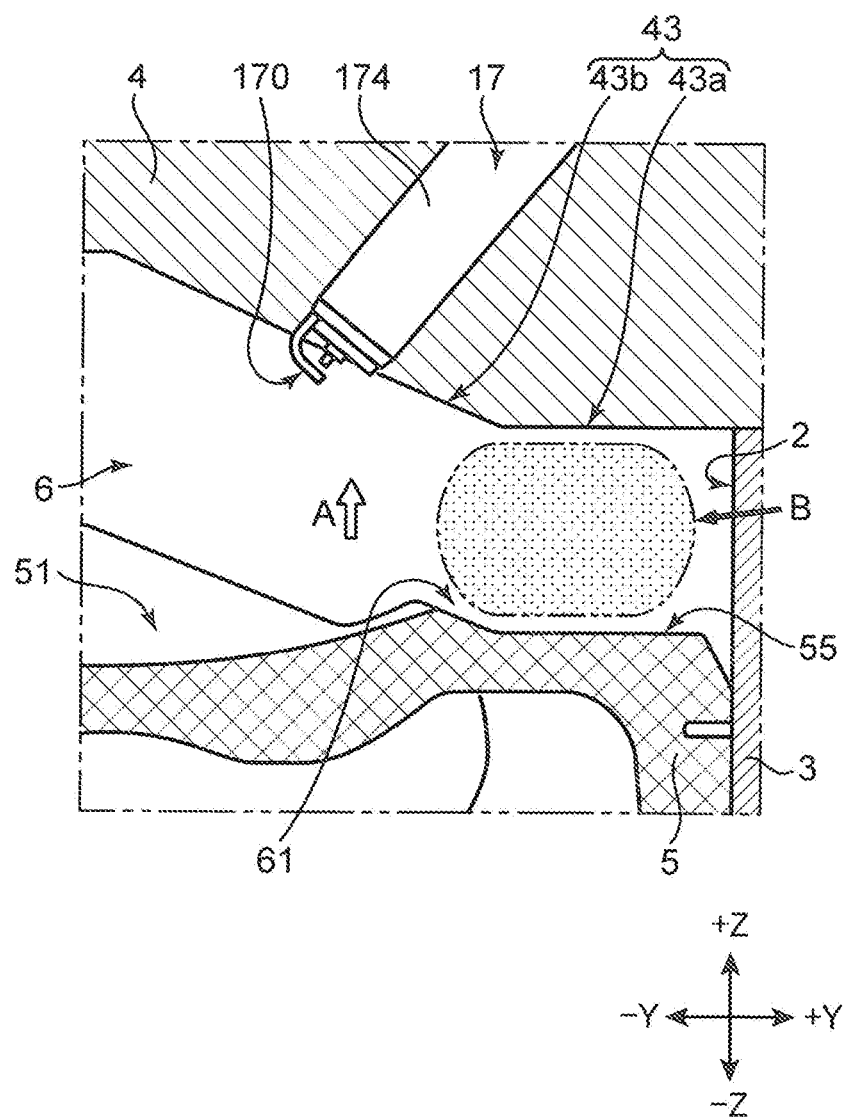

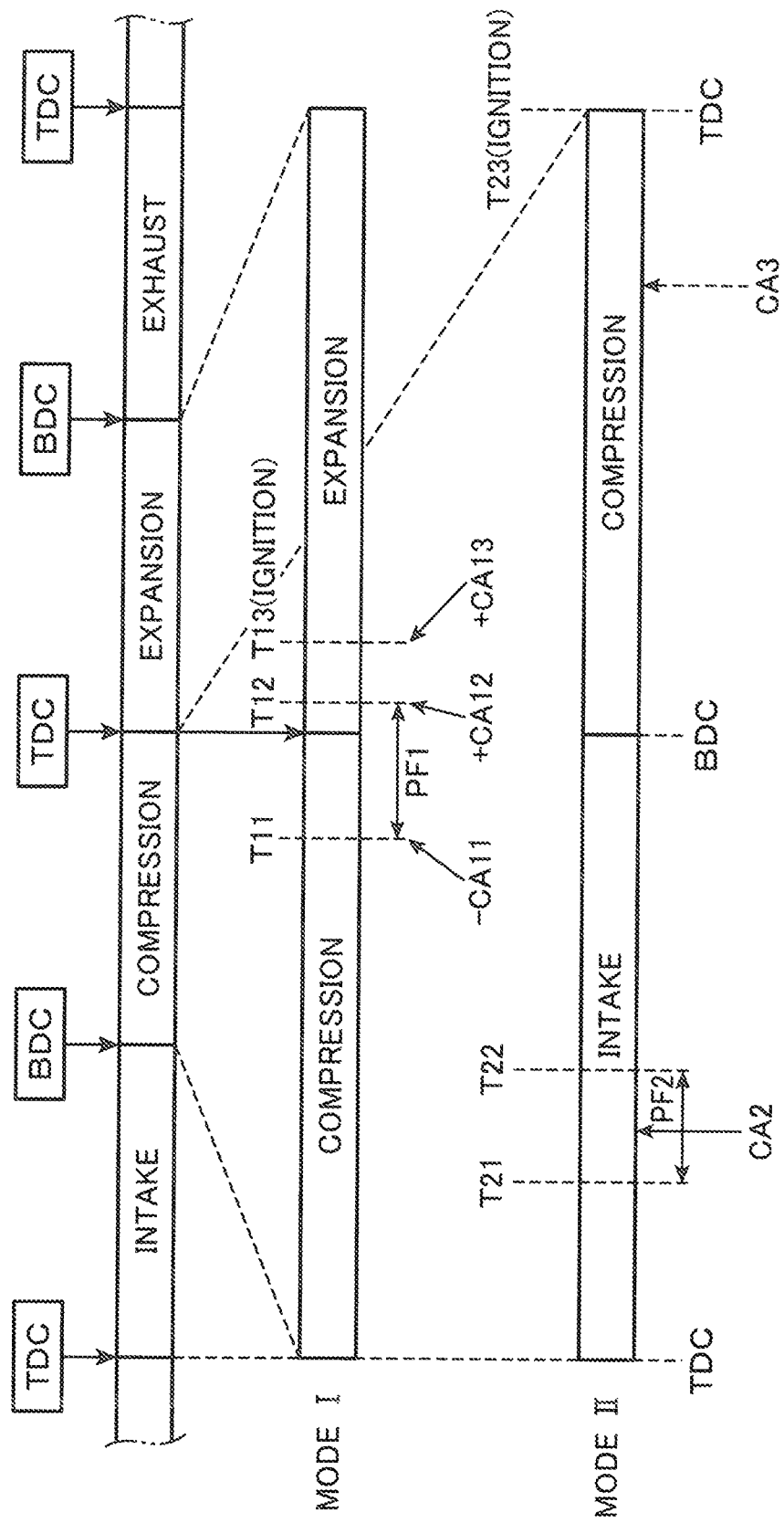

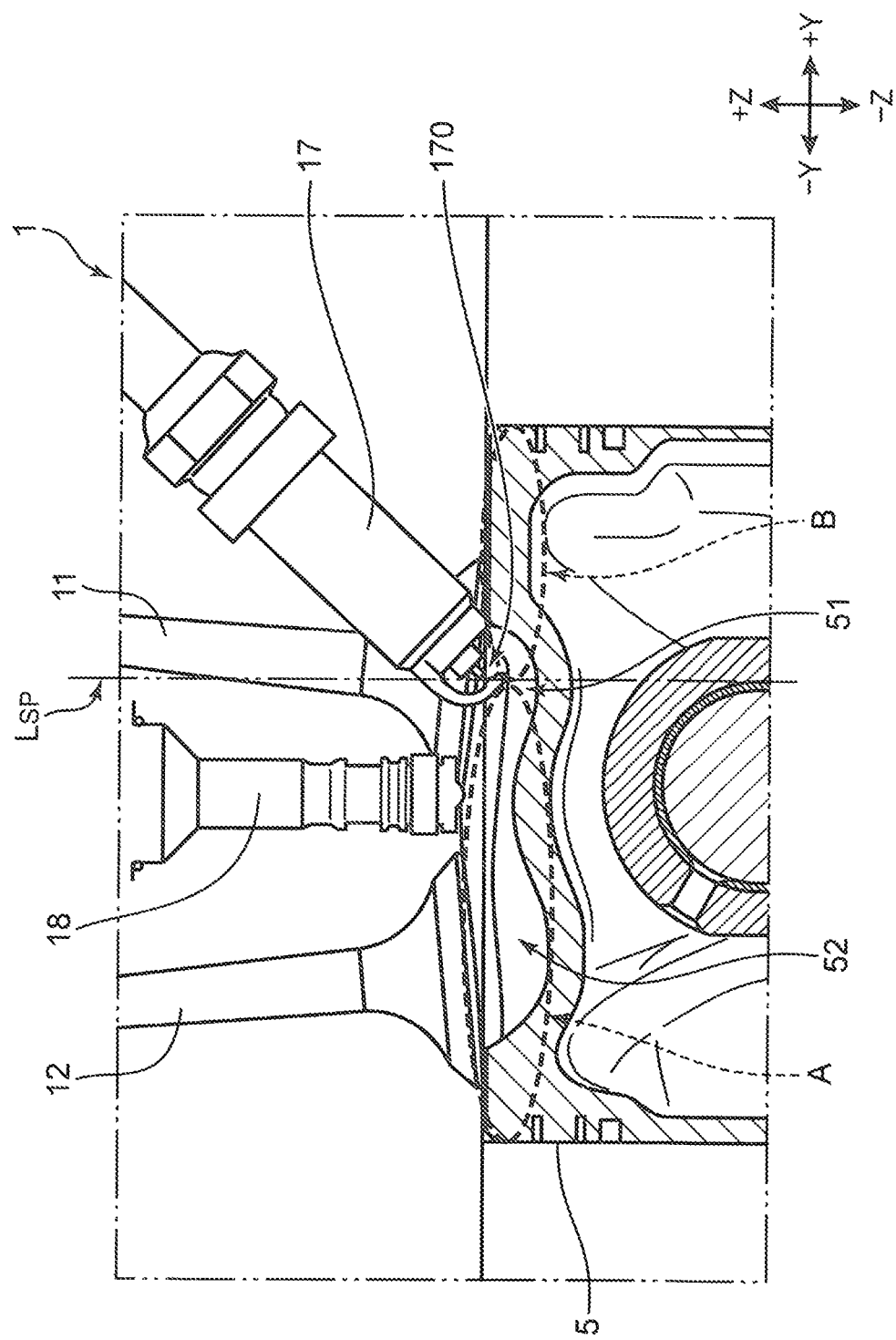

COMBUSTION CHAMBER STRUCTURE FOR ENGINES

TECHNICAL FIELD

The present invention relates to a structure of a combustion chamber for a spark ignited engine.

BACKGROUND ART

In a spark ignited engine for a vehicle such as an automobile, a configuration is employed in which fuel is injected from an injector into a combustion chamber, and an air-fuel mixture acquired by atomizing fuel is generated by introducing air and the like from an intake opening, and the air-fuel mixture is ignited using an ignition plug.

Patent Literature 1 discloses an engine in which fuel is injected when a piston is in the vicinity of a compression top dead center, and ignition (spark ignition) is performed by an ignition plug. Furthermore, in the engine of Patent Literature 1, a cavity is formed in a crown surface of the piston.

In this way, a spark ignited engine, by forming a cavity in a crown surface of a piston, it is easy to secure a migration distance of fuel for atomizing fuel injected from an injector, and it is possible to perform sufficient atomization before ignition is performed.

However, in a conventional art including the art disclosed in Patent Literature 1, residual gas, which has not been expelled in an exhaust stroke preceding a compression stroke, may remain in the vicinity of a combustion chamber ceiling surface. In a state that residual gas remains in the vicinity of a combustion chamber ceiling surface as described above, ignitability of an ignition plug may be adversely affected.

CITATION LIST

Patent Literature

Patent Literature 1: Japanese Unexamined Patent Application Publication No. 2017-61907

SUMMARY OF INVENTION

In view of the above problem, an object of the present invention is to provide a structure of a combustion chamber for an engine, which is able to securely perform a scavenging operation in the vicinity of a combustion chamber ceiling surface, and to secure high ignitability of air-fuel mixture.

The present invention is directed to a structure of a combustion chamber for a spark ignited engine. The structure of a combustion chamber includes: a crown surface of a piston; a cylinder wall surface along which the piston is slidingly movable; a combustion chamber ceiling surface formed on a cylinder head; and an ignition plug, which is mounted on the combustion chamber ceiling surface, includes an ignition portion disposed in such a way as to face the combustion chamber, and is configured to ignite at a predetermined timing, when the piston is at a compression top dead center or in the vicinity thereof. The crown surface of the piston includes: a cavity which is recessed in a cylinder axis direction in a region including a position below the ignition portion of the ignition plug in a plan view in the cylinder axis direction; a parallel surface portion, which is formed on a part of an outer peripheral portion surrounding the cavity in a plan view in the cylinder axis direction, and is parallel to a corresponding region with a gap when the piston is at a compression top dead center, the corresponding region including a position above the cylinder axis direction on the combustion chamber ceiling surface; and an inclined surface portion, which is formed, in a region between the parallel surface portion and a rim of the cavity in a plan view in the cylinder axis direction, to continue to the parallel surface portion in such a way as to be directed to the ignition portion of the ignition plug when the piston is at a compression top dead center. A combination of the parallel surface portion and the corresponding region constitutes a squish flow generation portion which generates a squish flow when the piston is lifted.

BRIEF DESCRIPTION OF DRAWINGS

FIG. 13A is a schematic cross-sectional view illustrating a part of the combustion chamber, when the piston is lifted in a first half of a compression stroke.

FIG. 22 is a time chart illustrating a relationship between a fuel injection period and an ignition timing, and a crank angle.

FIG. 23 is a cross-sectional view illustrating the combustion chamber in a state that the piston is in the vicinity of a compression top dead center.

DESCRIPTION OF EMBODIMENTS

In the following, embodiments of the present invention are described with reference to the drawings. The embodiments described in the following are one aspect according to the present invention. The present invention is not limited by the following embodiments except for an essential configuration thereof.

First Embodiment

1. Overall Configuration of Engine

Figure 1:
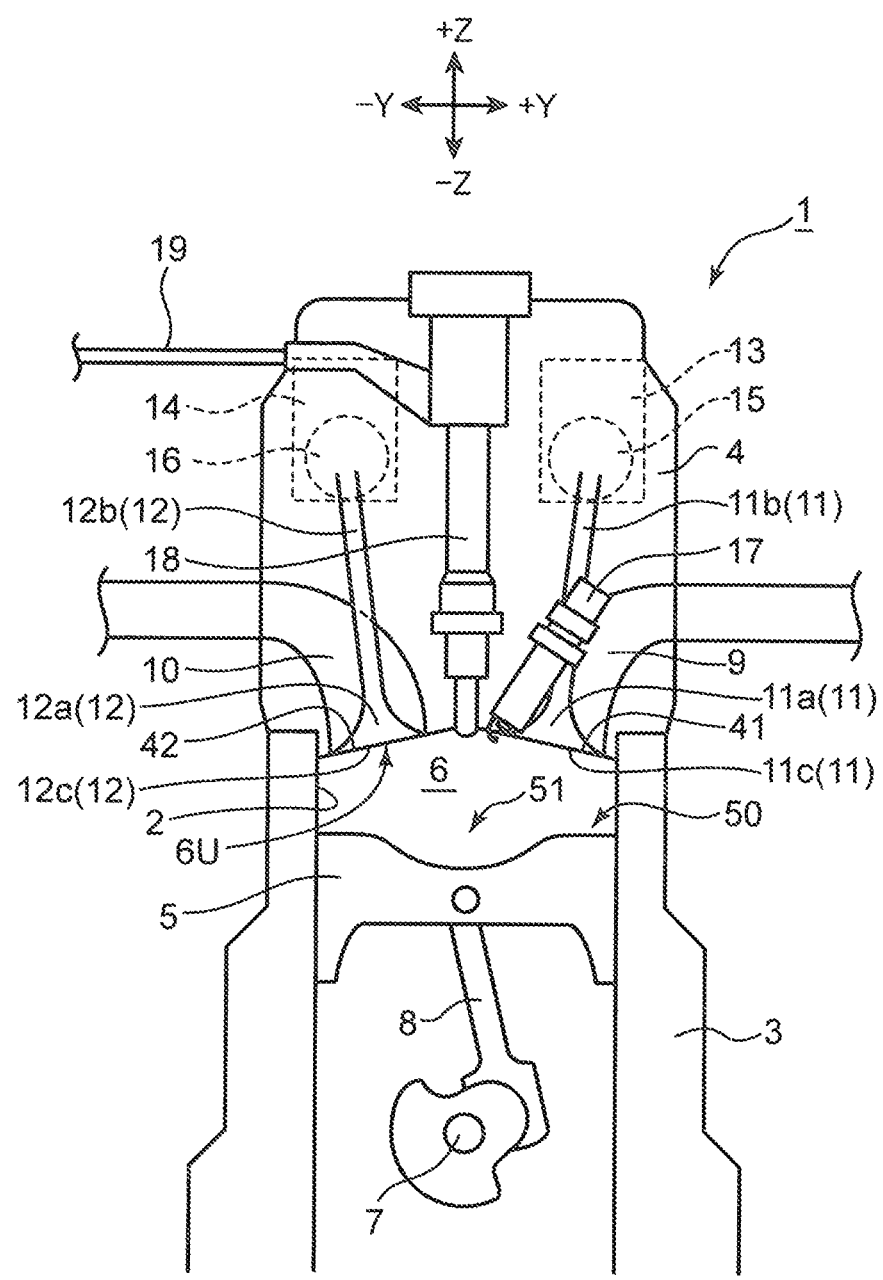
FIG. 1 is a schematic cross-sectional view, in a cylinder axis direction, illustrating an engine to which a structure of a combustion chamber for an engine according to a first embodiment is applied.
Figure 2:
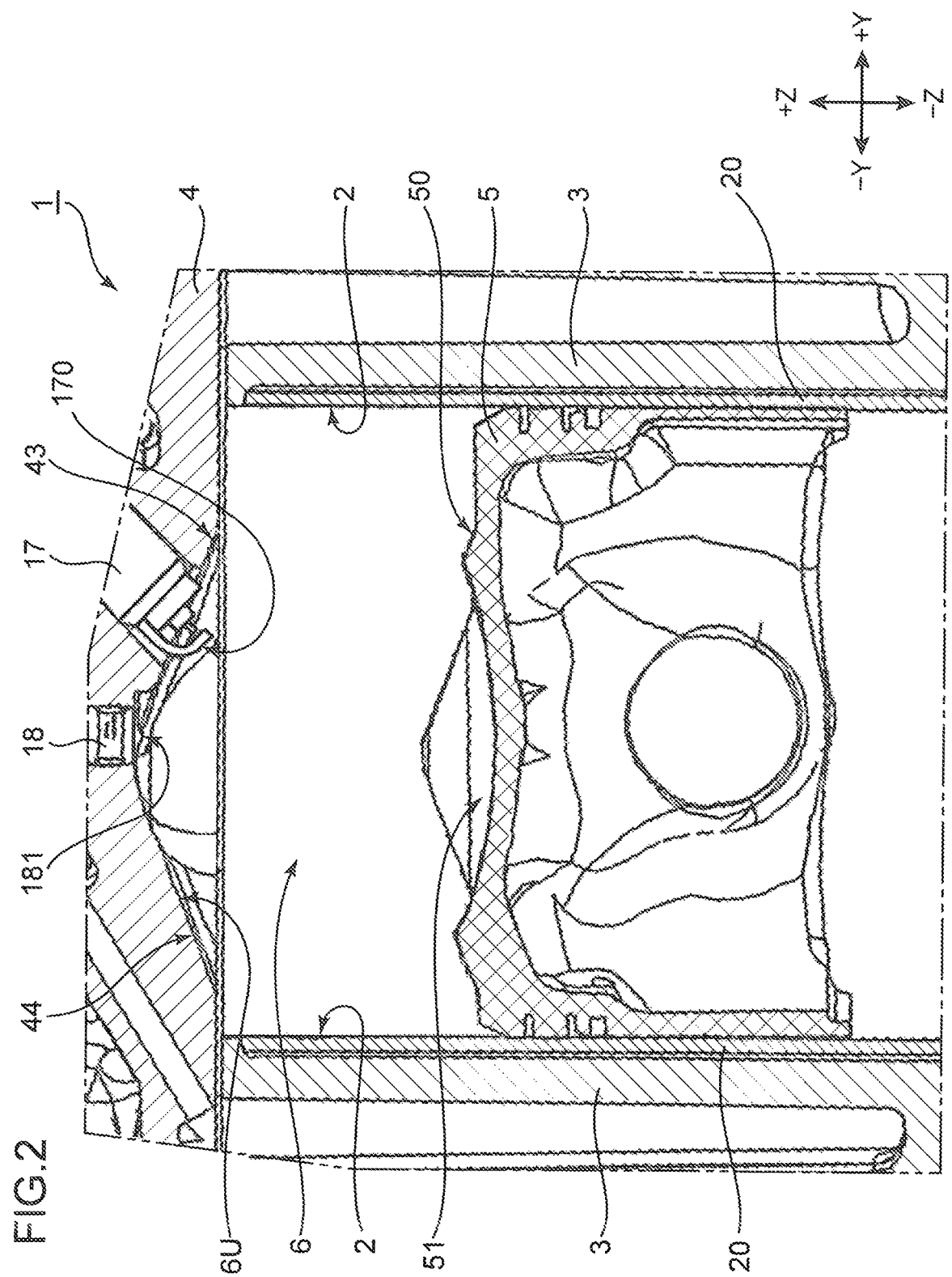
FIG. 2 is a schematic cross-sectional view of essential parts illustrating the structure of a combustion chamber for the engine.
Figure 3:
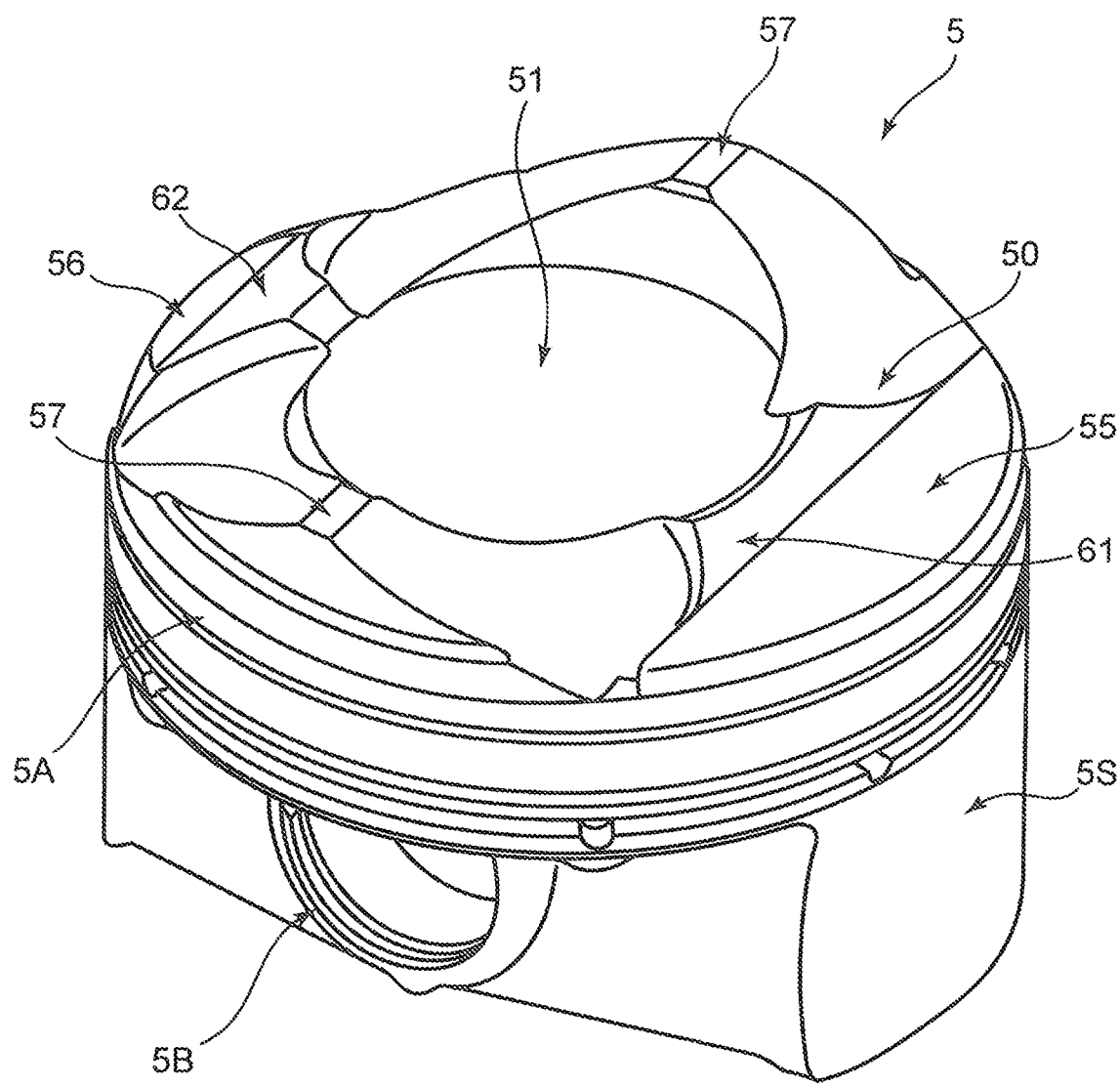
FIG. 3 is a schematic perspective view of a piston in the engine.

A structure of a combustion chamber for a spark ignited engine according to a first embodiment is described with reference to FIGS. 1 and 2. FIG. 1 is a schematic cross-sectional view illustrating an engine to which the structure of the combustion chamber for the engine according to the first embodiment is applied. FIG. 2 is a cross-sectional view of essential parts illustrating the structure of the combustion chamber for the engine, which is illustrated in FIG. 1. In FIGS. 1, 2, and 3 and thereafter, XYZ directions are indicated. The Z-direction is a cylinder axis direction, the X-direction is an extending direction of a crankshaft (engine output axis direction), and the Y-direction is a direction orthogonal to both the Z-direction and the X-direction.

The engine according to the present embodiment is a multi-cylinder engine including cylinders and pistons, and mounted in a vehicle, as a power source for driving a vehicle such as an automobile. The engine includes an engine body 1, and intake and exhaust manifolds and various pumps incorporated in the engine body 1 (illustration of accessories such as intake and exhaust manifolds and various pumps is omitted). Fuel to be supplied to the engine body 1 contains gasoline as a main component.

As illustrated in FIG. 1, the engine body 1 includes a cylinder block 3, a cylinder head 4, and pistons 5. The cylinder block 3 includes a plurality of cylinders (cylinders 2) arranged in the X direction (only one cylinder is illustrated in FIG. 1). In the engine body 1 according to the present embodiment, a cylinder wall surface, specifically, an inner wall surface of the cylinder 2 is formed by a cylinder liner 20 fitted into the inside of the cylinder block 3. In the following description, an inner wall surface of the cylinder 2 may be referred to as the cylinder wall surface 2.

The cylinder head 4 is mounted on the cylinder block 3, and closes an upper opening of a cylinder. The piston 5 is accommodated within each of the cylinders in such a way that the piston 5 can slidingly reciprocate. The pistons 5 are connected to a crankshaft 7 via a connecting rod 8.

A combustion chamber 6 is formed at an upper position with respect to a crown surface 50 of the piston 5 on the +Z side. A combustion chamber ceiling surface 6U of the combustion chamber 6 is constituted by a top surface portion including an intake-side top portion 43 and an exhaust-side top surface portion 44 of the cylinder head 4.

An intake port 9 and an exhaust port 10 communicating with the combustion chamber 6 are formed in the cylinder head 4. An intake opening 41 serving as a downstream end of the intake port 9, and an exhaust opening 42 serving as an upstream end of the exhaust port 10 are formed in the combustion chamber ceiling surface 6U. An intake valve 11 which opens and closes the intake opening 41, and an exhaust valve 12 which opens and closes the exhaust opening 42 are mounted in the cylinder head 4.

The engine body 1 according to the present embodiment is a double overhead camshaft (DOHC) engine. Two intake openings 41 and two exhaust openings 42 are formed in each of the cylinders 2, and two intake valves 11 and two exhaust valves 12 are provided for each of the cylinders 2.

The intake valve 11 and the exhaust valve 12 are so-called poppet valves. The intake valve 11 includes an umbrella-shaped valve body 11a opening and closing the intake opening 41, and a stem 11b extending perpendicularly from the valve body 11a. Likewise, the exhaust valve 12 includes an umbrella-shaped valve body 12a opening and closing the exhaust opening 42, and a stem 12b extending perpendicularly from the valve body 12a. The valve body 11a of the intake valve 11 includes a valve surface 11c facing the combustion chamber 6. The valve body 12a of the exhaust valve 12 includes a valve surface 12c facing the combustion chamber 6.

The combustion chamber ceiling surface 6U in the engine body 1 has a pent-roof shape (flat pent-roof shape), which is slightly projected upwardly (toward the +Z side).

In the present embodiment, a combustion chamber wall surface which defines the combustion chamber 6 is constituted by the cylinder wall surface 2, the crown surface 50 of the piston 5, the combustion chamber ceiling surface 6U being a bottom surface (surface on the −Z side) of the cylinder head 4, the valve surface 11c of the intake valve 11, and the valve surface 12c of the exhaust valve 12. Specifically, the cylinder block 3, the cylinder head 4, the piston 5, the intake valve 11, and the exhaust valve 12 are combustion chamber constituent members constituting the combustion chamber 6.

An intake-side valve mechanism 13 driving the intake valve 11, and an exhaust-side valve mechanism 14 driving the exhaust valve 12 are disposed in the cylinder head 4. The intake valve 11 and the exhaust valve 12 are driven in association with rotation of the crankshaft 7 by the valve mechanisms 13 and 14. By driving of the intake valve 11 and the exhaust valve 12, the valve body 11a of the intake valve 11 opens and closes the intake opening 41, and the valve body 12a of the exhaust valve 12 opens and closes the exhaust opening 42.

An intake-side variable valve timing mechanism (intake-side VVT) 15 is incorporated in the intake-side valve mechanism 13. In addition, an exhaust-side variable valve timing mechanism (exhaust-side VVT) 16 is incorporated in the exhaust side valve mechanism 14. The intake-side VVT 15 is an electrically operated VVT provided for an intake camshaft, and the exhaust-side VVT 16 is an electrically operated VVT provided for an exhaust camshaft. And, the intake-side VVT 15 changes an opening/closing timing of the intake valve 11 by sequentially changing a rotational phase of the intake camshaft with respect to the crankshaft 7 within a predetermined angle range, and the exhaust-side VVT 16 changes an opening/closing timing of the exhaust valve 12 by sequentially changing a rotational phase of the exhaust camshaft with respect to the crankshaft 7 within a predetermined angle range.

An ignition plug 17 is mounted on the intake-side top surface portion 43 of the cylinder head 4, and an ignition portion 170 of the ignition plug 17 is disposed in such a way as to face the combustion chamber 6 through the combustion chamber ceiling surface 6U. The ignition plug 17 discharges sparks from the ignition portion 170 in response to electric power supply from an ignition circuit (not illustrated) to ignite an air-fuel mixture within the combustion chamber 6.

In addition, an injector (fuel injection valve) 18 is mounted on the cylinder head 4 at a portion associated with a top portion of the combustion chamber ceiling surface 6U, and injection holes 181 of the injector 18 are formed in such a way as to face the combustion chamber 6 through the combustion chamber ceiling surface 6U. A fuel supply pipe 19 communicating with a high-pressure fuel pump (illustration of the high-pressure fuel pump is omitted) is connected to the injector 18. A common rail (not illustrated) for accumulating a pressure among all the cylinders of the engine body 1 is provided between the high-pressure fuel pump and the fuel supply pipe 19. In this configuration, fuel of a high pressure is injected from the injection holes 181 of the injector 18 into the combustion chamber 6.

A cavity 51 recessed toward the −Z side is formed in the crown surface 50 of the piston 5. A configuration of the piston 5 including the cavity 51 is described in the following.

2. Configuration of Piston 5

Figure 4:
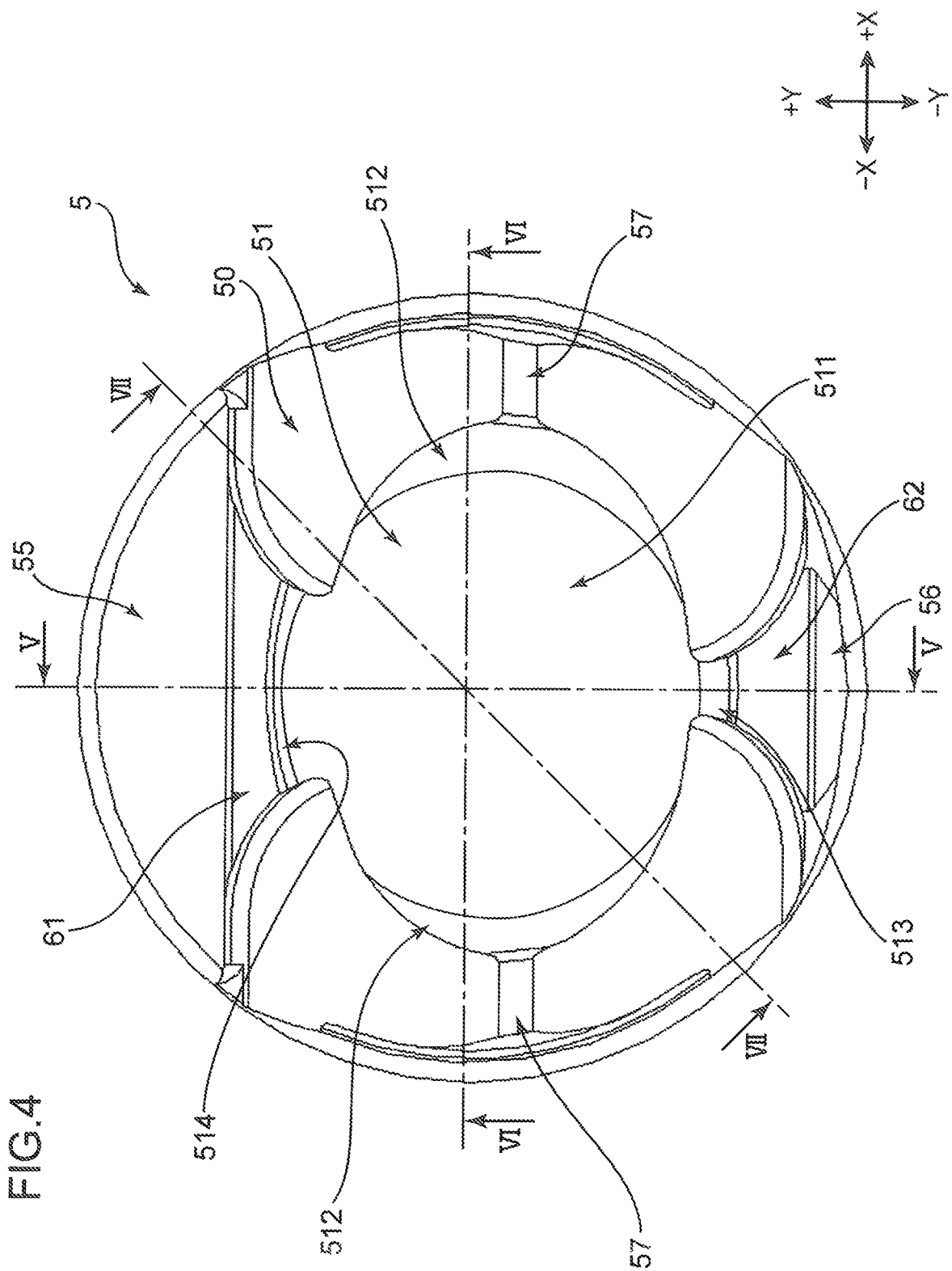
FIG. 4 is a schematic plan view of a crown surface of the piston.
Figure 5:
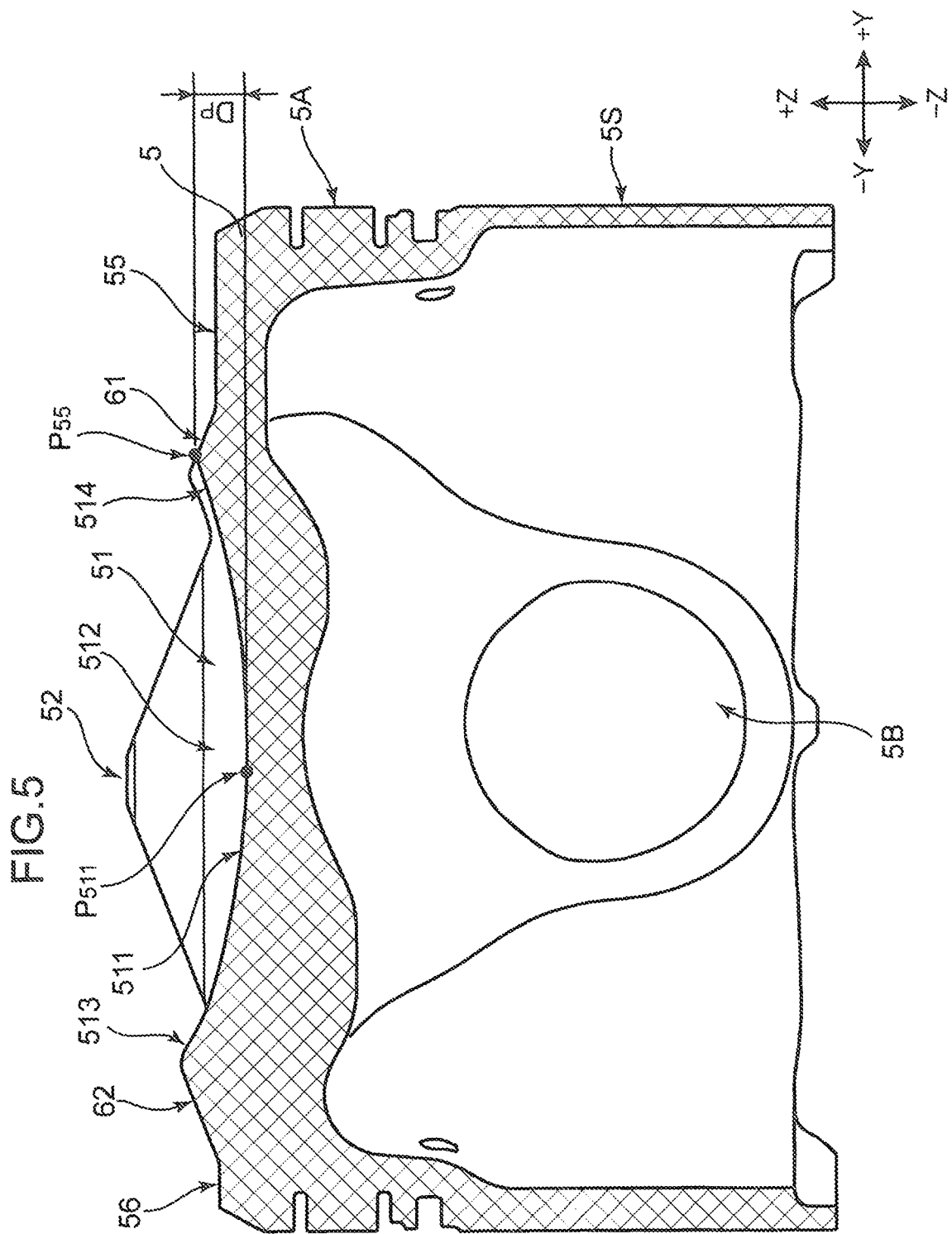
FIG. 5 is a schematic cross-sectional view of the piston (a cross-sectional view taken along the line V-V in FIG. 4).
Figure 6:
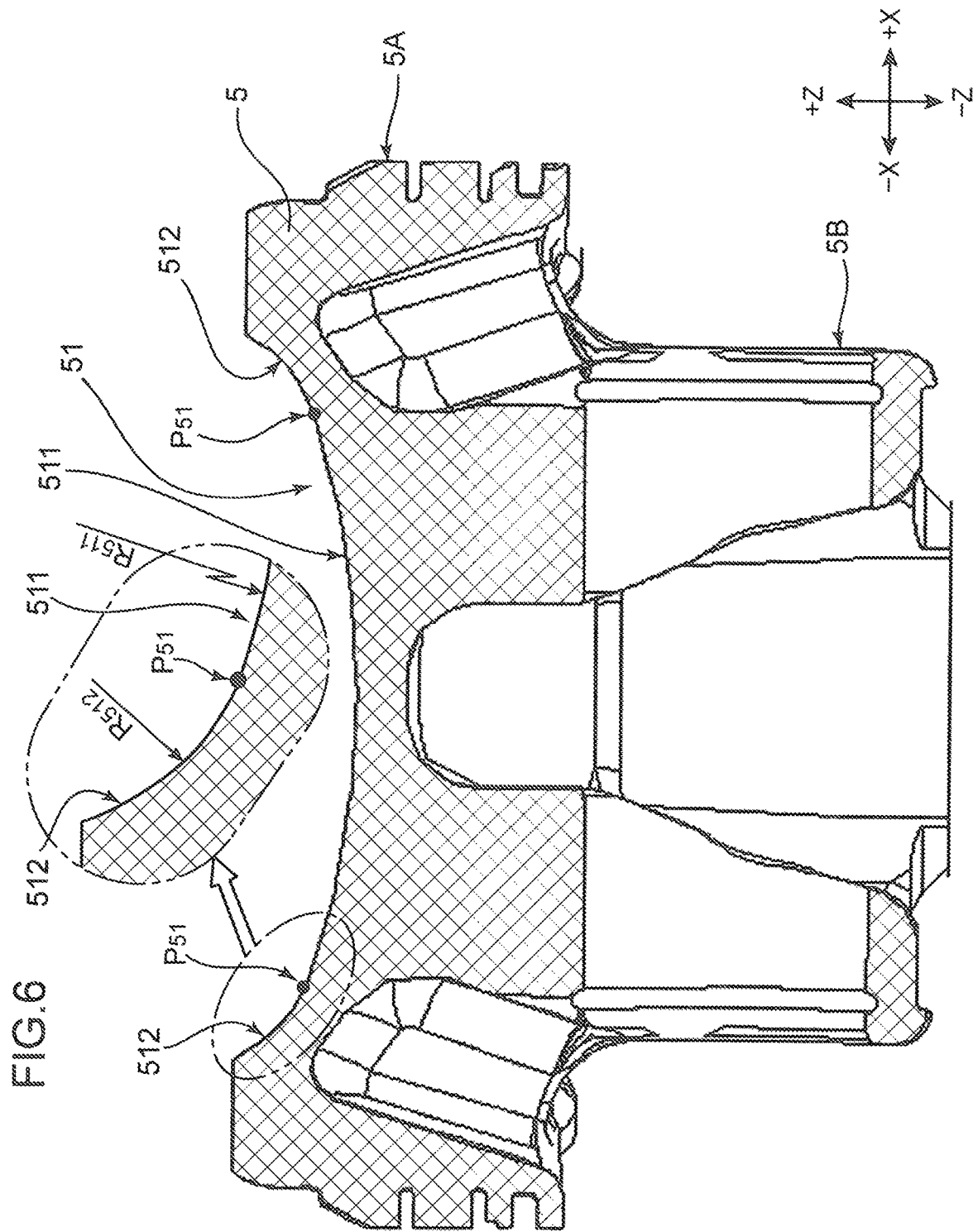
FIG. 6 is a schematic cross-sectional view of the piston (a cross sectional view taken along the line VI-VI in FIG. 4).
Figure 7:
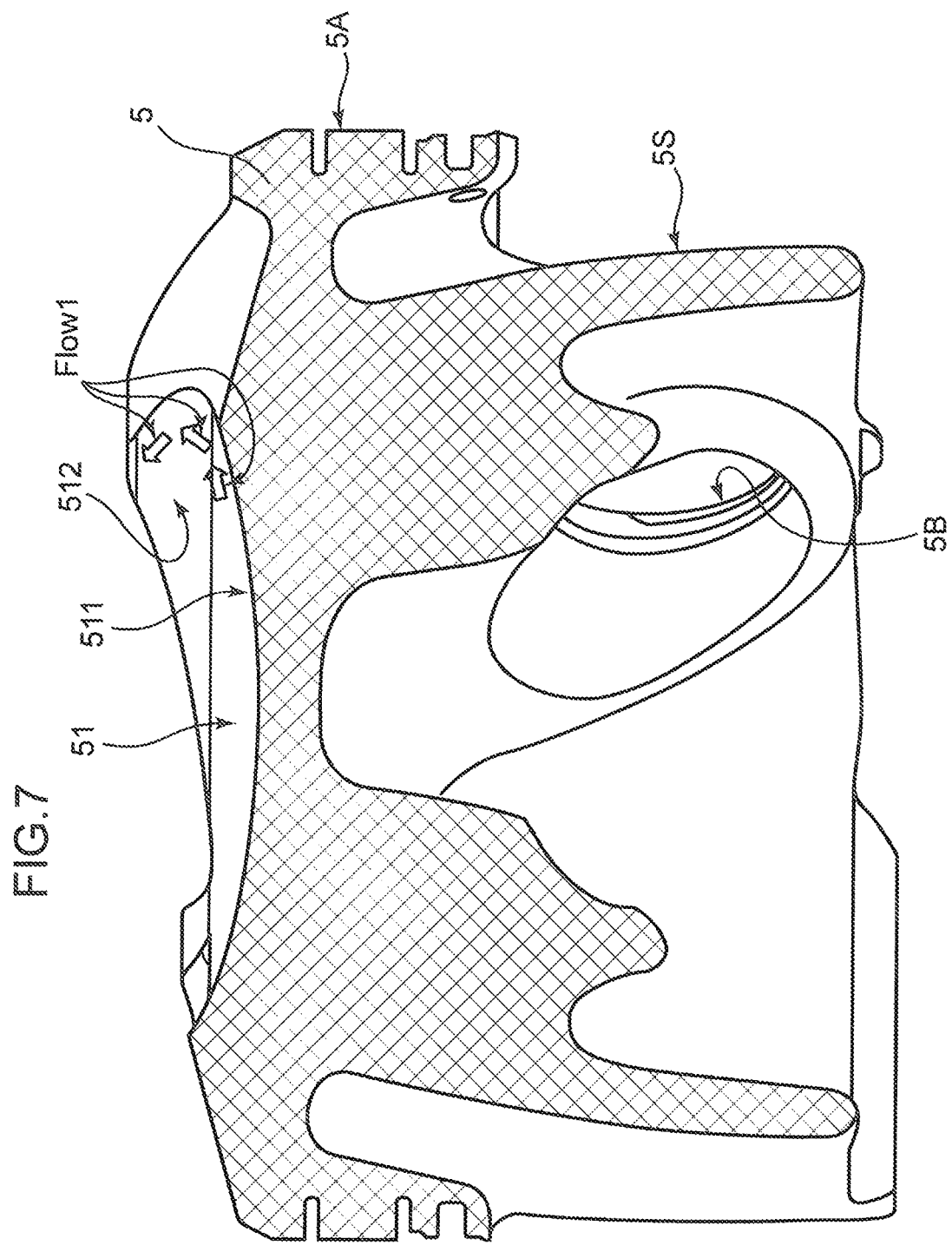
FIG. 7 is a schematic cross-sectional view of the piston (a cross sectional view taken along the line VII-VII in FIG. 4).

A configuration of the piston 5 is described with reference to FIGS. 3 to 7. FIG. 3 is a schematic perspective view illustrating a configuration of the piston 5. FIG. 4 is a schematic plan view illustrating a configuration of the crown surface 50 of the piston 5. FIGS. 5 to 7 are schematic cross-sectional views illustrating the configuration of the crown surface 50 of the piston 5.

As illustrated in FIG. 3, the piston 5 includes a piston head portion 5A, and a piston skirt portion 5S connected to the lower side (−Z side) of the piston head portion 5A. The piston head portion 5A has a circular columnar shape. The piston head portion 5A includes the crown surface 50 which constitutes a part (bottom portion) of a wall surface of the combustion chamber 6 on a top surface (a surface on the +Z side) thereof, and a peripheral surface which slidingly contacts with the cylinder wall surface 2.

The piston skirt portion 5S is a portion which is disposed on the +Y side and the −Y side of the piston head portion 5A, and suppresses swing motion of the piston head portion 5A, when the piston 5 reciprocates.

A piston boss portion 5B which defines a pinhole extending in the X-direction is formed below (on the −Z side) the piston head portion 5A. A piston pin is inserted into the pinhole of the piston boss portion 5B.

The crown surface 50 of the piston 5 is a surface opposed to the combustion chamber ceiling surface 6U in the Z-direction, and includes a cup-shaped cavity 51 in a substantially middle portion in a radial direction (X-direction and Y-direction) thereof. The cavity 51 is a portion recessed toward the −Z side, and is a portion receiving fuel injection from the injector 18.

An upper projection portion 57, an intake-side flat portion 55, an exhaust-side flat portion 56, an intake-side slope portion 61, and an exhaust-side slope portion 62 are formed on the outer periphery of the crown surface 50 surrounding the cavity 51 in a plan view from the +Z side. The upper projection portion 57 is formed on the outer peripheral portion on the −X side and on the +X side with respect to the cavity 51, and is a portion projected into a frustum shape toward the +Z side.

The intake-side flat portion (corresponding to the "parallel surface portion") 55 is formed on the outer peripheral portion on the +Y side with respect to the cavity 51, and the exhaust-side flat portion 56 is formed on the outer peripheral portion on the −Y side with respect to the cavity 51. The piston 5 according to the present embodiment is configured in such a way that an area of the intake-side flat portion 55 is larger than an area of the exhaust-side flat portion 56. In this way, by setting an area of the intake-side flat portion 55 larger than an area of the exhaust-side flat portion 56, a squish flow, which is generated in a portion between the intake-side flat portion 55 and the intake-side top surface portion 43 when the piston 5 is in a compression stroke, becomes relatively larger than a squish flow, which is generated in a portion between the exhaust-side flat portion 56 and the exhaust-side top surface portion 44, which makes it possible to enhance a scavenging effect of residual gas.

In the engine body 1 according to the present embodiment, the intake-side flat portion 55, and a corresponding region, on the combustion chamber ceiling surface 6U, which is opposed to the intake-side flat portion 55 on the +Z side, are disposed to be opposed to each other with a gap (see FIG. 2). A squish flow generation portion is formed by combination of the intake-side flat portion 55 and the corresponding region on the combustion chamber ceiling surface 6U. This will be described later.

The intake-side slope portion (corresponding to the "inclined surface portion") 61 is formed in a region between the cavity 51 and the intake-side flat portion 55, and is raised toward the +Z side, as extending from the +Y side toward the −Y side.

In the engine body 1 according to the present embodiment, the intake-side slope portion 61, and a corresponding inclined region, on the combustion chamber ceiling surface 6U, which is opposed to the intake-side slope portion 61 on the +Z side, are disposed to be opposed to each other with a gap (see FIG. 1). A second squish flow generation portion is formed by combination of the intake-side slope portion 61 and the corresponding inclined region on the combustion chamber ceiling surface 6U. This will also be described later.

The exhaust-side slope portion 62 is formed in a region between the cavity 51 and the exhaust-side flat portion 56, and is raised toward the +Z side, as extending from the −Y side toward the +Y side.

As illustrated in FIG. 4, the cavity 51 includes lateral upright portions 512, an exhaust-side upright portion 513, an intake-side upright portion 514, and a bottom surface portion 511. Among these, the lateral upright portions 512, the exhaust-side upright portion 513, and the intake-side upright portion 514 are formed on a rim portion of the cavity 51 in a plan view of the crown surface 50 of the piston 5. On the other hand, the bottom surface portion 511 is formed in an inner region of the cavity 51.

As illustrated in FIG. 5, in the cavity 51, each of the bottom surface portion 511, the exhaust-side upright portion 513, and the intake-side upright portion 514 is formed of a curved surface. And, each of the exhaust-side upright portion 513 and the intake-side upright portion 514 is raised in the Z-direction with respect to the bottom surface portion 511, and comes into contact with the bottom surface portion 511 at a boundary portion.

The intake-side flat portion (parallel surface portion) 55 is formed in a region on the +Y side of an outer peripheral portion surrounding the cavity 51, on the crown surface 50 of the piston 5. And, the intake-side slope portion (inclined surface portion) 61 is formed in a portion between a rim of the cavity 51 and the intake-side flat portion 55 in the Y-direction. The intake-side slope portion 61 is an inclined surface portion, which is formed to be raised toward the +Z side, as extending from the +Y side toward the −Y side. The intake-side slope portion 61 is continued to the intake-side flat portion 55 on the +Y side, and is continued to the intake-side upright portion 514 of the cavity 51 on an inclined top portion P55 on the −Y side.

As illustrated in FIG. 5, a bottom portion P511 of the cavity 51 is disposed at a depth DP on the −Z side with respect to the inclined top portion P55. In the engine body 1 according to the present embodiment, the bottom portion P511 is disposed on the −Z side with respect to the intake-side flat portion 55.

Likewise, the exhaust-side flat portion 56 is formed in a region on the −Y side of an outer peripheral portion surrounding the cavity 51, on the crown surface 50 of the piston 5. The exhaust-side slope portion 62 is formed in a portion between a rim of the cavity 51 and the exhaust-side flat portion 56. The exhaust-side slope portion 62 is formed to be raised toward the +Z side, as extending from the −Y side toward the +Y side. The exhaust-side slope portion 62 is continued to the exhaust-side flat portion 56 on the −Y side, and is continued to the exhaust-side upright portion 513 of the cavity 51 on the +Y side.

Next, as illustrated in FIG. 6, in the cavity 51, the bottom surface portion 511 is formed of a curved surface having a curvature radius R511, and the lateral upright portion 512 is formed of a curved surface having a curvature radius R512. A center of curvature of each of the bottom surface portion 511 and the lateral upright portion 512 is present on the +Z side.

In the piston 5 according to the present embodiment, the curvature radius R511 and the curvature radius R512 satisfy the following relationship.

$$R511 > R512 \qquad \text{[Mathematical Expression 1]}$$

When the relationship of [Mathematical Expression 1] is expressed in another way, the lateral upright portion 512 is formed of a curved surface raised in the Z-direction with respect to the bottom surface portion 511.

As illustrated by an enlarged portion in FIG. 6, a curved surface of the lateral upright portion 512 and a curved surface of the bottom surface portion 511 come into contact with each other at a boundary portion P51.

As illustrated in FIG. 7, in the cavity 51, the bottom surface portion 511 and the lateral upright portions 512 are formed to be smoothly continued. Thus, the lateral upright portions 512 function as a guide portion which guides a flow Flow1 of air-fuel mixture toward the ignition portion 170 of the ignition plug 17, when in-cylinder flow within the combustion chamber 6 is gathered within the cavity 51, as the piston 5 is lifted in a compression stroke.

3. Positional Relationship Between Cavity 51 of Piston 5, and Ignition Portion 170 of Ignition Plug 17 and Injector 18

Figure 8:
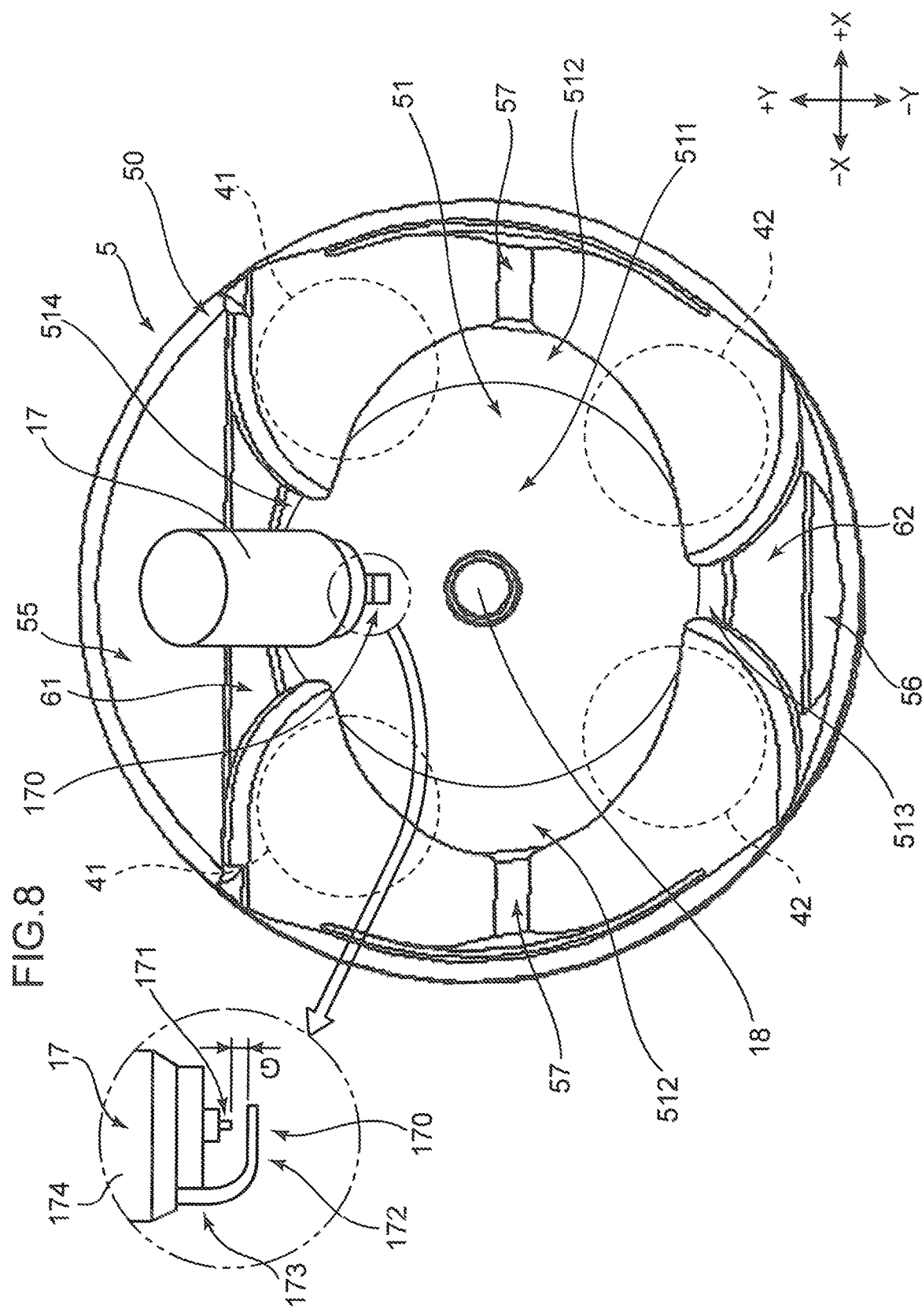
FIG. 8 is a schematic plan view illustrating a positional relationship among a cavity of the piston, an ignition portion of an ignition plug, and an injector.

A positional relationship between the cavity 51 of the piston 5, and the ignition portion 170 of the ignition plug 17 and the injector 18 is described with reference to FIG. 8. FIG. 8 is a schematic plan view illustrating a positional relationship between the cavity 51 of the piston 5, and the ignition portion 170 of the ignition plug 17 and the injector 18.

As illustrated in FIG. 8, the cavity 51 in the crown surface 50 of the piston 5 is formed in a region including a position below (in a direction perpendicular to the plane of FIG. 8) the ignition portion 170 of the ignition plug 17. In addition, the two intake openings 41 and the two exhaust openings 42 are formed in the combustion chamber ceiling surface 6U (illustration thereof is omitted in FIG. 8). And, a part of each of the intake openings 41 and a part of each of the exhaust openings 42 overlap the cavity 51 in a plan view in the Z-direction (a direction perpendicular to the plane of FIG. 8).

The two intake openings 41 are formed spaced away from each other in the X-direction, and are disposed in such a way that the ignition portion 170 of the ignition plug 17 is interposed therebetween.

As illustrated by a portion surrounded by a two-dotted chain line in FIG. 8, the ignition plug 17 includes an ignition plug body 174 of a circular columnar shape, and the ignition portion 170 formed on a distal end of the ignition plug body 174. The ignition portion 170 of the ignition plug 17 is constituted by a center electrode 171 and a ground electrode 172. The center electrode 171 and the ground electrode 172 are disposed spaced away from each other by a discharge gap G. The ground electrode 172 is a distal end continuing to an opposing portion 173, and has an L-shape as a whole, when the opposing portion 173 and the ground electrode 172 are viewed from a side.

The injector 18 is disposed above a substantially center portion of the cavity 51 in the crown surface 50 of the piston 5, and is configured to inject fuel into the cavity 51 through the injection holes 181 (see FIG. 2.).

As illustrated in FIG. 8, in a plan view in the Z-direction (a direction perpendicular to the plane of FIG. 8), the engine body 1 is configured such that the ignition portion 170 of the ignition plug 17 is disposed in a portion between a portion where the injector 18 is provided, and the intake-side flat portion 55. In addition, the ignition plug 17 is disposed in a state that the opposing portion 173 faces the side opposite to the injector 18.

4. Relationship Between Intake-Side Flat Portion 55 and Intake-Side Slope Portion 61 on Crown Surface 50 of Piston 5, and Intake-Side Top Surface Portion 43 of Cylinder Head 4

Figure 9:
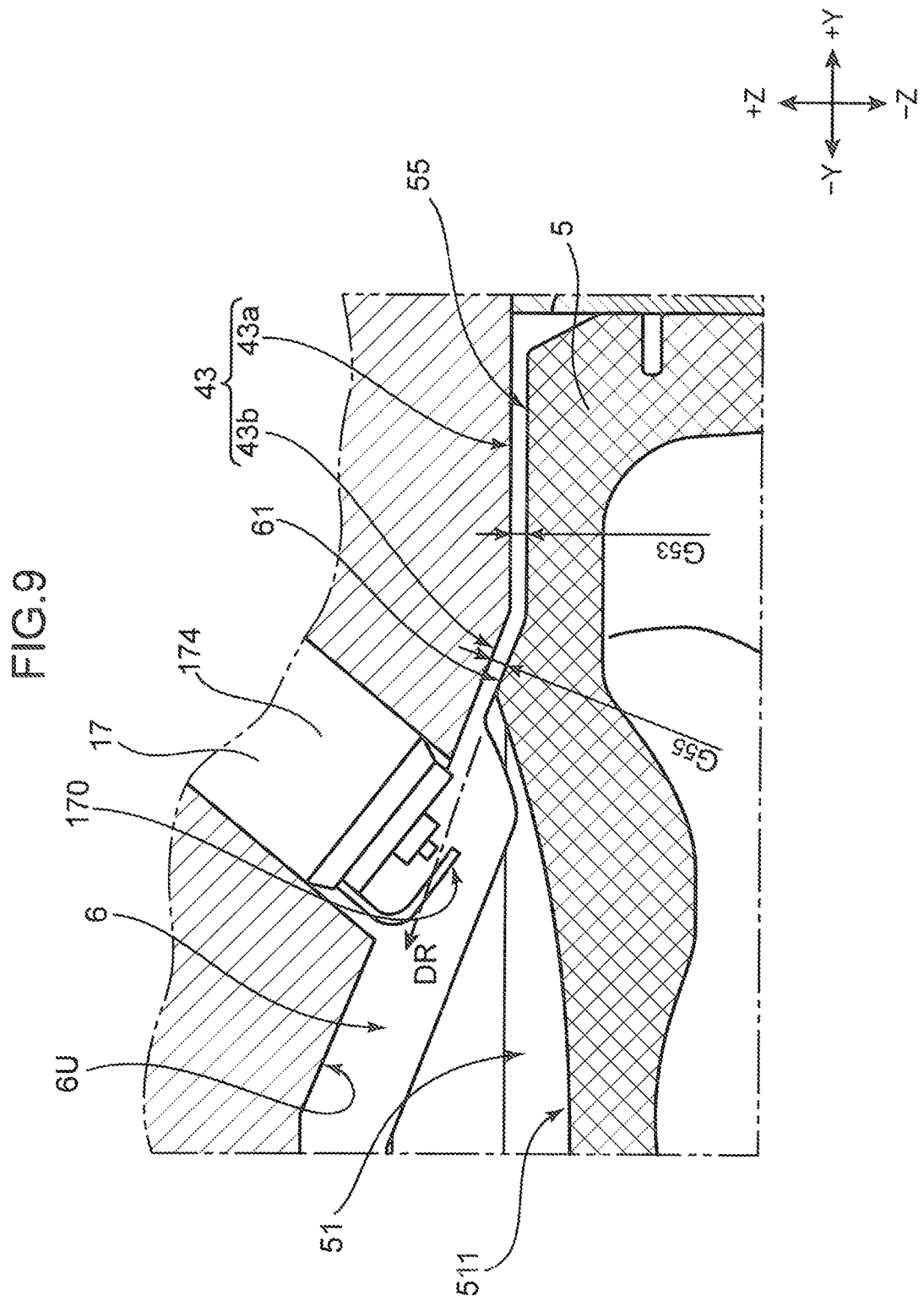
FIG. 9 is a schematic cross-sectional view illustrating a relationship between an intake-side flat portion and an intake-side slope portion on the crown surface of the piston, and an intake-side top surface portion of a cylinder head.

A relationship between the intake-side flat portion 55 and the intake-side slope portion 61 on the crown surface 50 of the piston 5, and the intake-side top surface portion 43 of the cylinder head 4 is described with reference to FIG. 9. FIG. 9 is a schematic cross-sectional view illustrating a relationship between the intake-side flat portion 55 and the intake-side slope portion 61 on the crown surface 50 of the piston 5, and the intake-side top surface portion 43 of the cylinder head 4.

As illustrated in FIG. 9, the intake-side top surface portion 43 of the cylinder head 4 is formed to be in parallel to a joint surface of the cylinder block 3 and the cylinder head 4, that is, perpendicular to the cylinder axis. The intake-side top surface portion 43 of the cylinder head 4 includes a flat portion 43a which is in parallel to the intake-side flat portion 55 on the crown surface 50 of the piston 5, and a slope portion 43b which is in parallel to the intake-side slope portion 61. And, as illustrated in FIG. 9, when the piston 5 is in the vicinity of a compression top dead center (TDC), the flat portion 43a of the intake-side top surface portion 43 of the cylinder head 4 is opposed to the intake-side flat portion 55 of the piston 5 with a small gap G53, and the slope portion 43b is opposed to the intake-side slope portion 61 with a small gap G55.

The gap G53 and the gap G55 may be the same, or may be different from each other.

In the present embodiment, the intake-side slope portion 61 of the piston 5 is formed to be directed to the ignition portion 170 of the ignition plug 17, when the piston 5 is in the vicinity of a compression top dead center (TDC) (imaginary line DR).

In the engine body 1 according to the present embodiment, a squish flow generation portion is formed by combination of the flat portion 43a of the intake-side top surface portion 43, and the intake-side flat portion 55 on the crown surface 50 of the piston 5; and a second squish flow generation portion is formed by combination of the slope portion 43b of the intake-side top surface portion 43, and the intake-side slope portion 61 on the crown surface 50 of the piston 5. The squish flow generation portions will be described later.

In addition, although illustration is omitted in FIG. 9, regarding the exhaust-side top surface portion 44 (see FIG. 1) of the cylinder head 4, a flat portion which is in parallel to the exhaust-side flat portion 56 on the crown surface 50 of the piston 5, and a slope portion which is in parallel to the exhaust-side slope portion 62 are formed, similarly to the above. Thus, the exhaust-side top surface portion 44 of the cylinder head 4, and the exhaust-side flat portion 56 and the exhaust-side slope portion 62 on the crown surface 50 of the piston 5 are opposed to each other with a small gap, when the piston 5 is in the vicinity of a compression top dead center (TDC).

5. Lateral Upright Portion 512 on Crown Surface 50 of Piston 5, and Ignition Portion 170 of Ignition Plug 17

Figure 10:
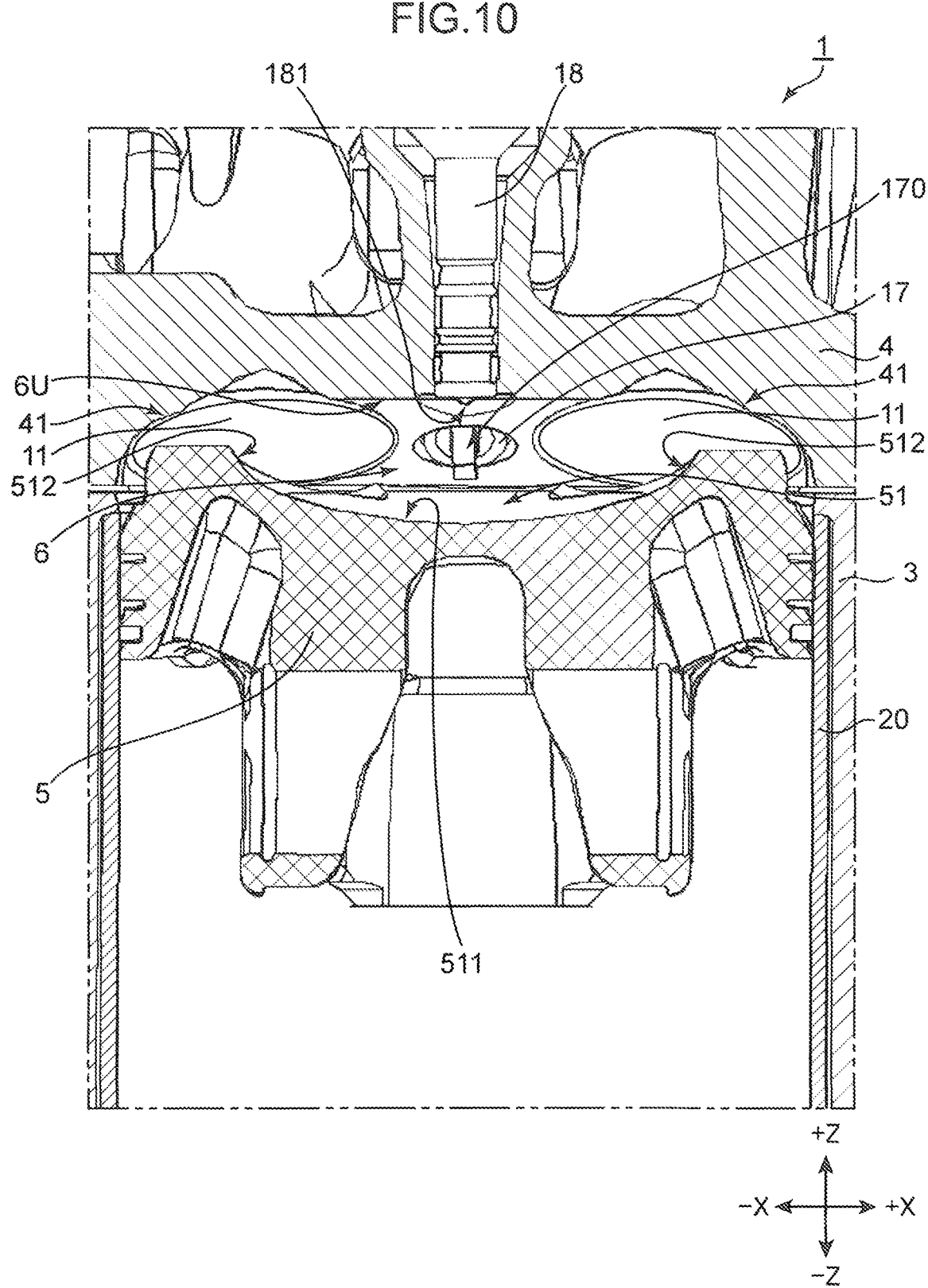
FIG. 10 is a schematic cross-sectional view illustrating a positional relationship between a lateral upright portion on the crown surface of the piston, and the ignition portion of the ignition plug.

A positional relationship between the lateral upright portion 512 on the crown surface 50 of the piston 5, and the ignition portion 170 of the ignition plug 17 is described with reference to FIG. 10. FIG. 10 is a schematic cross-sectional view illustrating a positional relationship between the lateral upright portion 512 on the crown surface 50 of the piston 5, and the ignition portion 170 of the ignition plug 17.

As illustrated in FIG. 10, the ignition portion 170 of the ignition plug 17 is disposed on a rear side with respect to the injector 18 on the plane of FIG. 10, and at a position between the intake openings 41. FIG. 10 illustrates a state that the intake openings 41 are closed by the intake valves 11.

And, the two lateral upright portions 512 on the crown surface 50 of the piston 5 are in a state that the lateral upright portions 512 interpose the ignition portion 170 of the ignition plug 17 therebetween, when the piston 5 is in the vicinity of a compression top dead center (TDC).

6. Relationship Between Fuel Injection Period and Ignition Timing

Figure 11:
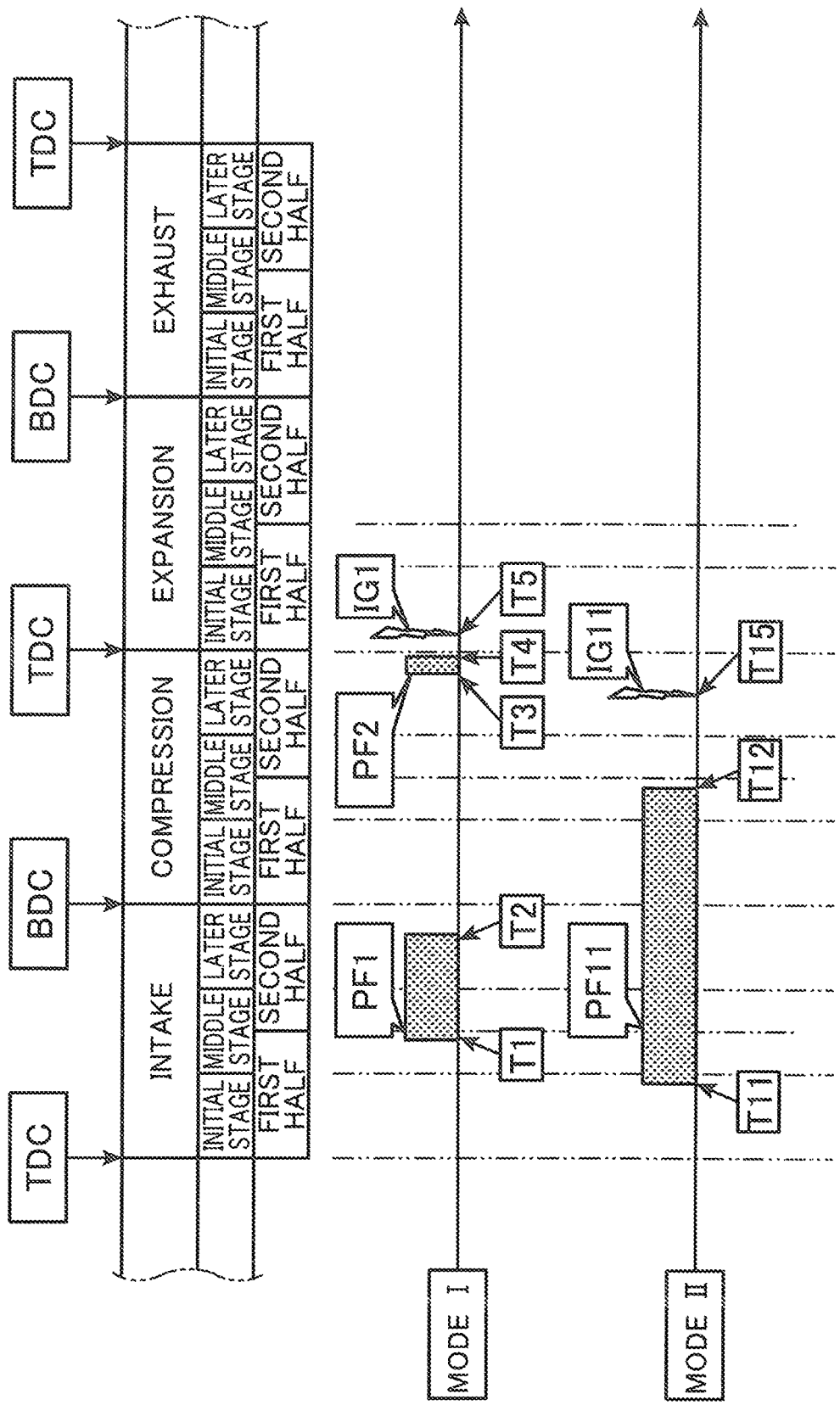
FIG. 11 is a time chart illustrating a fuel injection period and an ignition timing.

A fuel injection period and an ignition timing according to the present embodiment are described with reference to FIG. 11. FIG. 11 is a time chart illustrating a fuel injection period and an ignition timing.

As illustrated in FIG. 11, in the engine according to the present embodiment, an operation is performed at least according to a fuel injection period and an ignition timing in mode I and mode II.

(1) Mode I

Mode I is a mode to be applied, when the engine body 1 is operated from a high-load low-speed range to a high-load medium-speed range.

As illustrated in FIG. 11, in the mode I, first-half injection PF1 in a middle stage of an intake stroke, and second-half injection PF2 immediately before a compression top dead center (TDC) are performed. The first-half injection PF1 is started at a timing T1 in a first half of an intake stroke, and is finished at a timing T2 in a second half of the intake stroke, for example. The timings T1 and T2 are set at timings, with a crank angle (e.g. 70° CA after TDC), when the piston 5 is lowered from a TDC in an exhaust stroke to a position about a half in the exhaust stroke, being interposed therebetween. In this way, by performing the first-half injection PF1 in a middle stage of an intake stroke, it is possible to sufficiently secure a time for forming an air-fuel mixture within the combustion chamber 6.

The second-half injection PF2 is started at a timing T3 in a second half of a compression stroke, and is finished at a timing T4 immediately before a compression top dead center (TDC), for example. The timing T3 can be set, for example, at 10° CA before a compression top dead center (TDC). In this way, by performing the second-half injection PF2 before the compression top dead center (TDC), it is possible to prevent knocking phenomenon.

Ignition IG1 by the ignition plug 17 is performed at a timing T5 in the vicinity of a compression top dead center (TDC).

In the mode I, by performing the second-half injection PF2, it is possible to increase a flow of gas (in-cylinder flow) within the combustion chamber 6 immediately before ignition. Further, a fuel pressure is set, for example, to a pressure equal to or higher than 30 MPa. This enables to shorten a fuel injection period and an air-fuel mixture forming period (mixing period), and to increase a flow of gas within the combustion chamber 6. Regarding the fuel pressure, for example, 120 MPa can be set as an upper limit.

(2) Mode II

The mode II is a mode to be applied when the engine body 1 is operated in a high speed range, and in which SI combustion is performed.

As illustrated in FIG. 11, in the mode II, injection PF11 is started at a timing T11 in a first half of an intake stroke, and is finished at a timing T12 in a first half of a compression stroke. In the mode II, the fuel injection PF11 is collectively performed for a period from an intake stroke until a compression stroke.

Ignition IG11 by the ignition plug 17 is performed at a timing T15 before a compression top dead center (TDC).

As described above, since the fuel injection PF11 in the mode II is collectively performed for a period from an intake stroke until a compression stroke, it is possible to form a homogeneous or substantially homogeneous air-fuel mixture within the combustion chamber 6. In addition, in the mode II, it is possible to secure a long fuel atomization time as much as possible in a state that a rotational speed of the engine body 1 is high, and it is also possible to reduce unburnt fuel loss.

In this way, in the engine body 1 in which an operation in a high speed range is performed in the mode II, by setting an air-fuel ratio of air-fuel mixture to a substantially stoichiometric air-fuel ratio, it is possible to purify exhaust gas discharged from the combustion chamber 6 using a three way catalyst, and it is possible to avoid abnormal combustion by performing SI combustion.

7. Swirl Flow to be Generated within Combustion Chamber 6

Figure 12:
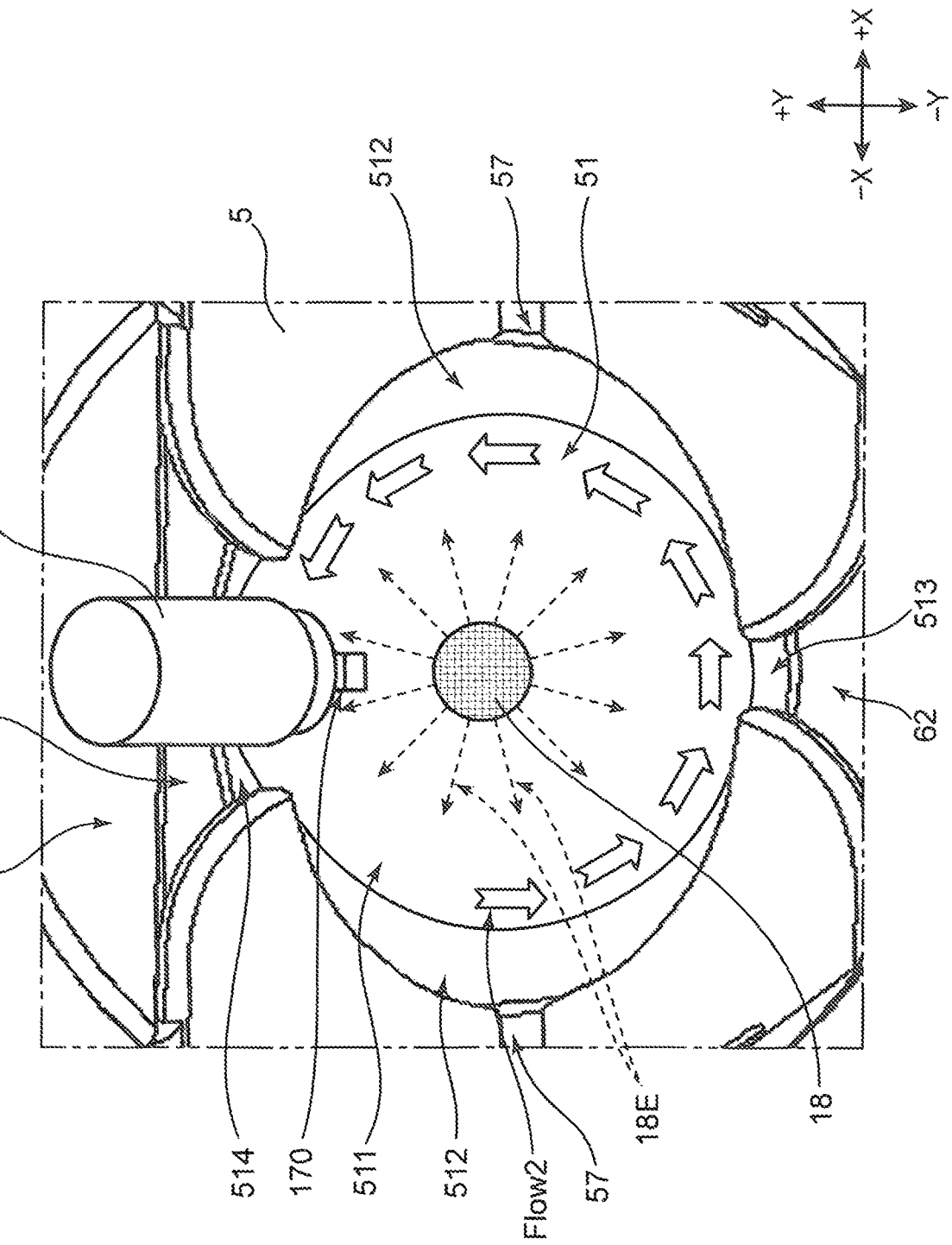
FIG. 12 is a schematic plan view illustrating fuel injected into a combustion chamber and a swirl flow generated within the combustion chamber.

A swirl flow to be generated within the combustion chamber 6 is described with reference to FIG. 12. FIG. 12 is a schematic plan view illustrating fuel injected into the combustion chamber 6, and a swirl flow to be generated within the combustion chamber 6.

As illustrated in FIG. 12, fuel is radially injected, in a plan view in the Z-axis direction (in a direction perpendicular to the plane of FIG. 12), from the injector 18, which is disposed at a substantially middle portion of the combustion chamber 6 (injected fuel 18E). Specifically, it is configured in such a way that fuel is injected from the injector 18 into the cavity 51 formed in the crown surface 50 of the piston 5.

In the engine body 1 according to the present embodiment, fuel injection from the injector 18 is controlled in such a way that an axis of flow is not directed to the ignition portion 170 of the ignition plug 17. Specifically, the injected fuel 18E from the injector 18 is configured to pass through both sides of the ignition portion 170 of the ignition plug 17. This enables to suppress plug wetting phenomenon.

In addition, in the engine body 1 according to the present embodiment, as described above, the opposing portion 173 of the ignition plug 17 is directed to the −Y side, and the ignition portion 170 faces a side opposite to the injection holes 181 of the injector 18. This also enable to suppress plug wetting phenomenon.

Within the combustion chamber 6, as illustrated by the arrows, a swirl flow Flow2 is generated in such a way as to circulate a rim portion of the cavity 51. In this way, by the swirl flow Flow2 generated in a rim portion of the cavity 51, mixing of air and fuel is sufficiently performed, and an air-fuel mixture is guided to the ignition portion 170 of the ignition plug 17 and its vicinity.

As described with reference to FIG. 7, by the lateral upright portions (guide portion) 512 formed on a rim portion of the cavity 51, the air-fuel mixture is raised toward the +Z side (forwardly on the plane of FIG. 7), while being directed toward the ignition portion 170 of the ignition plug 17 and its vicinity, as the swirl flow Flow2 circulates.

In addition, as described above, it is also possible to expel residual gas in the vicinity of the ignition portion 170 by guiding the air-fuel mixture to the ignition portion 170 of the ignition plug 17 and its vicinity.

8. Squish Flow to be Generated within Combustion Chamber 6

Figure 13B:
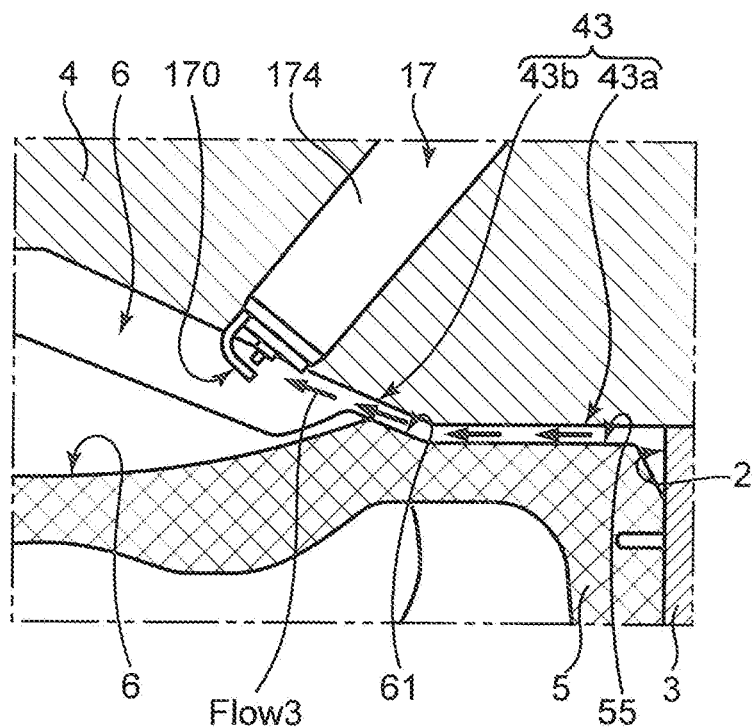
FIG. 13B is a schematic cross-sectional view illustrating a part of the combustion chamber, when the piston is in the vicinity of a compression top dead center.

A squish flow to be generated within the combustion chamber 6 is described with reference to FIGS. 13A and 13B. FIG. 13A is a schematic cross-sectional view illustrating a state of the combustion chamber 6, when the piston 5 is lifted in a first half of a compression stroke. FIG. 13B is a schematic cross-sectional view illustrating a state of the combustion chamber 6, when the piston 5 is in the vicinity of a compression top dead center (TDC). FIG. 9, which is used in the foregoing description, is also used as necessary.

As illustrated in FIG. 13A, in a state that the piston 5 is lifted toward the +Z side in a compression stroke as indicated by the arrow A, as a gap between the intake-side flat portion 55 and the intake-side slope portion 61 of the piston 5, and the combustion chamber ceiling surface 6U decreases, the air-fuel mixture present in a portion indicated by the arrow B is compressed.

As illustrated in FIG. 13B, in a state that the piston 5 reaches a vicinity of a compression top dead center (TDC), the intake-side flat portion 55 of the piston 5, and the flat portion 43a of the cylinder head 4 are opposed to each other with the small gap G53, and the intake-side slope portion 61 and the slope portion 43b are opposed to each other with the small gap G55 (also see FIG. 9).

As described above, in the engine body 1 according to the present embodiment, the intake-side flat portion 55 of the piston 5 and the flat portion 43a of the cylinder head 4 are formed to be in parallel to each other with the gap G53, and the intake-side slope portion 61 and the slope portion 43b are formed to be in parallel to each other with the gap G55. And, the intake-side slope portion 61 of the piston 5 is formed in such a way that the axis of flow (imaginary line DR) is directed to the ignition portion 170 of the ignition plug 17 in a state that the piston 5 is located in the vicinity of a TDC (see FIG. 9).

As described above, the intake-side flat portion 55 and the intake-side slope portion 61 of the piston 5, and the flat portion 43a and the slope portion 43b of the cylinder head 4 are formed. Thus, an air-fuel mixture compressed in a portion between the intake-side flat portion 55 and the intake-side slope portion 61 of the piston 5, and the intake-side top surface portion 43 of the cylinder head 4 is injected as a squish flow Flow3 directed toward the ignition portion 170 of the ignition plug 17 through a gap between the intake-side slope portion 61 and the slope portion 43b. Specifically, a squish flow generation portion is formed by combination of the intake-side flat portion 55 of the piston 5, and the flat portion 43a of the cylinder head 4; and a second squish flow generation portion is formed by combination of the intake-side slope portion 61 and the slope portion 43b.

Therefore, in the engine body 1 according to the present embodiment, it is possible to expel residual gas from the ignition portion 170 of the ignition plug 17 and its periphery using the squish flow Flow3 to be generated when the piston 5 is lifted.

Although illustration is omitted in FIGS. 13A and 13B, the exhaust-side flat portion 56 and the exhaust-side slope portion 62 of the piston 5, and the exhaust-side top surface portion 44 (see FIG. 1) of the cylinder head 4 are opposed to each other with a small gap in a state that the piston 5 is located in the vicinity of a TDC. Therefore, as the piston 5 is lifted, a flow of air-fuel mixture along the combustion chamber ceiling surface 6U is generated also in a region on the exhaust side within the combustion chamber 6. This also enables to expel residual gas from the injection holes 181 of the injector 18 and its periphery within the combustion chamber 6.

9. Advantageous Effects

As described with reference to FIG. 9, in the combustion chamber 6 of the engine body 1 according to the present embodiment, the intake-side slope portion (inclined surface portion) 61 formed to be directed to the ignition portion 170 of the ignition plug 17 (the axis of flow DR is directed to the ignition portion 170), when the piston 5 is in the vicinity of a compression top dead center (TDC). Therefore, it is possible to feed, toward the ignition portion 170, a squish flow generated in a squish flow generation portion, which is formed by the intake-side flat portion (parallel surface portion) 55 and the flat portion 43a of the cylinder head 4. Thus, the combustion chamber 6 of the engine body 1 according to the present embodiment is able to expel residual gas from the ignition portion 170 of the ignition plug 17 and its periphery using a squish flow.

In addition, in the combustion chamber 6 of the engine body 1 according to the present embodiment, the cavity 51 is formed in the crown surface 50 of the piston 5. Thus, it is possible to secure a long migration distance of fuel and fresh air, which makes it possible to securely perform fuel atomization before ignition is performed.

Therefore, in the combustion chamber 6 of the engine body 1 according to the present embodiment, by employing a configuration in which the cavity 51 is formed in the crown surface 50 of the piston 5, it is possible to securely perform a scavenging operation in the vicinity of the combustion chamber ceiling surface 6U (particularly, from the ignition portion 170 of the ignition plug 17 and its vicinity), while securing a migration distance for fuel atomization, and to secure high ignitability of air-fuel mixture.

In addition, as described with reference to FIG. 5, in the combustion chamber 6 of the engine body 1 according to the present embodiment, the bottom portion P511 of the cavity 51 is located at a deep position on the −Z side with respect to the inclined top portion P55 of the intake-side slope portion (inclined surface portion) 61. Thus, it is possible to allow an air-fuel mixture of fuel and fresh air to stay within the cavity 51. Specifically, in the combustion chamber 6 of the engine body 1 according to the present embodiment, the bottom portion P511 of the cavity 51 is disposed at a deep position on the −Z side with respect to the inclined top portion P55. Hence, it is possible to suppress that the air-fuel mixture within the combustion chamber 6 may flow in a direction away from the ignition portion 170 by being affected by a flow toward the ignition portion 170 of the ignition plug 17 along the intake-side slope portion (inclined surface portion) 61. Therefore, in the combustion chamber 6 of the engine body 1 according to the present invention, it is possible to further improve ignitability of air-fuel mixture.

Furthermore, in the combustion chamber 6 of the engine body 1 according to the present embodiment, the cavity 51 of a cup shape projecting (downwardly projecting) in a direction (toward the −Z side) away from the combustion chamber ceiling surface 6U, in other words, the cup-shaped cavity 51 in which there is no obstacle that projects upwardly on the bottom surface portion 511, is employed. Thus, flame propagation after ignition is smoothly performed within the entirety of the combustion chamber.

Moreover, in the combustion chamber 6 of the engine body 1 according to the present invention, since the discharge gap G of the ignition plug 17 is disposed in such a way as to be opened toward the intake-side slope portion (inclined surface portion) 61. Thus, the squish flow Flow3 reaches the discharge gap G without being blocked, and it is possible to acquire a scavenging effect of residual gas more efficiently. Therefore, in the combustion chamber 6 of the engine body 1 according to the present invention, it is possible to further enhance ignitability of air-fuel mixture.

In addition, in the combustion chamber 6 structure of the engine body 1 according to the present embodiment, when the piston 5 is in the vicinity of a compression top dead center (TDC), the intake-side slope portion (inclined surface portion) 61 of the piston 5, and the slope portion (corresponding inclined region) 43b of the cylinder head 4 are opposed to each other with the gap G55, and a second squish flow generation portion is formed by combination of the intake-side slope portion 61 and the slope portion 43b. Therefore, it is possible to more securely expel residual gas in the vicinity of the combustion chamber ceiling surface 6U.

Accordingly, in the combustion chamber 6 of the engine body 1 according to the present embodiment, a scavenging operation of the ignition portion 170 of the ignition plug 17 and its vicinity is securely performed using the squish flow Flow3, and it is possible to secure high ignitability of air-fuel mixture.

Second Embodiment

Figure 14:
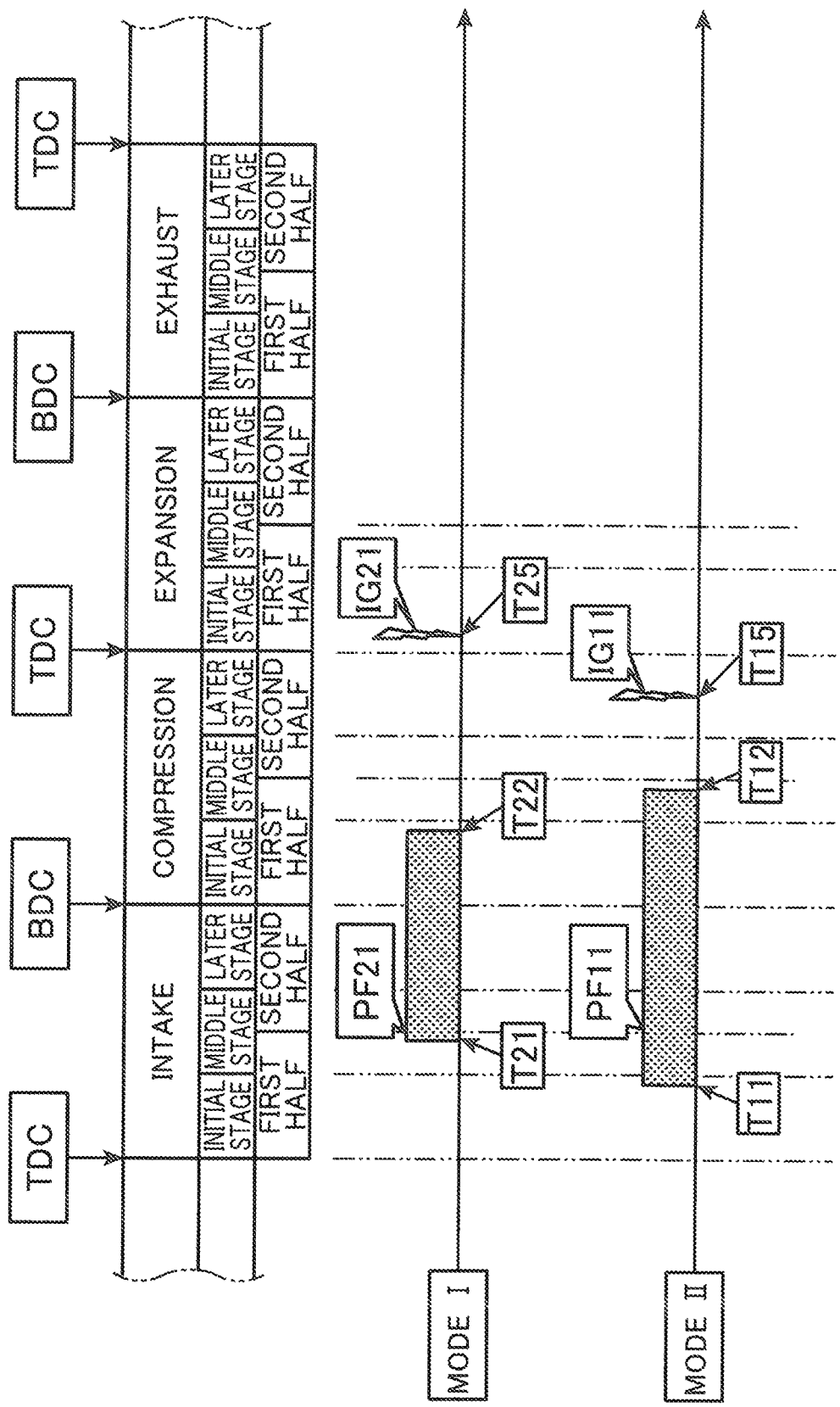
FIG. 14 is a time chart illustrating a fuel injection period and an ignition timing according to a second embodiment.

A spark ignited engine according to a second embodiment is described with reference to FIG. 14. FIG. 14 is a time chart illustrating a fuel injection period and an ignition timing according to the present embodiment.

In the engine according to the present embodiment, since a same configuration as in the first embodiment is employed except that a fuel injection period is partially different, only a fuel injection period and an ignition timing are described.

As illustrated in FIG. 14, also in the engine according to the present embodiment, an operation is performed at least according to a fuel injection period and an ignition timing in mode I and mode II. Between the modes, since the mode II is the same as in the first embodiment, in the following, only the mode I is described.

In the mode I according to the present embodiment, although fuel injection PF21 is performed for a period from a middle stage of an intake stroke to a first half of a compression stroke, unlike the first embodiment, fuel injection immediately before a compression top dead center (TDC) is not performed. Specifically, in the mode I according to the present embodiment, the fuel injection PF21 is started at a timing T21 in a middle stage of an intake stroke, and is finished at a timing T22 in a first half of a compression stroke.

The start timing T21 of the fuel injection PF21 can be set to 280° CA before a compression top dead center (TDC), for example.

Ignition IG21 by an ignition plug 17 is performed at a timing T21 in the vicinity of a compression top dead center (TDC), similarly to the mode I in the first embodiment.

In the mode I according to the present embodiment, by setting a period of the fuel injection PF21 as illustrated in FIG. 14, it is possible to form an air-fuel mixture for compression ignition (CI) combustion in an outer peripheral portion of a combustion chamber 6, and it is possible to form an air-fuel mixture for spark ignition (SI) combustion in a middle portion of the combustion chamber 6.

Preferably, an excess air ratio λ of air-fuel mixture in a middle portion of the combustion chamber 6 is 1 or less, and an excess air ratio λ of air-fuel mixture in an outer peripheral portion of the combustion chamber 6 is 1 or less (preferably, smaller than 1). And, it is possible to set an air-fuel ratio (A/F) of air-fuel mixture in a middle portion of the combustion chamber 6 to a value not smaller than 13 but not larger than a stoichiometric air-fuel ratio (14.7), for example.

In addition, it is possible to set an air-fuel ratio of air-fuel mixture in an outer peripheral portion of the combustion chamber 6 to a value not smaller than 11 but not larger than a stoichiometric air-fuel ratio (14.7), or to a value not smaller than 11 or 12.5 but not larger than 13.

Specifically, in the present embodiment, a time during which fuel injected by the fuel injection PF21 is reacted is shortened in a state that a rotational speed of an engine body 1 is high. Thus, it is possible to omit second-half injection (second-half injection PF2 in the first embodiment) for suppressing reaction of air-fuel mixture.

In the present embodiment, a same configuration as the combustion chamber 6 of the engine body 1 according to the above first embodiment is employed. Thus, similarly to the above first embodiment, it is possible to securely perform a scavenging operation of the ignition portion 170 of the ignition plug 17 and its vicinity using the squish flow Flow3, and to secure high ignitability of air-fuel mixture.

[Modifications]

In the above first and second embodiments, the intake-side slope portion 61 on the crown surface 50 of the piston 5, and the slope portion 43b of the cylinder head 4 are opposed to each other with the small gap G55, when the piston 5 is in the vicinity of a compression top dead center (TDC), and the second squish flow generation portion is formed by combination of the intake-side slope portion 61 and the slope portion 43b. The present invention, however, is not limited to the above. For example, it is possible to employ a configuration in which the intake-side slope portion 61 and the slope portion 43b are not in parallel to each other, for example. Also, in this case, it is possible to perform a function that the intake-side slope portion 61 guides a squish flow toward the ignition portion 170 of the ignition plug 17.

In addition, in the above first and second embodiments, the intake-side flat portion 55 is employed as one example of the parallel surface portion. The present invention, however, is not limited to the above. For example, it is possible to employ a recessed curved surface or a projected curved surface, as the parallel surface portion.

Likewise, in the above first and second embodiments, the intake-side slope portion 61 of a flat shape is employed as the inclined surface portion. The present invention, however, is not limited to the above. For example, it is possible to employ a recessed curved surface or a projected curved surface, as the inclined surface portion.

Furthermore, in the above first and second embodiments, each of the exhaust-side flat portion 56 and the exhaust-side slope portion 62 of the piston 5 is also formed of a flat surface. The present invention, however, is not limited to the above. For example, it is possible to form each of the exhaust-side flat portion 56 and the exhaust-side slope portion 62 of a recessed curved surface or a projected curved surface.

In the above first and second embodiments, a cross section of the cavity 51 of the piston 5 is formed by combination of the bottom surface portion 511 and the two lateral upright portions 512 in a cross section taken along the line VI-VI in FIG. 4 (cross section illustrated in FIG. 6). The present invention, however, is not limited to the above. For example, it is possible to employ a cross-sectional configuration in which a curved surface or a flat surface is interposed between the bottom surface portion 511 and the lateral upright portion 512.

In addition, in the above first and second embodiments, the bottom surface portion 511 and the lateral upright portion 512 come into contact with each other at the boundary portion P51. The present invention, however, is not necessarily limited to the above. The bottom surface portion 511 and the lateral upright portion 512 may intersect with each other at a small angle. It is conceived that this hardly affects in-cylinder flow.

Moreover, in the above first and second embodiments, an area of the intake-side flat portion 55 of the piston 5 is larger than an area of the exhaust-side flat portion 56 of the piston 5. The present invention, however, is not limited to the above. For example, it is possible to employ a configuration in which an intake-side flat portion and an exhaust-side flat portion having a same area.

However, when a function is considered in which residual gas is expelled from the ignition portion 170 of the ignition plug 17 and its periphery by increasing the squish flow Flow3 from the intake side, as compared with an airflow from the exhaust side, it is desirable to employ the same configuration as in the above first and second embodiments.

In addition, in the above first and second embodiments, the combustion chamber ceiling surface 6U has a flat pent-roof shape. The present invention, however, is not limited to the above. It is possible to employ a pent-roof shape having a higher ratio. Employing a combustion chamber ceiling surface of a pent-roof shape having a high ratio as described above is advantageous in generating a strong tumble flow.

Furthermore, in the above first and second embodiments, an intake port communicating with the intake opening 41 is not specifically mentioned. In the present invention, however, various variations are available. For example, it is possible to provide a swirl control valve in one of intake ports communicating with two intake openings. When such a configuration is employed, it is possible to actively generate the swirl flow Flow2 within the combustion chamber 6 by controlling opening and closing of the swirl control valve.

Specifically, by closing the swirl control valve, it becomes possible to more easily generate a swirl flow being a vortex flow around a cylinder axis.

Next, a structure of a combustion chamber for an engine according to a third embodiment is described. Before describing the third embodiment, another structure of a combustion chamber for an engine (reference example), which is basis for the third embodiment, is described.

[Reference Example]

1. Overall Configuration of Engine

Figure 15:
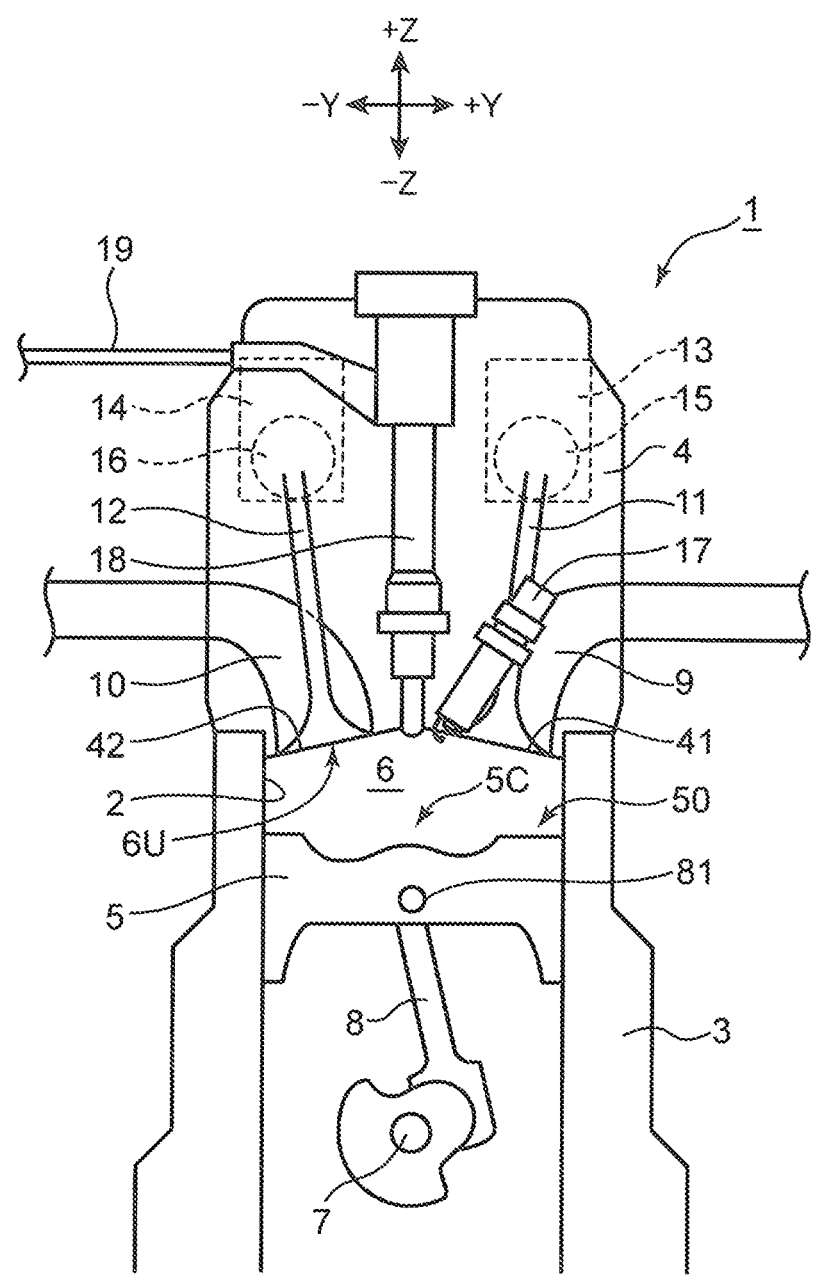
FIG. 15 is a schematic cross-sectional view, in a cylinder axis direction, illustrating an engine to which a structure of a combustion chamber for an engine according to a reference example is applied.
Figure 16:
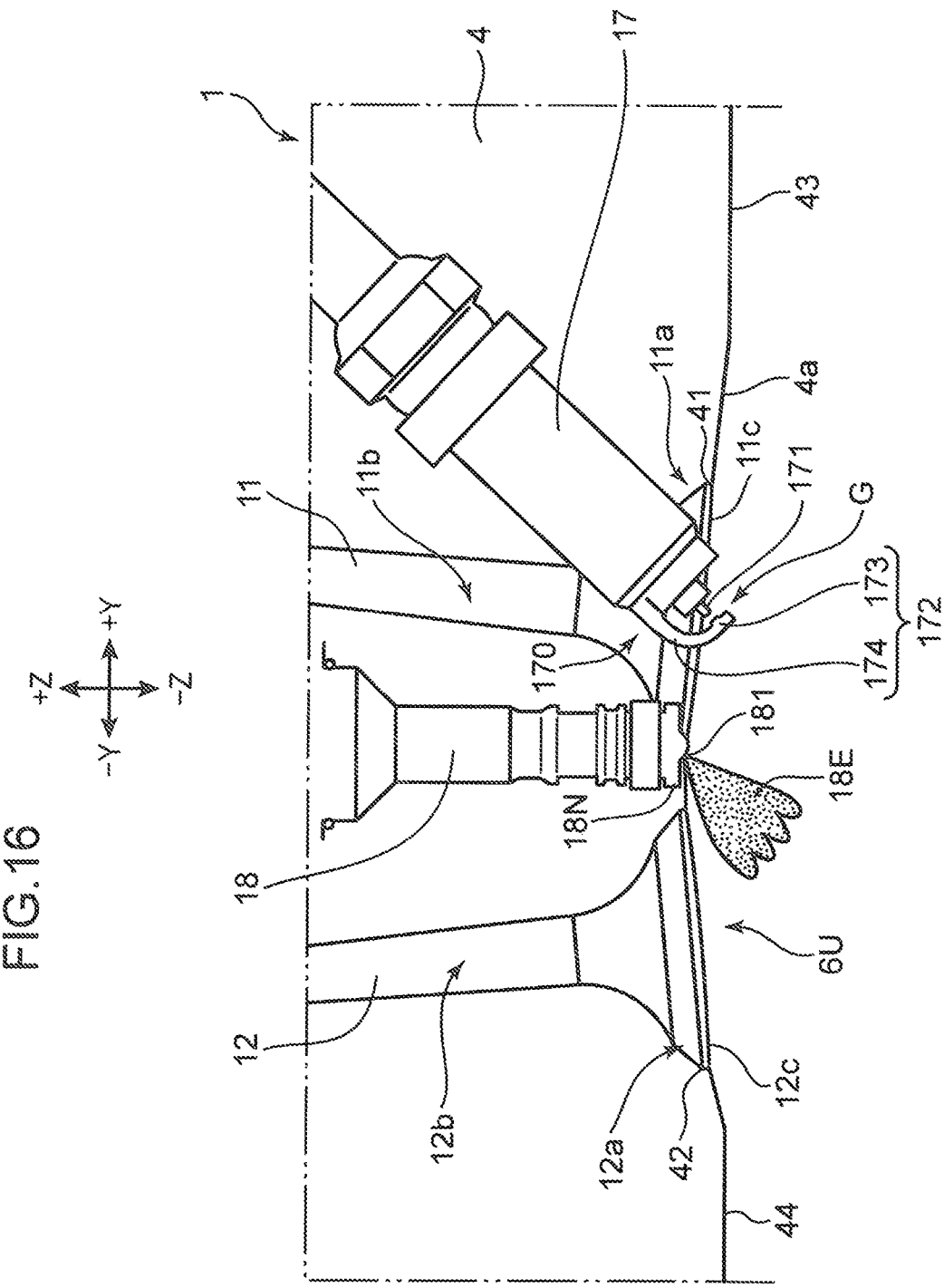
FIG. 16 is a cross-sectional view of essential parts of a cylinder head in FIG. 15.

FIG. 15 is a schematic cross-sectional view illustrating an engine to which a structure of a combustion chamber for an engine according to a first reference example is applied. FIG. 16 is a cross-sectional view of essential parts of a cylinder head illustrated in FIG. 15.

As illustrated in FIG. 15, a basic structure of the engine to which the structure of the combustion chamber for the engine according to the reference example is applied is the same as the engines according to the above-described first and second embodiments. Therefore, regarding the basic structure of the engine, constituent elements equivalent to those in the first and second embodiments are indicated with same reference numbers, and description thereof may be omitted or simplified.

An engine body 1 according to the reference example is able to perform ordinary SI combustion in which an air-fuel mixture within a combustion chamber is forcibly ignited by an ignition plug, retard SI combustion in which a fuel injection timing is in the vicinity of a compression top dead center (TDC) in SI combustion, and SICI combustion in which SI combustion and CI combustion are combined. In SI combustion, fuel is injected in a middle stage of an intake stroke, and an air-fuel mixture is forcibly ignited in the vicinity of a TDC in a compression stroke. In retard SI combustion, fuel is injected before and after a TDC in a compression stroke, and an air-fuel mixture is forcibly ignited in an initial stage of an expansion stroke following the compression stroke. In SICI combustion, an air-fuel mixture within a combustion chamber is forcibly ignited and combusted by flame propagation, and unburnt air-fuel mixture within the combustion chamber is combusted by self-ignition.

In SICI combustion, combustion may be completed by flame propagation without causing self-ignition. These combustion patterns are selected according to an operating range. For example, SI combustion is selected in a high-speed high-load range of the engine, retard SI combustion is selected in a low-speed high-load range, and SICI combustion is selected in a low load range without depending on a rotational speed, respectively.

In the reference example, a combustion chamber ceiling surface 6U has a shallow pent-roof shape, as compared with the first and second embodiments, and an ignition plug 17 is mounted on a cylinder head 4 in such a way that an ignition portion 170 is disposed on the +Y side (intake port side) with respect to a center portion of a combustion chamber 6 in the Y-direction.

In addition, an injector 18 is disposed on the −Y side with respect to the ignition portion 170 of the ignition plug 17, and on a center portion of the combustion chamber 6 in the X-direction.

Furthermore, as illustrated in FIG. 16, it is possible to inject fuel from the injector 18 at least toward the exhaust port side (−Y side) into the combustion chamber 6.

2. Detailed Structure of Piston

Figure 17:
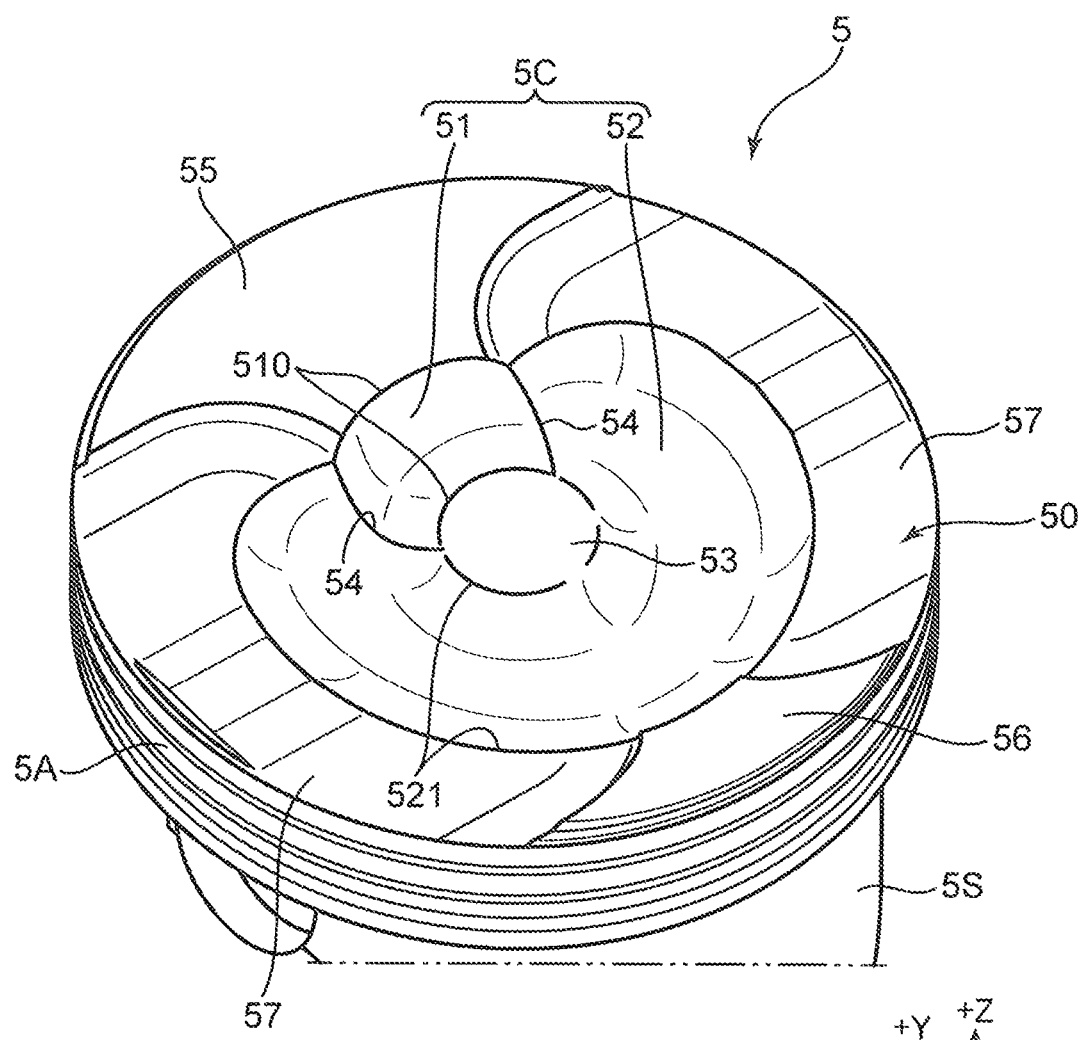
FIG. 17 is a perspective view of a piston of the engine in FIG. 15.
Figure 18:
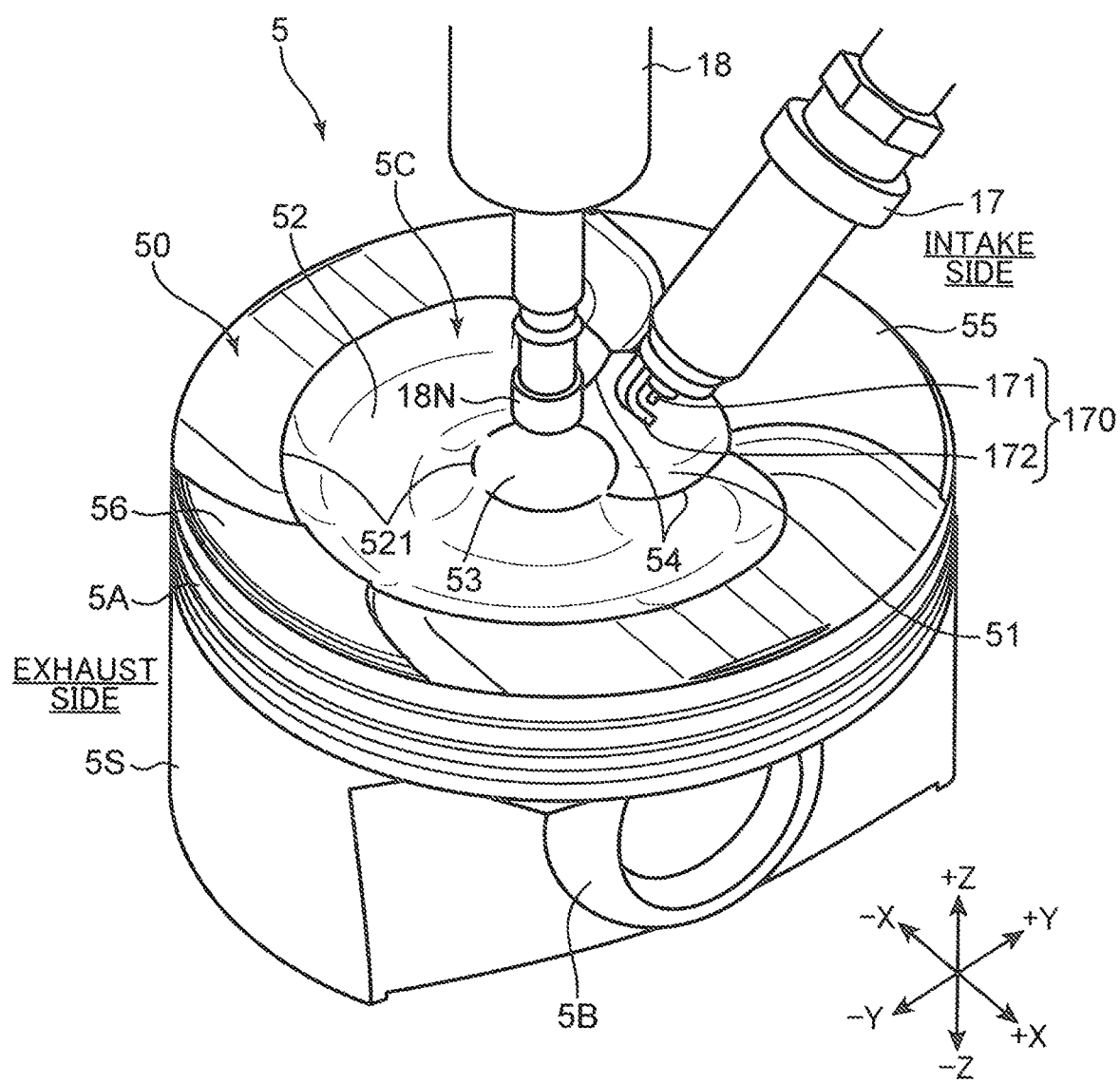
FIG. 18 is a perspective view illustrating a layout of an ignition plug and an injector with respect to the piston.
Figure 19:
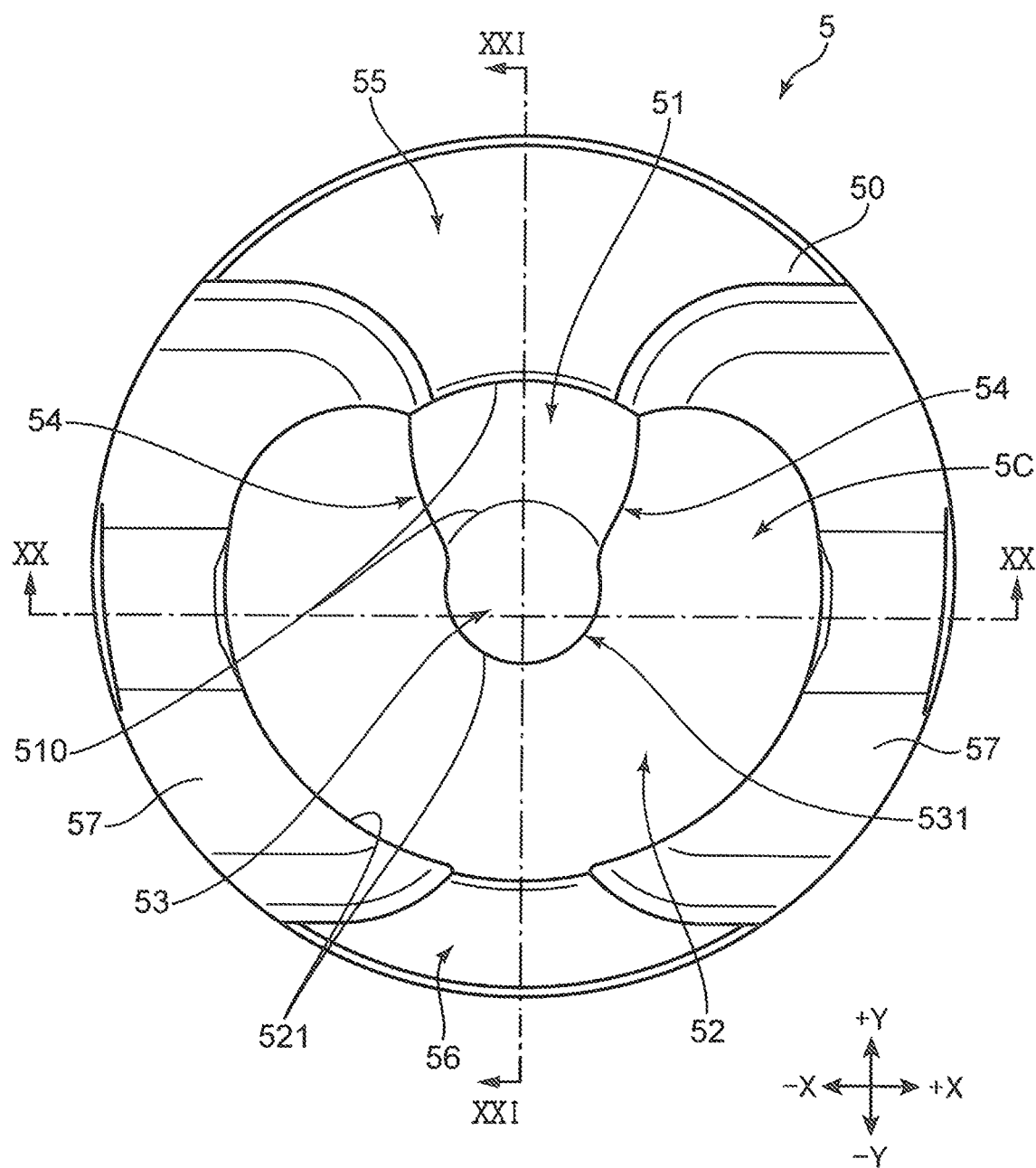
FIG. 19 is a plan view of a crown surface of the piston.
Figure 20:
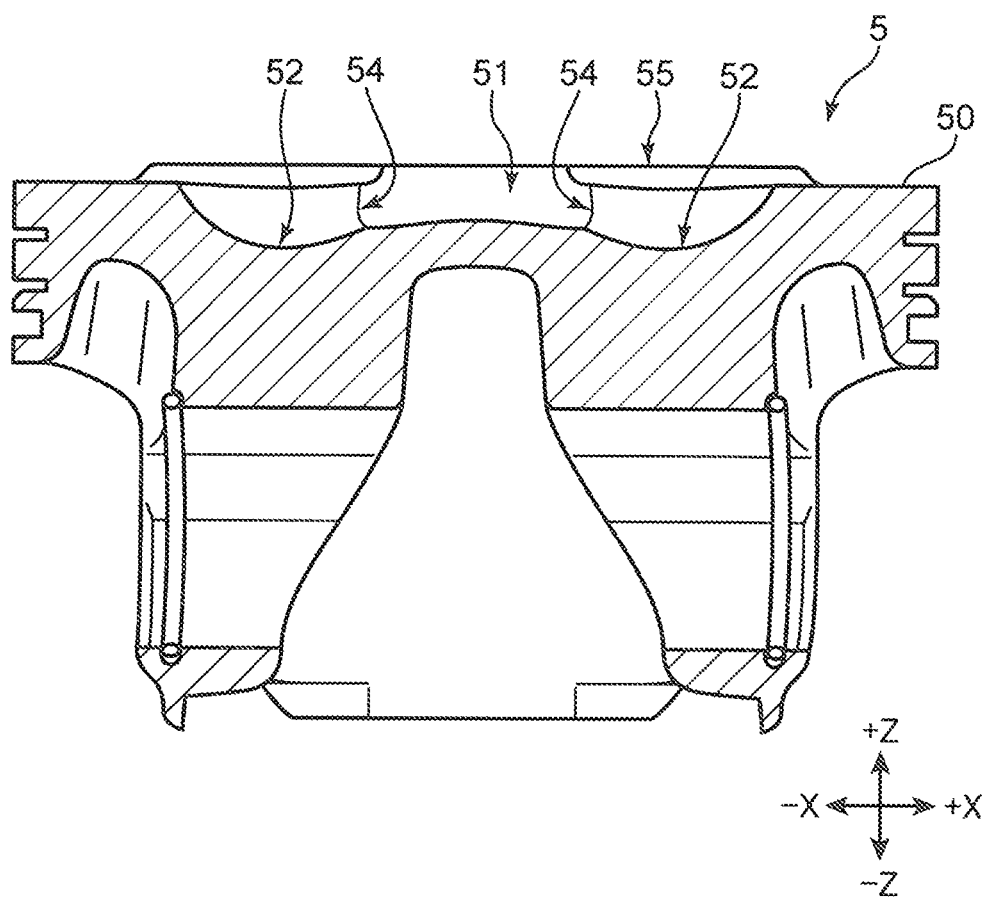
FIG. 20 is a cross-sectional view taken along the line XX-XX in FIG. 19.
Figure 21:
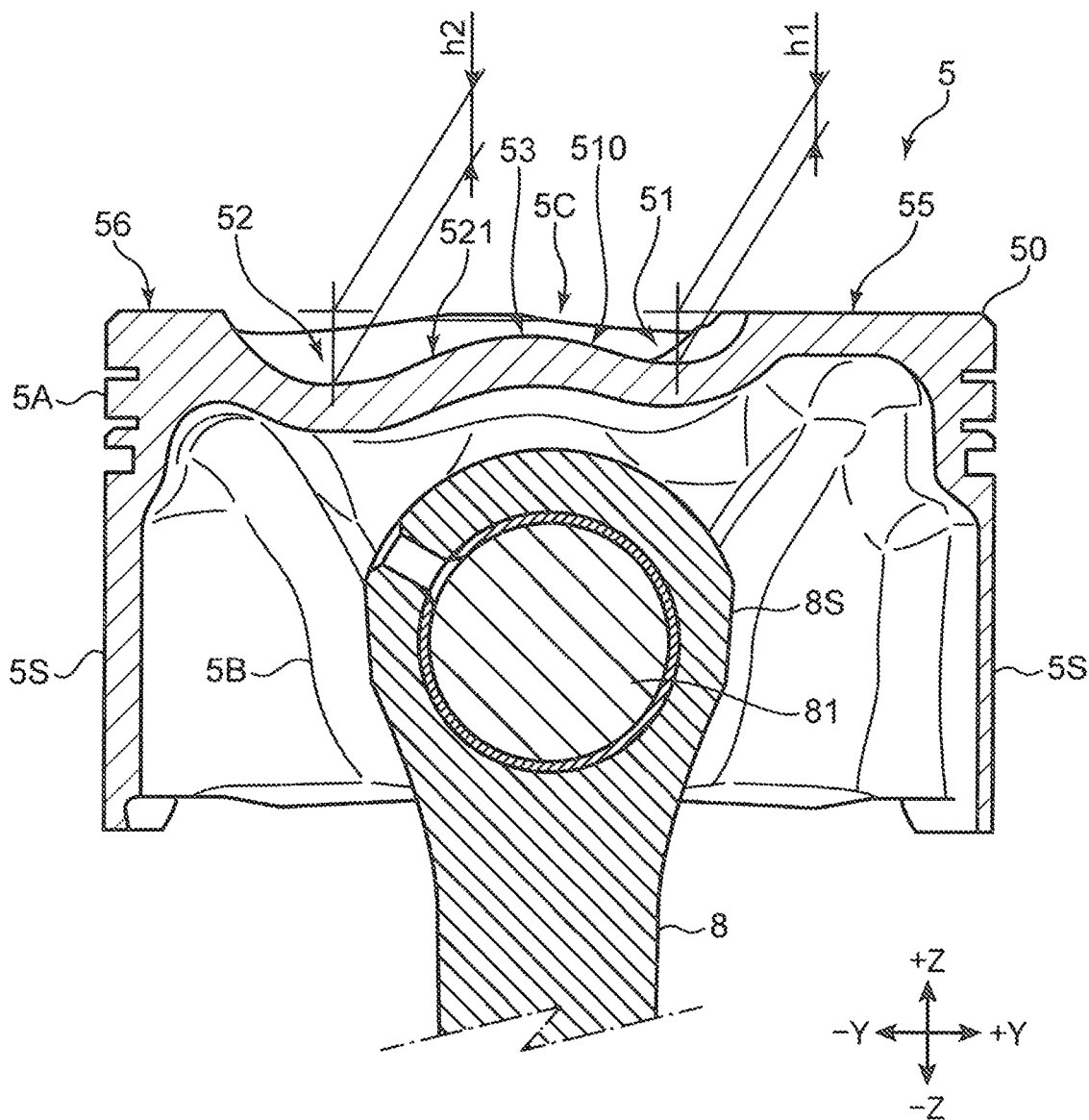
FIG. 21 is a cross-sectional view taken along the line XXI-XXI in FIG. 19.

A structure of a piston 5, a structure of a crown surface 50 in particular, is described in detail with reference to FIGS. 17 to 21. FIG. 17 is a perspective view of the piston 5. FIG. 18 is a perspective view illustrating a layout relationship between the crown surface 50 of the piston 5, and the ignition plug 17 and the injector 18. FIG. 19 is a plan view of the crown surface 50. In addition, FIG. 20 is a cross-sectional view taken along the line XX-XX in FIG. 19. FIG. 21 is a cross-sectional view taken along the line XXI-XXI in FIG. 19.

The piston 5 includes a piston head portion 5A, and a piston skirt portion 5S connected to a lower side (−Z side) of the piston head portion 5A. The piston head portion 5A has a circular columnar body. The piston head portion 5A includes the crown surface 50 constituting a part (bottom surface) of a wall surface of the combustion chamber 6 on a top surface thereof, and a peripheral surface which slidingly contacts with an inner wall surface of the cylinder 2. The piston skirt portion 5S is disposed on the +Y side and the −Y side of the piston head portion 5A, and suppresses swing motion of the piston head portion 5A, when the piston 5 reciprocates. As illustrated in FIG. 21, a piston boss portion 5B which defines a pinhole extending in the X-direction is formed below the piston head portion 5A. A piston pin 81 is inserted into the pinhole of the piston boss portion 5B. The piston pin 81 is a pin which connects a small end portion 8S of the connecting rod 8, and the piston 5.

The crown surface 50 is a surface which is opposed to the combustion chamber ceiling surface 6U in the Z-direction, and includes a substantially annular-shaped cavity 5C in a substantially middle portion in a radial direction (X-direction and Y-direction) thereof. The cavity 5C is a portion which is recessed toward the −Z side, and is a portion which receives fuel injection from the injector 18. An intake-side flat portion 55, an exhaust-side flat portion 56, and a pair of lateral upper surfaces 57 are formed on the outer periphery of the cavity 5C in the crown surface 50. The intake-side flat portion 55 is a flat surface formed in an area adjacent to the cavity 5C on the +Y side. The exhaust-side flat portion 56 is a flat surface formed in an area adjacent to the cavity 5C on the −Y side. The paired lateral upper surfaces 57 are substantially flat surfaces respectively adjacent to the cavity 5C on the +X side and the −X side. In addition, a projection portion 53 bulging toward the +Z side with respect to a bottom portion of the cavity 5C is formed on an inner portion of the cavity 5C.

The intake-side flat portion 55 is formed in such a way as to be in parallel to an intake-side top surface portion 43 of the cylinder head 4 illustrated in FIG. 16 with a slight gap, when the piston 5 is in the vicinity of a top dead center (TDC). Likewise, the exhaust-side flat portion 56 is formed in such a way as to be in parallel to an exhaust-side top surface 44 of the cylinder head 4 illustrated in FIG. 16, when the piston 5 is in the vicinity of a top dead center (TDC). In the engine body 1, a reverse squish flow generation portion is formed by combination of the intake-side flat portion 55 and the intake-side top surface portion 43. Specifically, the reverse squish flow generation portion is a portion which generates a flow of air-fuel mixture from a radially middle region of the combustion chamber 6 toward a radially outer rim region of the combustion chamber 6, when the piston 5 is lowered from the vicinity of a top dead center (TDC) toward the −Z side.

The cavity 5C includes a small cavity 51 and a large cavity 52. As illustrated in FIG. 18, the small cavity 51 is formed to be depressed in a position associated with the ignition portion 170 of the ignition plug 17, in other words, in a position immediately below the ignition portion 170. The large cavity 52 is formed to be depressed in a position adjacent to the small cavity 51, and has a projection area larger than a projection area of the small cavity 51 in a plan view from the +Z side. For example, a projection area of the large cavity 52 is about eight times of a projection area of the small cavity 51. The projection portion 53 is formed near a middle of the crown surface 50 in the XY direction. The projection portion 53 is formed substantially at a middle of the combustion chamber 6 in the XY plane direction, and is projected at a position immediately below a nozzle head 18N (see FIG. 18) of the injector 18.

The small cavity 51 includes a first rim 510 being an outer rim which defines the small cavity 51. The large cavity 52 includes a second rim 521 being an outer rim which defines the large cavity 52. The first rim 510 has a substantially fan shape in a plan view from the +Z side, and serves as a borderline with respect to the projection portion 53, the intake-side flat portion 55 and the large cavity 52. The second rim 521 has a substantially C-shape in a plan view from the +Z side. In other words, the large cavity 52 has a substantially C-shape in a plan view of the crown surface 50 from the +Z side. The second rim 521 serves as a borderline with respect to the projection portion 53, the intake-side flat portion 55, the exhaust-side flat portion 56, and the small cavity 51.

A part of the first rim 510 is a common rim portion serving as a part of the second rim 521. In other words, a part of the first rim 510 of the small cavity 51 comes into contact with a part of the second rim 521 of the large cavity 52 at a boundary. More specifically, a portion except for an arc-shaped portion of the first rim 510, which defines a boundary with respect to each of the projection portion 53 and the intake-side flat portion 55, is common to a part of the second rim 521. The part of the second rim 521 is equivalent to an opened portion (opened end edge) of the C-shape. As illustrated in FIG. 18 and the like, the common rim portion is a ridge line 54 projecting upwardly. Specifically, in the reference example, the small cavity 51 and the large cavity 52 are adjacent to each other with the ridge line 54 being the border thereof.

As illustrated in FIG. 19 and the like, the large cavity 52 has a C-shape in such a way that the large cavity 52 surrounds the projection portion 53 having a substantially circular shape in a plan view from the +Z side. The small cavity 51 is formed at a position where the small cavity 51 overlaps the C-shaped opened portion of the large cavity 52. Thus, although being partitioned by the ridge line 54, the substantially annular-shaped cavity 5C for surrounding a periphery of the projection portion 53 is formed in the crown surface 50 by the small cavity 51 and the large cavity 52.

In a plan view from +Z side, the ignition portion 170 of the ignition plug 17 is disposed above (+Z side) a position where the ignition portion 170 overlaps the C-shaped opened portion of the large cavity 52.

Furthermore, a rim portion 531 on the outer periphery of the projection portion 53 comes into contact with a part of the first rim 510 of the small cavity 51 and a part of the second rim 521 of the large cavity 52 at a boundary. In the present reference example, the projection portion 53 has a mountain shape, and the rim portion 531 serves as a foot of the mountain.

A plurality of injection holes 181 are radially formed in the nozzle head 18N of the injector 18. Fuel is injected through each of the injection holes of the nozzle head 18N toward the small cavity 51 and the large cavity 52. At this occasion, the injected fuel 18E is smoothly introduced into the cavities 51 and 52 along the first rim 510 and the second rim 521 which are slant faces.

A relatively large amount of fuel is injected from each of the injection holes of the nozzle head 18N of the injector 18 toward the large cavity 52, and a small amount of fuel is injected toward the small cavity 51.

As illustrated in FIG. 21, a depth h2 of the large cavity 52 with respect to the intake-side flat portion 55 and the exhaust-side flat portion 56 as a reference is deeper than a depth h1 of the small cavity 51. Thus, a bottom surface of the cavity 5C is raised toward the +Z side, as the bottom surface extends from the exhaust port side (−Y side) toward the intake port side (+Y side). More specifically, a bottom surface of the cavity 5C is gradually raised upwardly (toward the +Z side), as extending from the −Y side toward a position immediately below the ignition portion 170 of the ignition plug 17.

Furthermore, as described above, a projection area of the large cavity 52 is larger than a projection area of the small cavity 51. Therefore, when the depths h1 and h2 (recess depths) of the cavities 51 and 52 are taken into consideration altogether, the large cavity 52 is formed to have a large volume, as compared with the small cavity 51.

3. Fuel Injection Period and Ignition Timing, and Crank Angle

A relationship between a fuel injection period and an ignition timing, and a crank angle is described with reference to FIG. 22. FIG. 22 is a time chart illustrating a relationship between a fuel injection period and an ignition timing, and a crank angle.

As illustrated in FIG. 22, the engine body 1 according to the reference example is operated at least according to a fuel injection period and an ignition timing in mode I and mode II.

The mode I is employed when the above-described retard SI combustion is performed. A fuel injection period PF1 is before and after a TDC in a compression stroke, and the ignition timing is in an initial stage of an expansion stroke. Specifically, fuel injection by the injector 18 is started at a timing T11 associated with a crank angle −CA11 in a last stage of a compression stroke before the TDC, and the fuel injection is continued until a timing T12 associated with a crank angle +CA12 in an initial stage when an expansion stroke is started after the TDC. Thereafter, the air-fuel mixture is ignited by the ignition plug 17 at a timing T13 associated with a predetermined crank angle +CA13 in the initial stage of the expansion stroke. Each of the crank angles is such that, for example, −CA11 is 15° before the TDC (more preferably, 10° before the TDC), +CA12 is 5° after the TDC (more preferably, 2° after the TDC), and +CA13 is 8 to 10° after the TDC in a compression stroke (more preferably, 9° after the TDC). In the mode I, since fuel is injected before and after the TDC, it is possible to prevent occurrence of knocking phenomenon.

The mode II is employed when the above-described SI combustion and SICI combustion are performed. A fuel injection period PF2 is in a middle stage of an intake stroke, and the ignition timing is in a vicinity of a TDC in a compression stroke. Specifically, a period from a timing T21 until a timing T22 is set as the fuel injection period PF2, a crank angle CA2 being interposed between the timings T21 and T22, the crank angle CA2 corresponding to a position at which the piston 5 is lowered about a half in the stroke from a TDC in an exhaust stroke. The ignition timing is a timing T23 when the piston 5 reaches the TDC. The crank angle CA2 is, for example, 70° after the TDC.

Fuel injection may be additionally performed at a timing associated with a crank angle CA3 before a TDC, in addition to the timing associated with the crank angle CA2 for preventing occurrence of knocking phenomenon.

4. Reverse Squish Flow

Figure 24A:
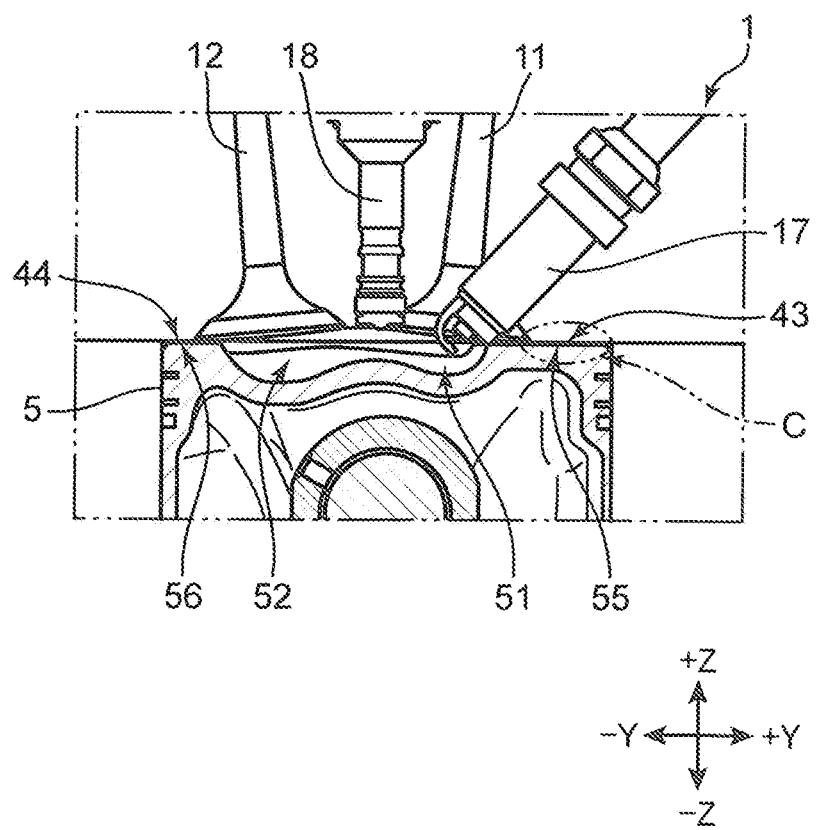
FIG. 24A is a cross-sectional view illustrating the combustion chamber in a state that the piston is in the vicinity of the compression top dead center.
Figure 24B:
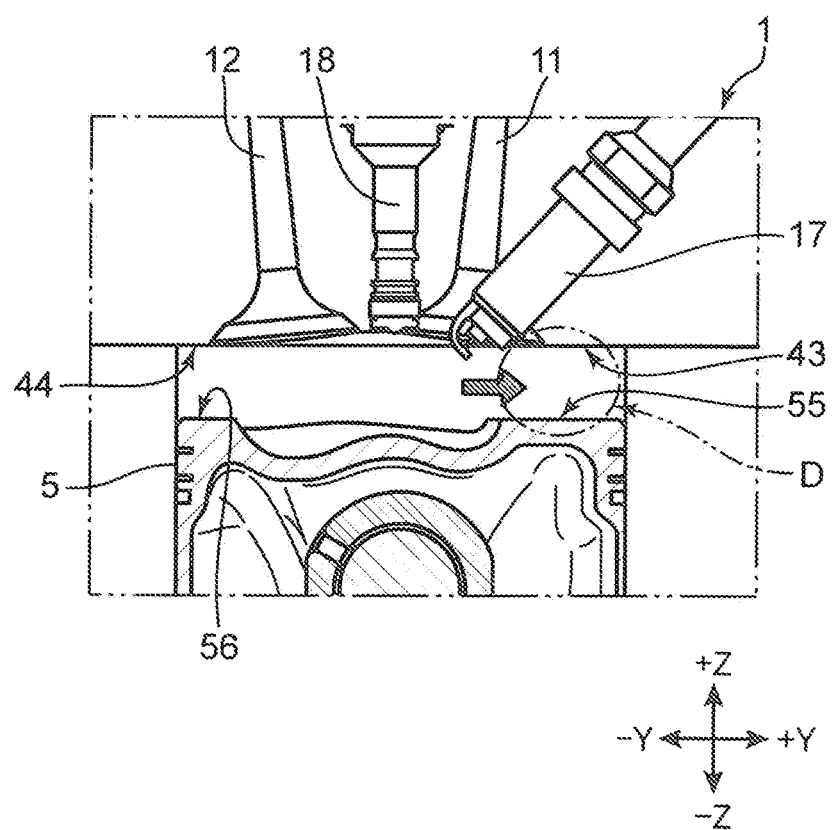
FIG. 24B is a cross-sectional view illustrating the combustion chamber in a state that the piston is lowered after reaching the compression top dead center.

A reverse squish flow generated within the combustion chamber 6 is described with reference to FIGS. 23, 24A, and 24B. FIGS. 23 and 24A are cross-sectional views illustrating the combustion chamber 6, when the piston 5 is in the vicinity of a TDC. FIG. 24B is a cross-sectional view illustrating the combustion chamber 6, when the piston 5 is lowered after reaching the TDC.

First, as illustrated in FIG. 23, an imaginary line LSP passing through the ignition portion 170 of the ignition plug 17 and extending in the Z-direction is drawn.

As illustrated in FIG. 23, when the piston 5 is in the vicinity of a TDC, comparison is made between a portion (portion A: a portion indicated by the arrow A) on the −Y side with respect to the imaginary line LSP, and a portion (portion B: a portion indicated by the arrow B) on the +Y side with respect to the imaginary line LSP. As is clear from FIG. 23, in a structure of the combustion chamber 6 according to the reference example, the volume of the portion B is smaller than the volume of the portion A.

Within the combustion chamber 6, a reverse squish flow, which draws an air-fuel mixture from the −Y side toward the +Y side along with the piston 5 being lowered in an expansion stroke, is generated due to the above-described difference in the volume of the combustion chamber. Specifically, within the combustion chamber 6, a reverse squish flow generation portion is formed by the above-described difference in the volume of the combustion chamber.

Next, as illustrated in FIG. 24A, when the piston 5 is in the vicinity of the TDC, the crown surface 50 of the piston 5 comes closest to the combustion chamber ceiling surface 6U. Therefore, the intake-side flat portion 55 is opposed to the intake-side top surface portion 43 with a slight gap therebetween (see the portion indicated by the arrow C), and the exhaust-side flat portion 56 is also opposed to the exhaust-side top surface 44 with a slight gap therebetween.

As illustrated in FIG. 24B, in an expansion stroke after the TDC, as the piston 5 is lowered, the intake-side flat portion 55 leaves from the intake-side top surface portion 43 (see the portion indicated by the arrow D), and the exhaust-side flat portion 56 also leaves from the exhaust-side top surface portion 44. At this occasion, as indicated by the hatched arrow, a reverse squish flow toward the +Y side (flow which draws an air-fuel mixture into a region on the +Y side) is generated. In the reference example, a reverse squish flow generation portion is constituted by the intake-side flat portion 55 and the intake-side top surface portion 43.

Although the exhaust-side flat portion 56 and the exhaust-side top surface portion 44 are also parallel to each other, regarding the piston 5 and the combustion chamber ceiling surface 6U, an area where the intake-side flat portion 55 and the intake-side top surface portion 43 are opposed to each other is larger than an area where the exhaust-side flat portion 56 and the exhaust-side top surface portion 44 are opposed to each other. Therefore, a reverse squish flow as indicated by the arrow is generated.

In the state illustrated in FIG. 24A, the exhaust-side flat portion 56 and the exhaust-side top surface portion 44, which are opposed and in proximity to each other, are provided. Thus, direct adhesion of injected fuel onto an inner wall surface (cylinder liner) of the cylinder 2 is prevented, when fuel is injected when the piston 5 is in the vicinity of a TDC.

5. Swirl Flow

Figure 25:
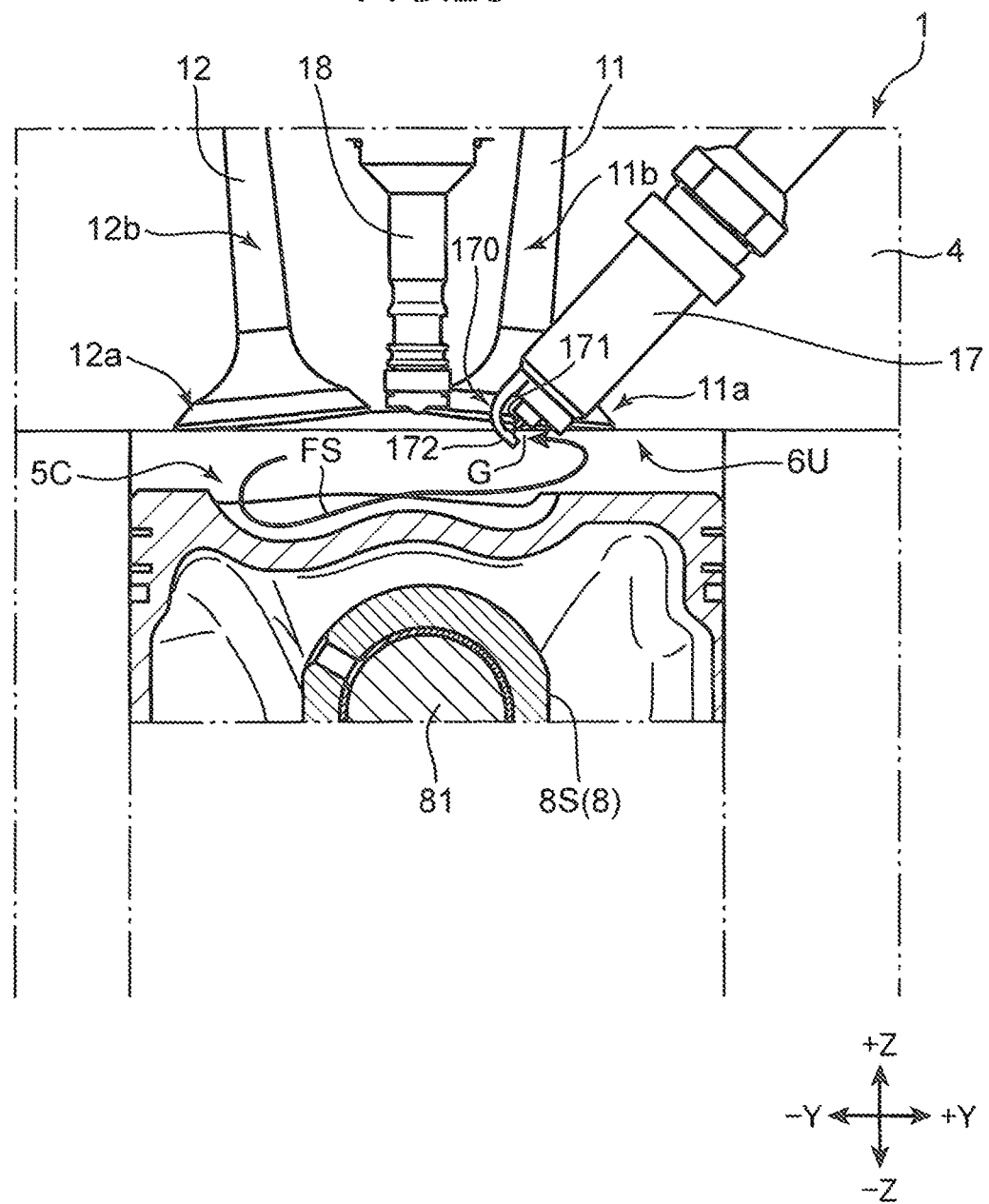
FIG. 25 is a cross-sectional view illustrating a layout of a swirl flow generated within a combustion chamber, and an ignition portion of the ignition plug.
Figure 26:
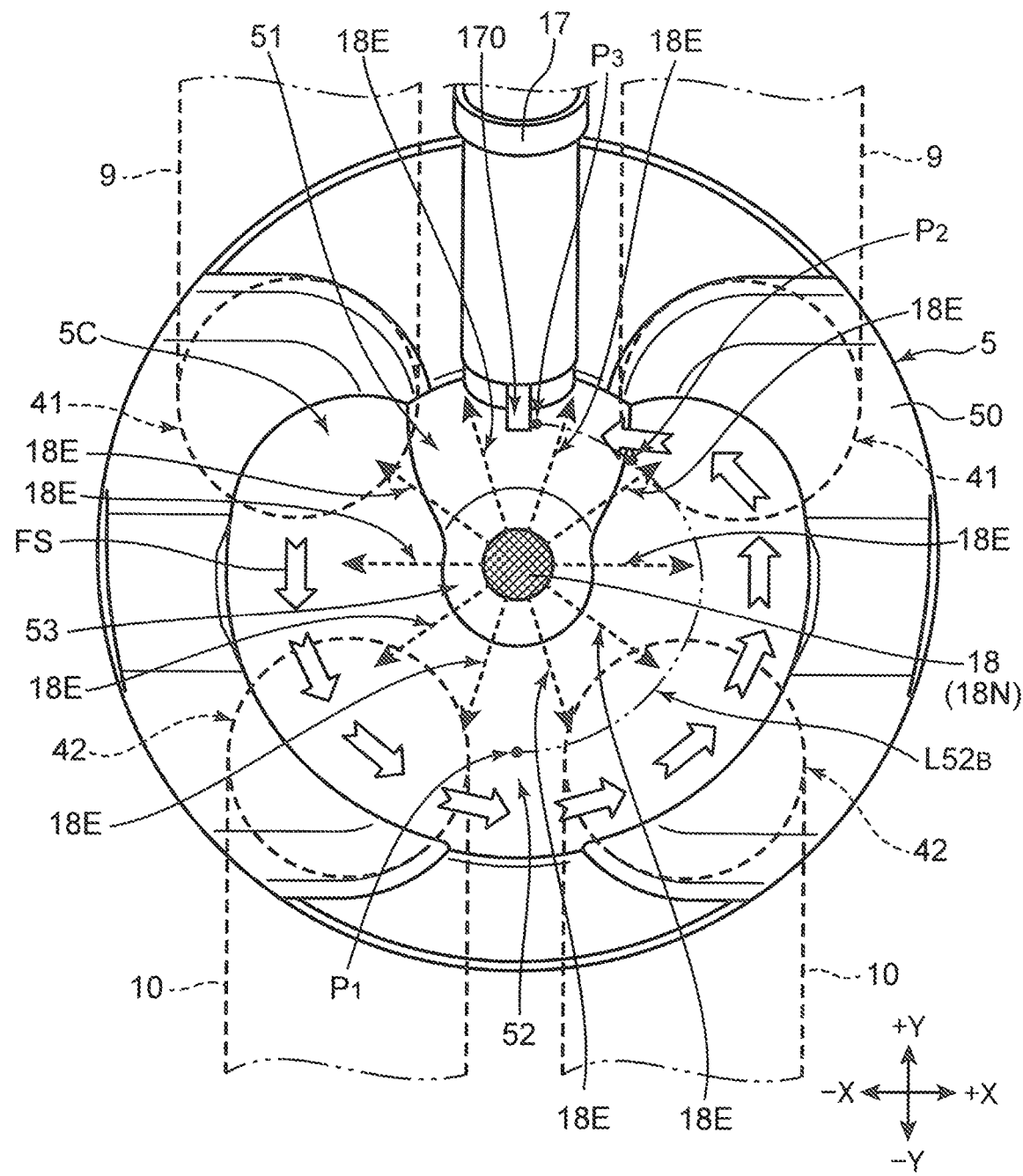
FIG. 26 is a plan view illustrating fuel injected into the combustion chamber, and a swirl flow generated within the combustion chamber.

A swirl flow generated within the combustion chamber 6 is described with reference to FIGS. 25 and 26. FIG. 25 is a cross-sectional view illustrating a swirl flow FS to be generated within the combustion chamber 6. FIG. 26 is a plan view illustrating the swirl flow FS to be generated within the combustion chamber 6.

As illustrated in FIG. 26, fuel is radially injected from the nozzle head 18N of the injector 18, which is disposed at a radially center portion of the combustion chamber 6 (injected fuel 18E). Specifically, fuel is injected from the injector 18 into the large cavity 52 on the −Y side, which is the exhaust port side, and fuel is also injected into the small cavity 51 on the +Y side, which is the intake port side. As described above, a relatively large amount of fuel is injected into the large cavity 52, and a relatively small amount of fuel is injected into the small cavity 51.

Note that fuel injection into the small cavity 51 is controlled in such a way that an axis of injection is not directed toward the ignition portion 170 of the ignition plug 17. Specifically, fuel injection into the small cavity 51 is controlled in such a way that an axis of injection passes through both sides of the ignition portion 170 of the ignition plug 17. This enables to suppress plug wetting phenomenon. Furthermore, in the reference example, a back portion (base portion 174) of a ground electrode 172 of the ignition plug 17 faces the −Y side (radially outwardly of the combustion chamber 6). This also enables to suppress plug wetting phenomenon.

Within the combustion chamber 6, as illustrated by the hollow arrows in FIG. 26, the swirl flow FS is generated in such a way as to circulate an outer rim portion of the annular-shaped cavity 5C (combination of the small cavity 51 and the large cavity 52). And, an air-fuel mixture of fresh air and fuel is guided to the vicinity of the ignition portion 170 of the ignition plug 17 by the swirl flow FS.

When an imaginary line L52B is drawn on a bottom surface of the annular-shaped cavity 5C, the bottom surface is configured in such a way as to rise upwardly (forwardly on the plane of FIG. 26), as extending from a position P1 to a position P3 via a position P2. Therefore, as illustrated in FIG. 25, an air-fuel mixture guided by the swirl flow FS is gradually raised from the −Y side toward the +Z side, as the air-fuel mixture approaches the vicinity of the ignition portion 170 of the ignition plug 17. Thus, within the combustion chamber 6, it is possible to expel residual gas from the vicinity of the ignition portion 170.

6. Advantageous Effects

In the combustion chamber 6 of the engine body 1 according to the reference example, as described with reference to FIG. 16 and the like, the nozzle head 18A of the injector 18 is configured to inject fuel toward the exhaust port side (−Y side) of a relatively high temperature. Thus, it is possible to perform sufficient fuel atomization in a short time, even when fuel is injected when the piston is in the vicinity of a compression top dead center in order to suppress occurrence of pre-ignition.

In addition, as described with reference to FIGS. 16 and 26, in the combustion chamber 6 of the engine body 1 according to the reference example, the large cavity 52 is formed in a region including the crown surface 50 of the piston 5 on the exhaust port side (−Y side). Thus, after fuel is injected into the large cavity 52, the fuel migrates along a shape of a bottom surface of the large cavity 52. Therefore, as compared with a case where a cavity is not formed, it is possible to secure a migration distance of fuel necessary for fuel atomization. And, as described with reference to FIG. 16 and the like, in the combustion chamber 6 of the engine body 1, the injector 18 is disposed on a center portion of the combustion chamber ceiling surface 6U in a plan view from the +Z side. Hence, a distance from the nozzle head 18N of the injector 18 to the large cavity 52 is short, and it is possible to quickly inject fuel into the large cavity 52.

Furthermore, in the combustion chamber 6 of the engine body 1 according to the reference example, as described with reference to FIGS. 23, 24A and 24B, a reverse squish flow generation portion is formed. Thus, it is possible to draw the air-fuel mixture atomized on the exhaust port side (−Y side) toward the ignition portion 170 of the ignition plug 17, as the piston 5 is lowered in an expansion stroke. Therefore, in the reference example, it is possible to cause combustion using oxygen within the entirety of the combustion chamber 6, to suppress that unburnt fuel remains within the combustion chamber 6, and to suppress lowering of emission performance.

Moreover, in the combustion chamber 6 of the engine body 1 according to the reference example, as described with reference to FIG. 16 and the like, the ignition portion 170 of the ignition plug 17 is disposed on the intake port side (+Y side) with respect to a center portion of the combustion chamber ceiling surface 6U. Hence, it is possible to secure cooling efficiency of the ignition portion 170.

Therefore, in the combustion chamber 6 of the engine body 1 according to the reference example, it is possible to perform high-speed combustion and homogeneous combustion within the entirety of the combustion chamber 6, while suppressing occurrence of pre-ignition, even when the engine is operated in a high load operating range.

In the combustion chamber 6 of the engine body 1 according to the reference example, as described with reference to FIG. 23, a reverse squish flow generation portion is formed by a difference in the volume of the combustion chamber between the portion B on the intake port side and the portion A on the exhaust port side. Therefore, as the piston 5 is lowered in an expansion stroke, it is possible to generate an air flow (reverse squish flow) directing from the exhaust port side or the center portion toward the intake port side (+Y side), and it is possible to guide the air-fuel mixture atomized on the exhaust port side toward the ignition portion 170 of the ignition plug 17 on the intake port side. Accordingly, in the combustion chamber 6 of the engine body 1 according to the reference example, it is possible to perform homogeneous combustion within the entirety using oxygen within the combustion chamber 6, and to suppress lowering of emission performance.

Moreover, in the combustion chamber 6 of the engine body 1 according to the reference example, as described with reference to FIGS. 24A and 24B, a reverse squish flow generation portion is formed by a partial region (intake-side top surface portion 43) of the combustion chamber ceiling surface 6U, and a partial region (intake-side flat portion 55) of the crown surface 50 of the piston 5, which are parallel to each other and in proximity to each other. Therefore, it is possible to generate a reverse squish flow within the combustion chamber 6 using a negative pressure in a portion between the above regions (portion indicated by the arrow D in FIG. 24B), which is generated after the piston 5 passes a TDC.

Accordingly, in the combustion chamber 6 of the engine body 1 according to the reference example, it is possible to cause combustion using oxygen within the entirety of the combustion chamber 6, and to suppress lowering of emission performance.

In the reference example, the intake-side top surface portion 43 and the intake-side flat portion 55 are respectively formed of flat surfaces. Therefore, production is easy, as compared with a case where these regions are formed of curved surfaces. Thus, it is possible to form the reverse squish flow generation portion, while suppressing an increase in production cost.

Furthermore, in the combustion chamber 6 of the engine body 1 according to the reference example, the exhaust-side top surface portion 44 and the exhaust-side flat portion 56 are opposed to each other also on the exhaust port side. As illustrated in FIG. 24A, when the piston is in the vicinity of a TDC, the exhaust-side top surface portion 44 and the exhaust-side flat portion 56 are made to be proximate to each other. Therefore, when fuel is injected, it is possible to prevent fuel adhesion on the exhaust port side of a cylinder liner. Thus, in the reference example, it is possible to suppress generation of deposits.

Furthermore, in the combustion chamber 6 of the engine body 1 according to the reference example, an area where the exhaust-side top surface portion 44 and the exhaust-side flat portion 56 are opposed to each other is made smaller than an area where the intake-side top surface portion 43 and the intake-side flat portion 55 are opposed to each other in a plan view from the +Z side. Therefore, it is less likely that generation of a reverse squish flow is obstructed, when the piston 5 is lowered toward the −Z side.

In the combustion chamber 6 of the engine body 1 according to the reference example, as described with reference to FIGS. 25 and 26, a bottom surface of the cavity 5C is formed in such a way that a depth of the cavity 5C gradually decreases from the exhaust port side toward a side of the ignition portion 170 of the ignition plug 17. Therefore, when the piston 5 is lifted, the swirl flow FS within the cavity 5C is raised toward the ignition portion 170 of the ignition plug 17. Thus, an air-fuel mixture of fresh air and fuel is guided to the vicinity of the ignition portion 170 of the ignition plug 17, and it is possible to expel residual gas from the ignition portion 170 and the vicinity thereof.

In addition, in the combustion chamber 6 of the engine body 1 according to the reference example, also in a case where a reverse squish flow generated when the piston 5 is lowered is used, the air-fuel mixture is smoothly guided toward the ignition portion 170 of the ignition plug 17.

In the combustion chamber 6 of the engine body 1 according to the reference example, as described with reference to FIG. 19 and the like, the rim portion of the projection portion 53, and the rim portions (the first rim 510 and the second rim 521) of the small cavity 51 and the large cavity 52 are formed to come into contact with one another at a boundary. Thus, fuel injected from the injector 18 is smoothly guided into the cavities 51 and 52 along the rim portion (skirt portion) of the mountain-shaped projection portion 53. Therefore, in the combustion chamber 6, it is possible to supply fuel into the small cavity 51 and the large cavity 52 with high efficiency, and shorten a time required for atomizing the fuel after the fuel is injected by the injector 18.

In the combustion chamber 6 of the engine body 1 according to the reference example, as illustrated in FIG. 19 and the like, the large cavity 52 has a substantially C-shape in a plan view, and the ignition portion 170 of the ignition plug 17 is disposed above (+Z side) a position (position where the small cavity 51 is formed) where the ignition portion 170 overlaps the C-shaped opened portion of the large cavity 52. Thus, it is possible to guide the air-fuel mixture to the vicinity of the ignition portion 170 actively using the swirl flow FS within the combustion chamber 6 (see FIG. 26 and the like). Therefore, it is possible to secure high ignitability within the combustion chamber 6.

In the combustion chamber 6 of the engine body 1 according to the reference example, it is possible to inject a small amount of fuel into the small cavity 51 at a timing before the ignition plug 17 is ignited. Therefore, in the combustion chamber 6, it is possible to generate sparks by igniting fuel supplied to the small cavity 51. Furthermore, atomization is promoted in the large cavity 52 into which a relatively large amount of fuel is injected. Therefore, in the combustion chamber 6 of the engine body 1, even when a transport speed of air-fuel mixture to the ignition portion 170 of the ignition plug 17 is lowered, it is possible to secure high ignitability without fail.

In the combustion chamber 6 of the engine body 1 according to the reference example, the small cavity 51 and the large cavity 52 are disposed to be adjacent to each other. Thus, it is possible to propagate flame generated within the small cavity 51 into the large cavity 52. Therefore, in the combustion chamber 6, it is possible to perform homogeneous combustion within the entirety of the combustion chamber 6 without leaving unburnt fuel within the combustion chamber 6.

In the combustion chamber 6 of the engine body 1 according to the reference example, the cavity 5C, which is constituted by combination of the small cavity 51 and the large cavity 52, is formed into an annular shape in a plan view. Therefore, as described with reference to FIG. 26, as the piston 5 approaches a TDC, the air-fuel mixture flows from the exhaust port side of a relatively high temperature toward the intake port side of a relatively low temperature, and is guided to the vicinity of the ignition portion 170 of the ignition plug 17. And, as illustrated in FIGS. 16 and 24, since the ignition portion 170 of the ignition plug 17 is disposed to overlap a part of the cavity 5C in a plan view from the +Z side, it is possible to secure high ignitability.

Furthermore, in the combustion chamber 6 of the engine body 1 according to the reference example, since the ceiling surface of the combustion chamber 6 (combustion chamber ceiling surface 6U) is formed into a pent-roof shape, it is possible to generate a tumble flow within the combustion chamber 6, and to enable homogeneous combustion within the entirety of the combustion chamber 6.

Third Embodiment

Next, a structure of a combustion chamber for a spark ignited engine according to a third embodiment is described in detail. Since a basic structure of the third embodiment is the same as the reference example, in the following description, constituent elements common to those in the reference example are indicated with same reference numbers, and description thereof is omitted or simplified; and differences with respect to the structure of a combustion chamber according to the reference example are mainly described in detail.

Figure 27:
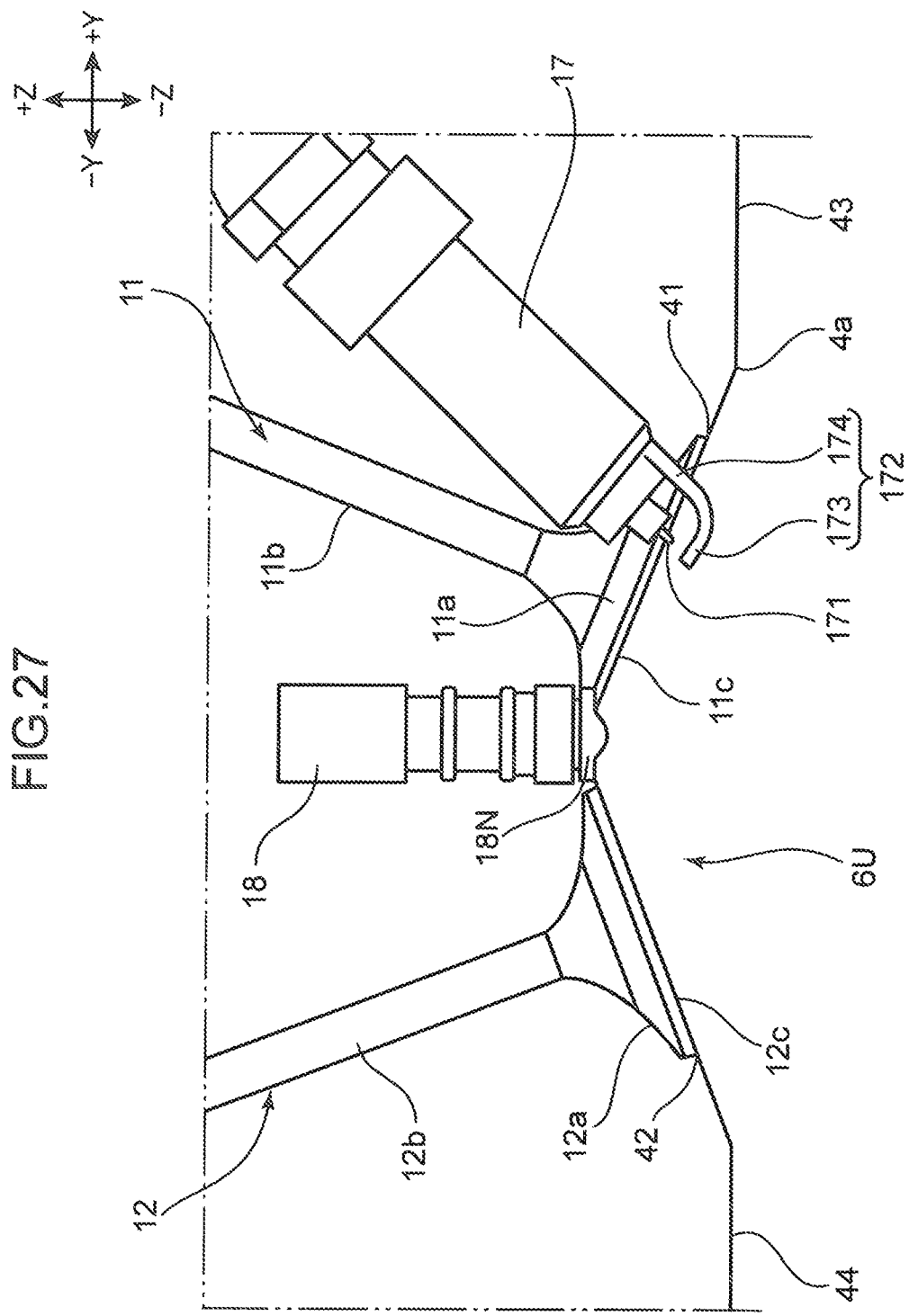
FIG. 27 is a cross-sectional view of essential parts of a cylinder head of an engine to which a structure of a combustion chamber for an engine according to a third embodiment is applied.
Figure 28:
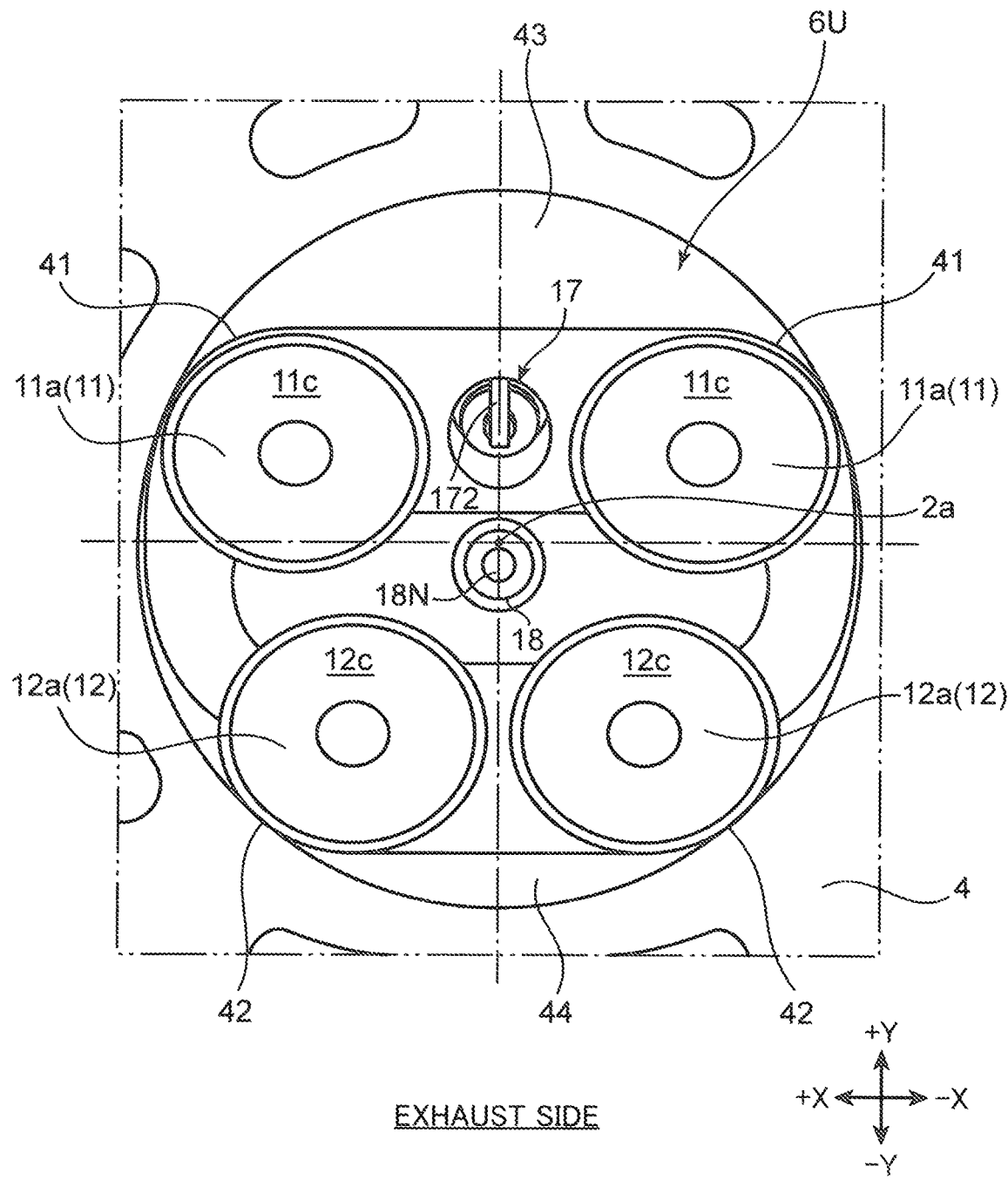
FIG. 28 is a plan view of a combustion chamber ceiling surface.

FIG. 27 is a cross-sectional view of essential parts of a cylinder head of an engine to which the structure of a structure of a combustion chamber for the engine according to the third embodiment is applied. FIG. 28 is a plan view of a combustion chamber ceiling surface.

A combustion chamber ceiling surface 6U has a pent-roof shape, similarly to the reference example. Whereas the combustion chamber ceiling surface 6U in the reference example has a shallow pent-roof shape (a small slope) as illustrated in FIG. 16, the combustion chamber ceiling surface 6U in the third embodiment has a deep pent-roof shape (a large slope). In other words, a combustion chamber 6 in the third embodiment has a structure in which a compression ratio is set small by increasing a volume of the combustion chamber 6, as compared with the reference example.

In the combustion chamber ceiling surface 6U of a deep pent-roof shape as described above, in order to secure, while disposing an injector 18 between the two intake openings 41, a required opening area of each of the intake openings 41, it is necessary to dispose the two intake openings 41 at a position close to a center of a cylinder 2 in the X-direction. In view of the above, in the third embodiment, as illustrated in FIG. 28, a part of each of the two intake openings 41 is disposed to be located on the exhaust port side with respect to a center 2a of the cylinder 2.

Accordingly, the injector 18 (nozzle head 18N) is also disposed to be offset on the exhaust port side with respect to the center 2a of the cylinder 2. An offset amount of the injector 18 is set to such a position that fuel to be injected from the nozzle head 18N when the fuel is injected mainly in the mode II, specifically, in a middle stage of an intake stroke is easily spread, while being carried by a main stream of intake air to be introduced to the combustion chamber 6 through the intake opening 41. In the present example, the injector 18 is offset on the exhaust port side with respect to the center 2a of the cylinder 2 by about 2 mm.

Figure 41:
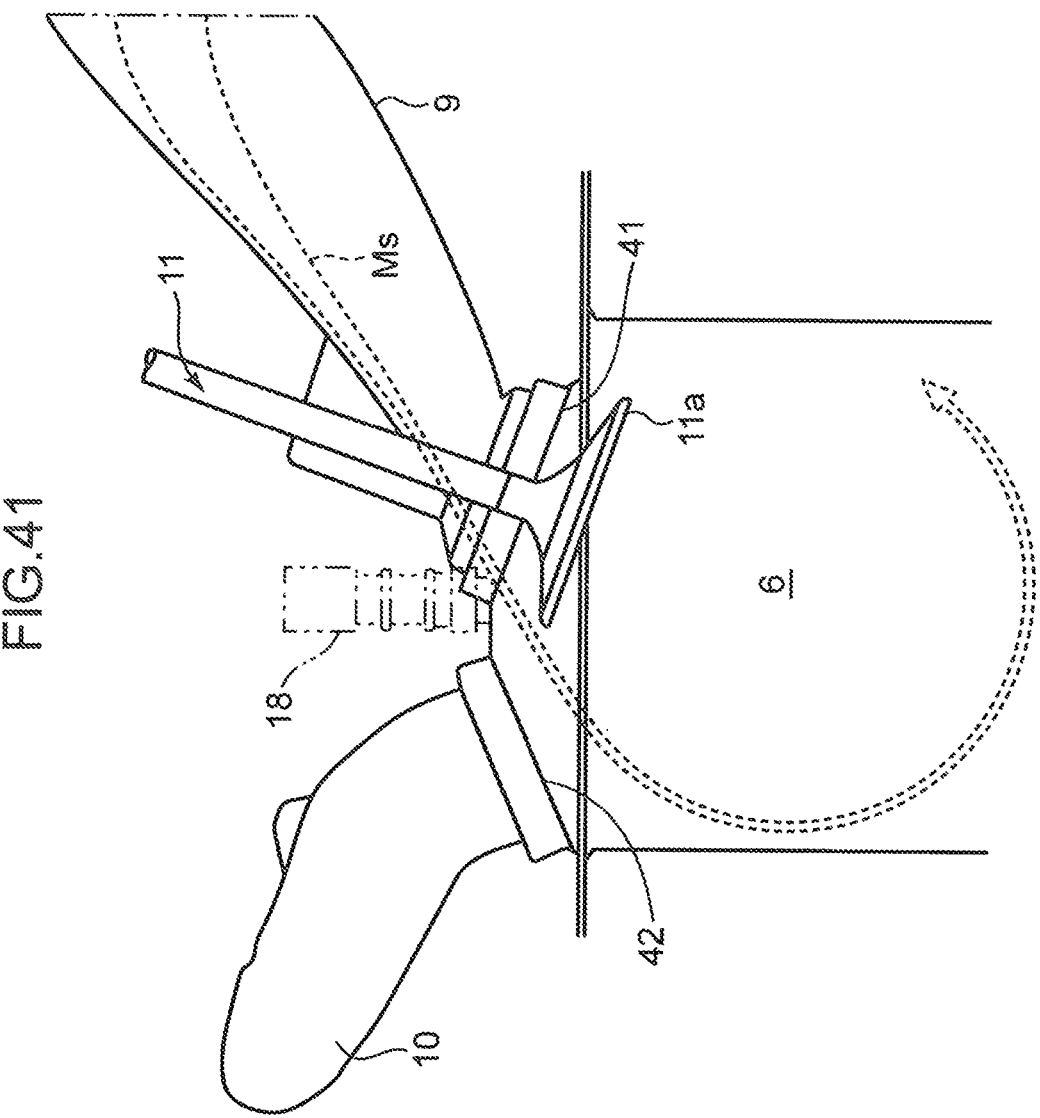
FIG. 41 is a cross-sectional view illustrating a relationship between an intake flow and the injector (nozzle head).

FIG. 41 is a cross-sectional view illustrating a relationship between a flow of intake air in a middle stage of an intake stroke, and the injector 18. As illustrated in FIG. 41, a main stream Ms of intake air to be introduced to the combustion chamber 6 through an intake port 9 generates a tumble flow, while being introduced to the combustion chamber 6 along an upper wall surface of the intake port 9. In this state, when the center of the injector 18 is aligned with the center 2a of the cylinder 2, a part of fuel is injected from the nozzle head 18N at a position lower than the main stream Ms of intake air, and may not be carried by the main stream Ms of intake air. On the other hand, in a configuration in which the injector 18 is offset on the exhaust port side with respect to the center 2a of the cylinder 2, fuel is injected from the nozzle head 18N at a position above or in the vicinity of the main stream Ms of intake air. Hence, the fuel is easily spread while being carried by the main stream Ms of intake air.

In the present embodiment, the center of the injector 18 (nozzle head 18N) is offset on the exhaust port side with respect to the center 2a of the cylinder 2 by about 2 mm. The offset amount in this case may be set to such an amount that fuel to be injected from the injector 18 is spread in a satisfactory manner, while being carried by the main stream Ms of intake air. For example, preferably, the center of the injector 18 (nozzle head 18N) may be offset on the exhaust port side with respect to the center 2a of the cylinder 2 in a range of 2 to 5% of a diameter (bore diameter) of the cylinder 2.

A configuration of a crown surface 50 of a piston 5 in the third embodiment is similar to the reference example in a point that the crown surface 50 includes a cavity 5C, an intake-side flat portion 55, an exhaust-side flat portion 56, and a pair of lateral upper surfaces 57. However, a specific structure is different from the reference example in the following points.

Figure 29:
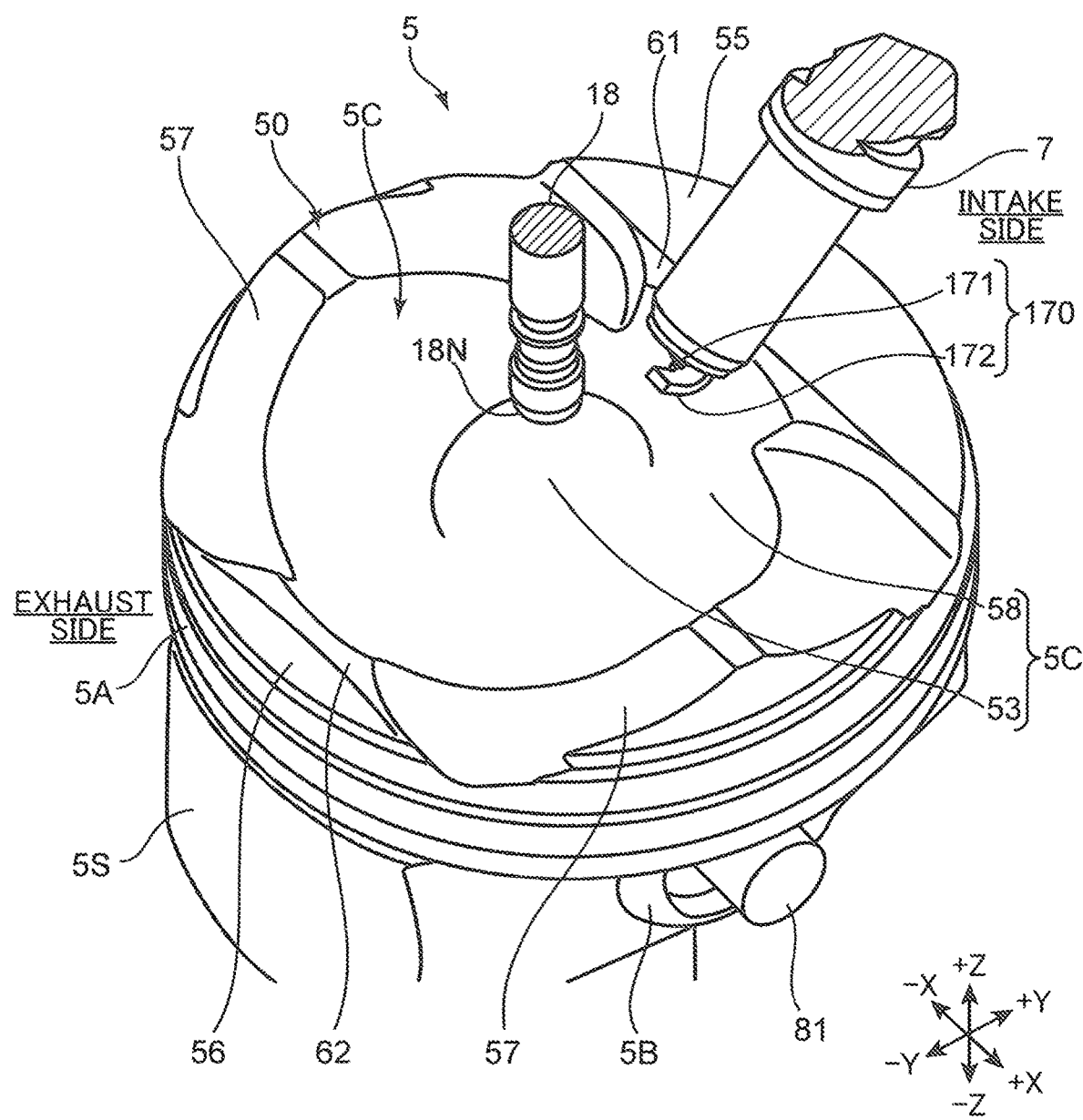
FIG. 29 is a perspective view illustrating a layout of an ignition plug and an injector with respect to a piston.
Figure 30:
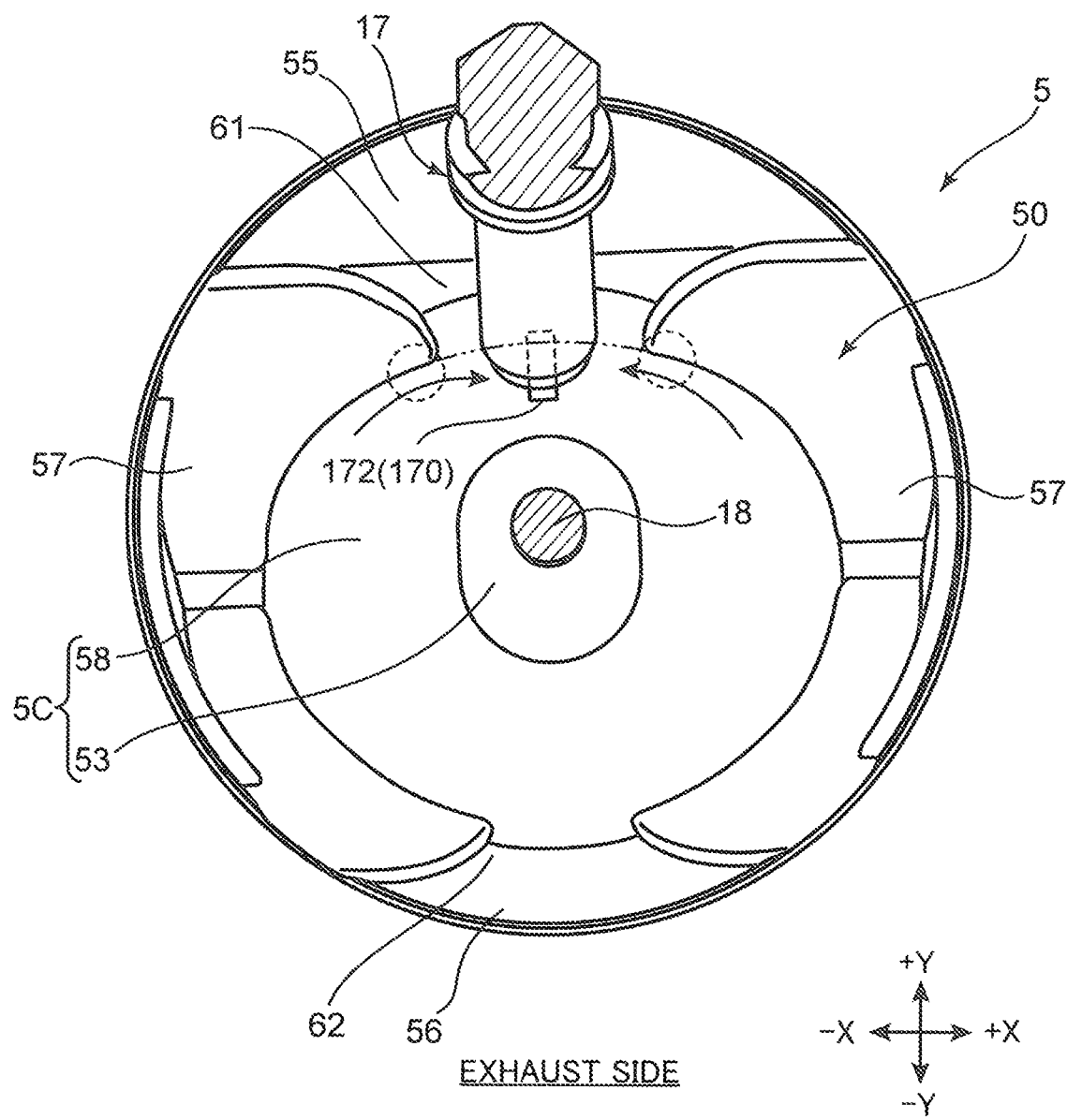
FIG. 30 is a plan view illustrating a layout of the ignition plug and the injector with respect to the piston.
Figure 31:
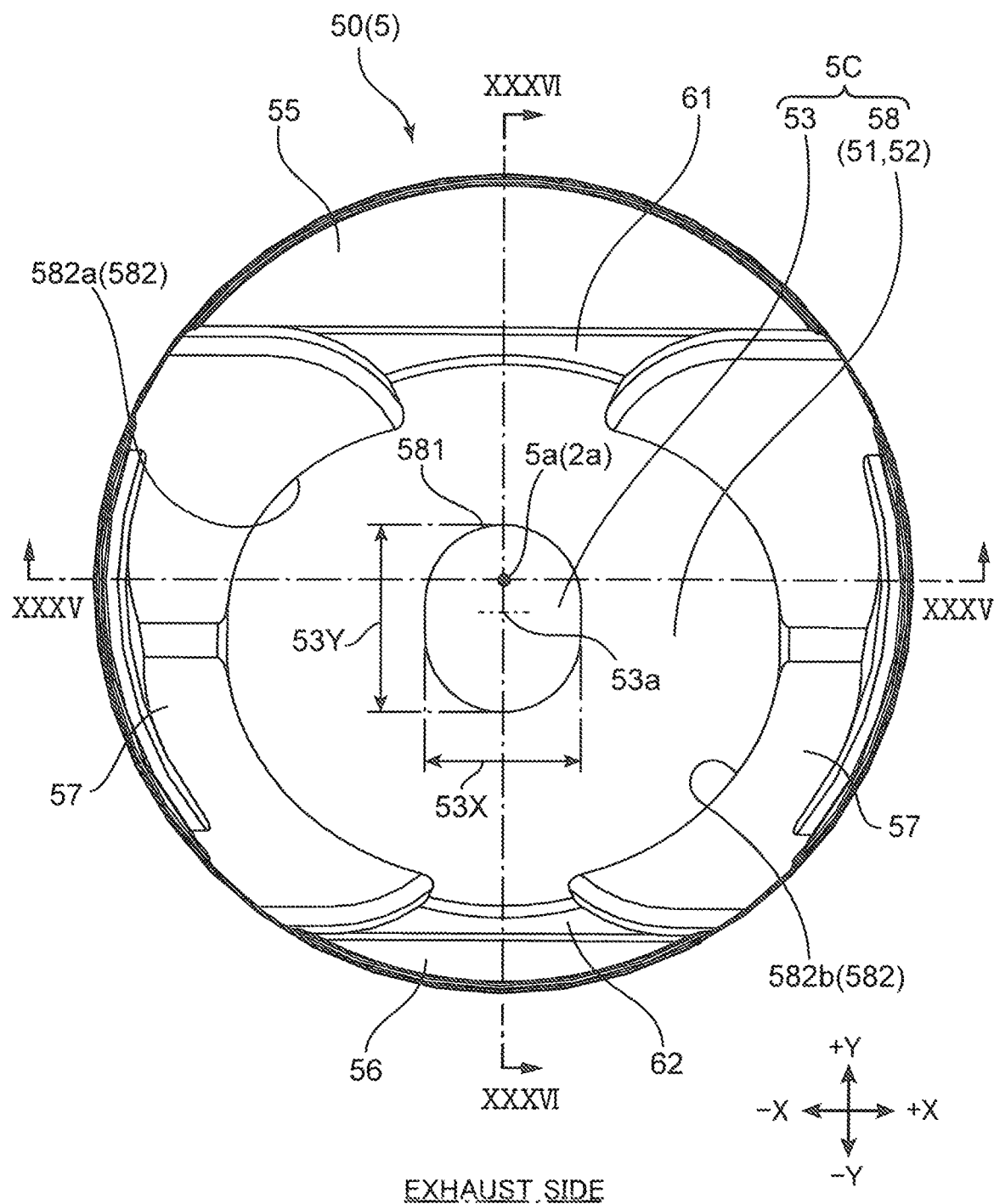
FIG. 31 is a plan view of a crown surface of the piston.
Figure 32:
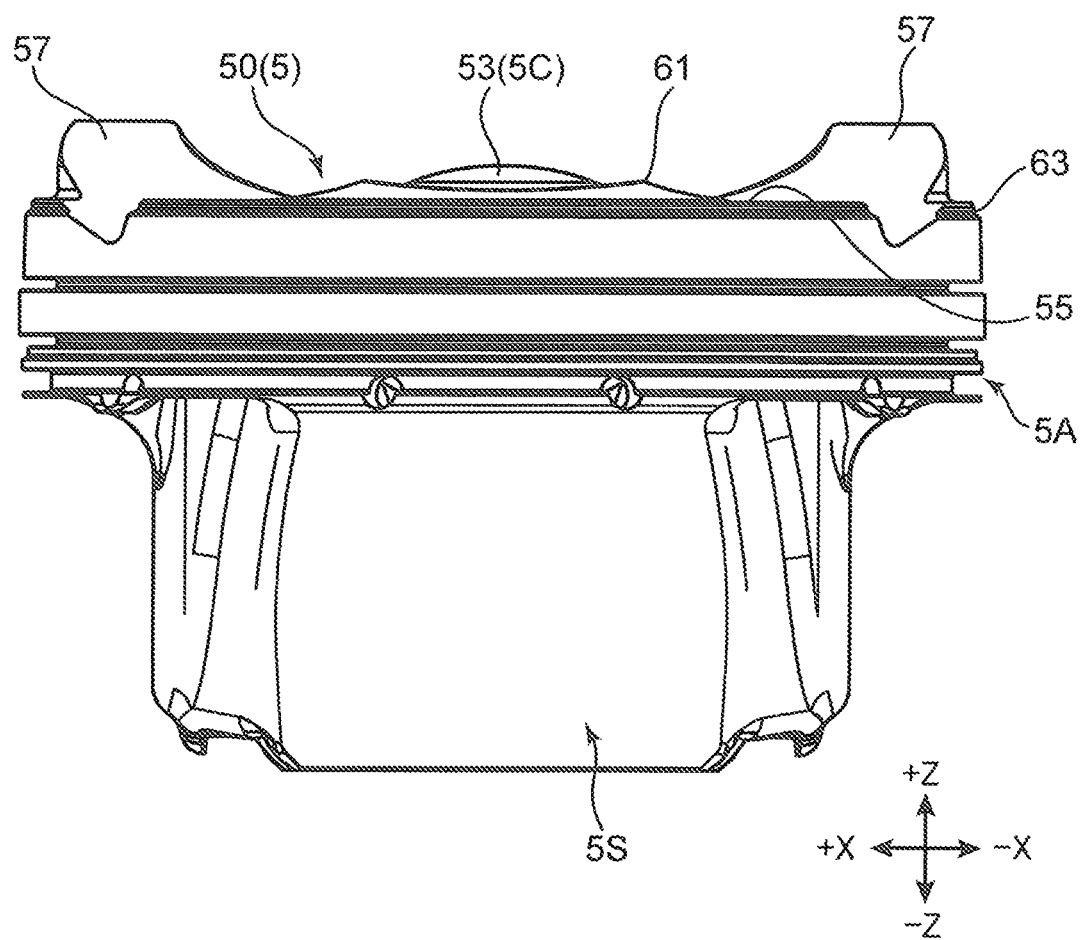
FIG. 32 is a front view of the piston (diagram viewed from an intake side).
Figure 33:
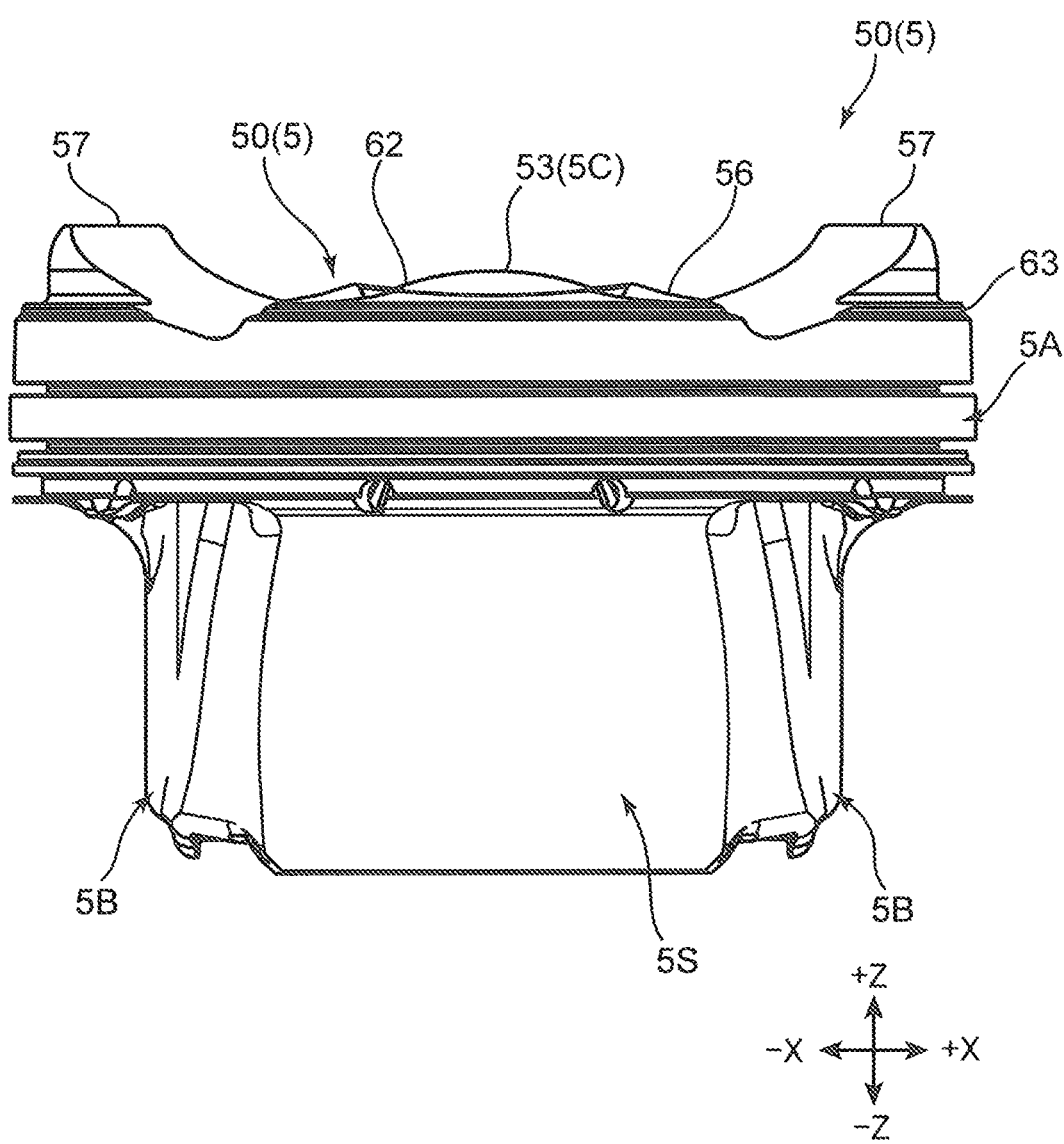
FIG. 33 is a rear view of the piston (diagram viewed from an exhaust side).
Figure 34:
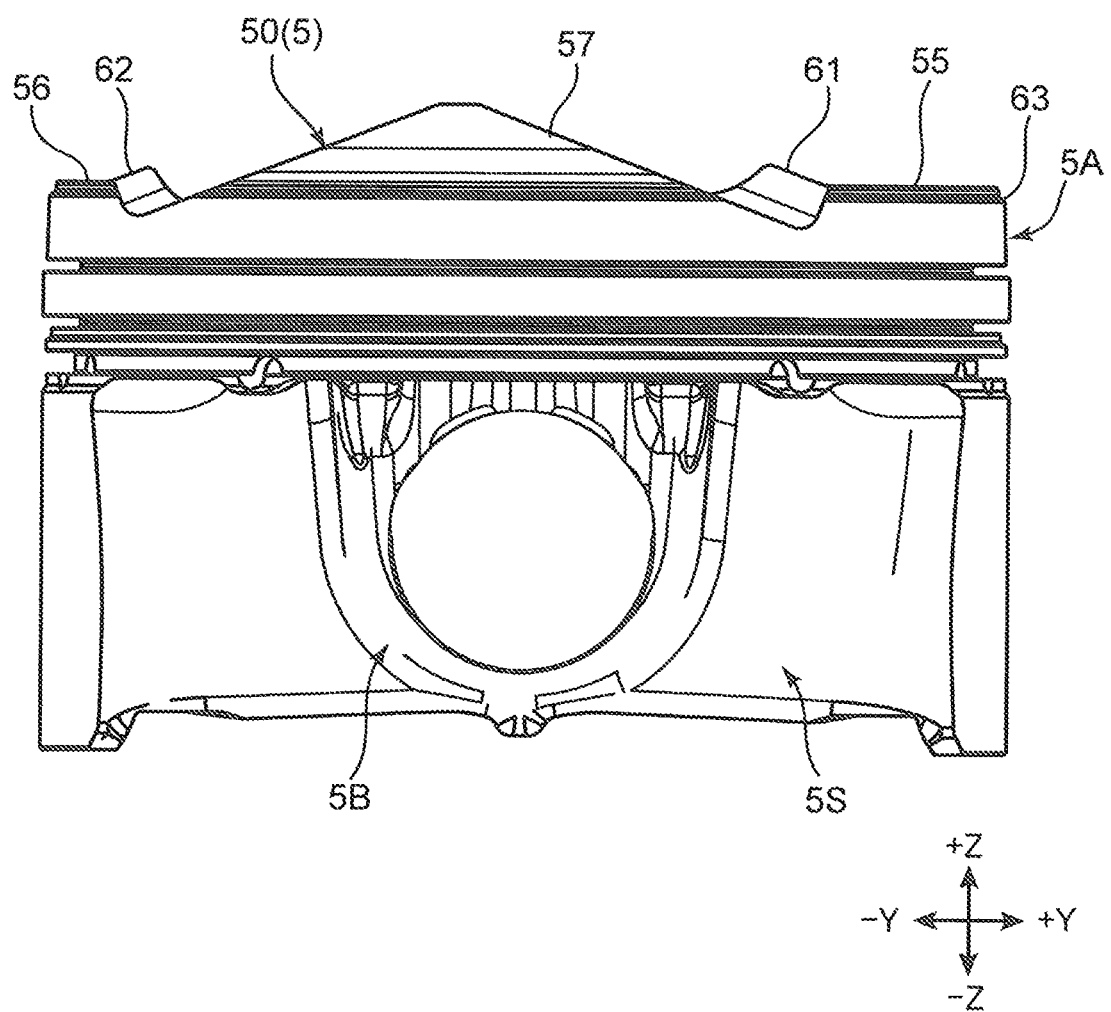
FIG. 34 is a side view of the piston.
Figure 35:
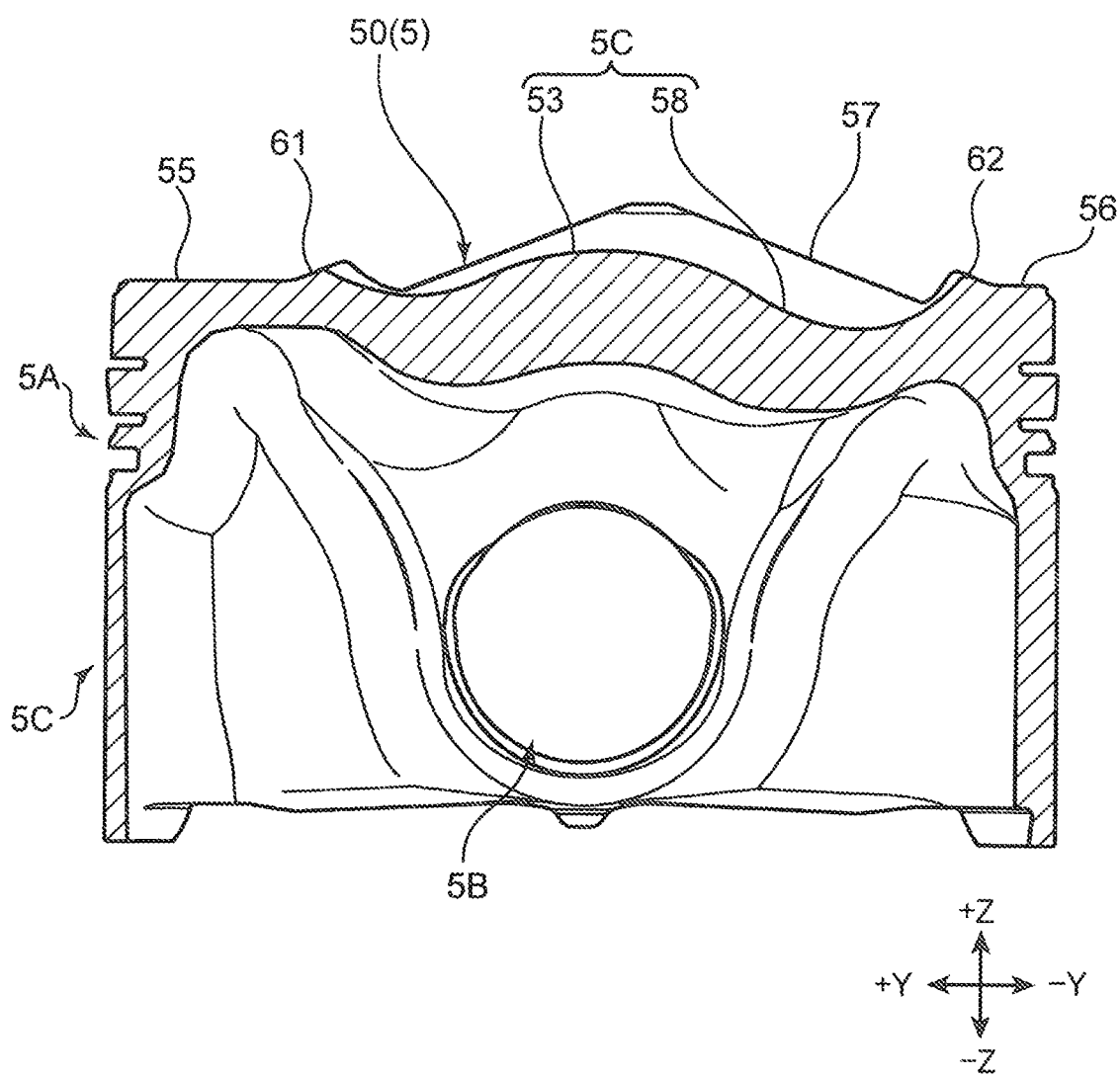
FIG. 35 is a cross-sectional view taken along the line XXXV-XXXV in FIG. 31.
Figure 36:
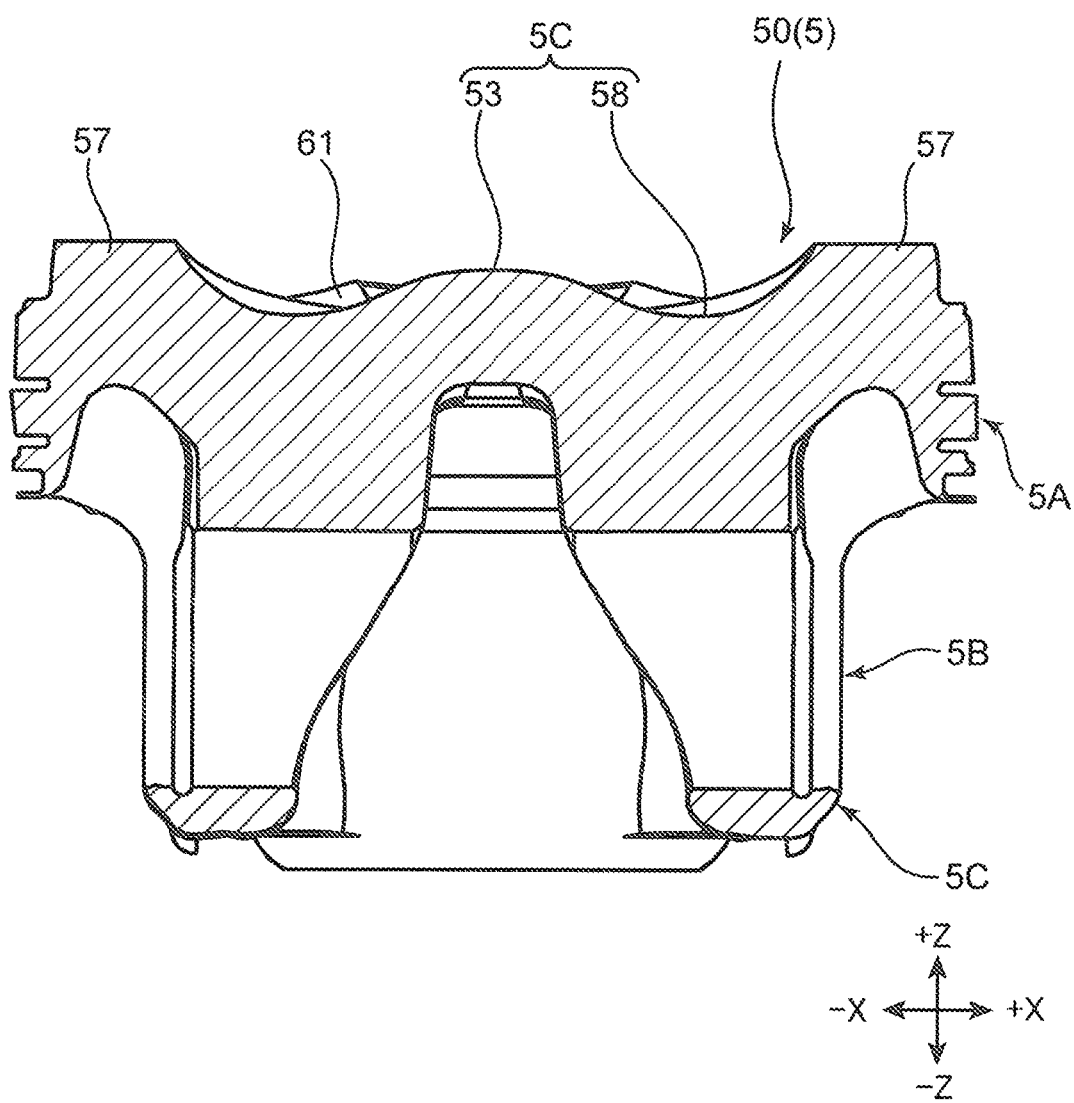
FIG. 36 is a cross-sectional view taken along the line XXXVI-XXXVI in FIG. 31.
Figure 37:
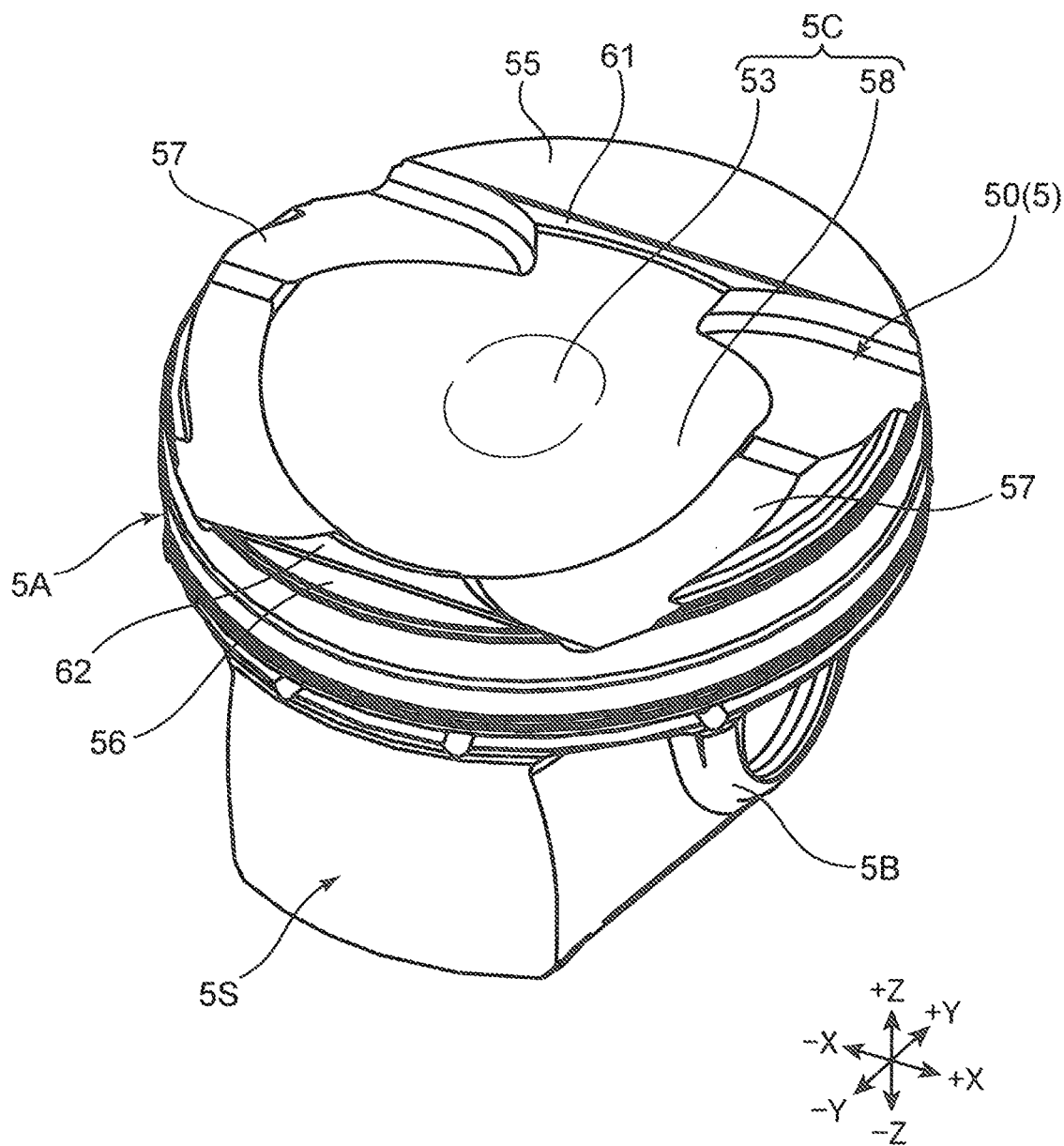
FIG. 37 is a perspective view of the piston (perspective view from the exhaust side).
Figure 38:
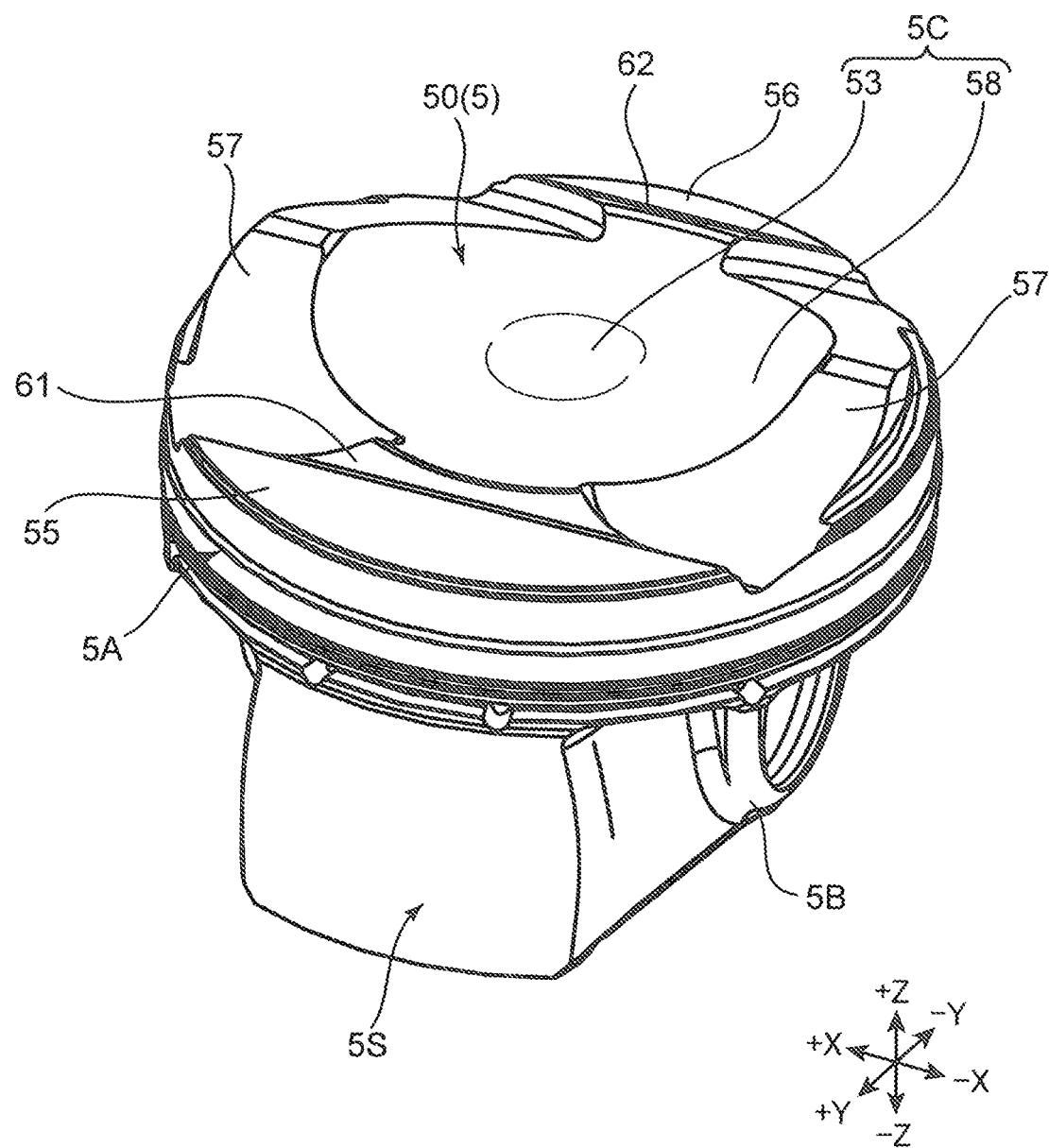
FIG. 38 is a perspective view of the piston (perspective view from the intake side).

FIG. 29 is a perspective view illustrating a layout relationship between an ignition plug 17 and the injector 18 with respect to the piston 5. FIG. 30 is a plan view illustrating the layout relationship. FIG. 31 is a plan view of the crown surface 50 of the piston 5. FIGS. 32 to 34 are respectively a front view (diagram viewed from the intake port side), a rear view (diagram viewed from the exhaust port side), and a side view of the piston 5. FIGS. 35 and 36 are respectively cross-sectional views taken along the line XXXV-XXXV and the line XXXVI-XXXVI in FIG. 31. Further, FIG. 37 is a perspective view of the piston 5 viewed from the exhaust side, and FIG. 38 is a perspective view of the piston 5 viewed from the intake port side.

The cavity 5C in the third embodiment has a smoothly continued shape, unlike a configuration in which a small cavity 51 and a large cavity 52 are partitioned by a ridge line 54 (in other words, without via a ridge line 54). That is, as illustrated in FIG. 31, the cavity 5C includes a projection portion 53, and one annular cavity (hereinafter, referred to as an annular cavity 58), which is smoothly continued in such a way as to surround the projection portion 53. Although the annular cavity 58 is not partitioned by a ridge line 54, similarly to the reference example, a bottom surface of the annular cavity 58 (cavity 5C) is gradually raised upwardly (toward the +Z side), as extending from the exhaust side toward a position immediately below an ignition portion 170 of the ignition plug 17. Furthermore, the paired lateral upper surfaces 57 are formed to have a mountain shape projecting upwardly (toward the +Z side) in association with the combustion chamber ceiling surface 6U in the third embodiment.

As illustrated in FIGS. 31 to 34, regarding the crown surface 50, an intake-side slope portion 61 is formed between the intake-side flat portion 55 and the annular cavity 58, and between the paired lateral upper surfaces 57; and an exhaust-side slope portion 62 is formed between the exhaust-side flat portion 56 and the annular cavity 58, and between the paired lateral upper surfaces 57.

Figure 39:
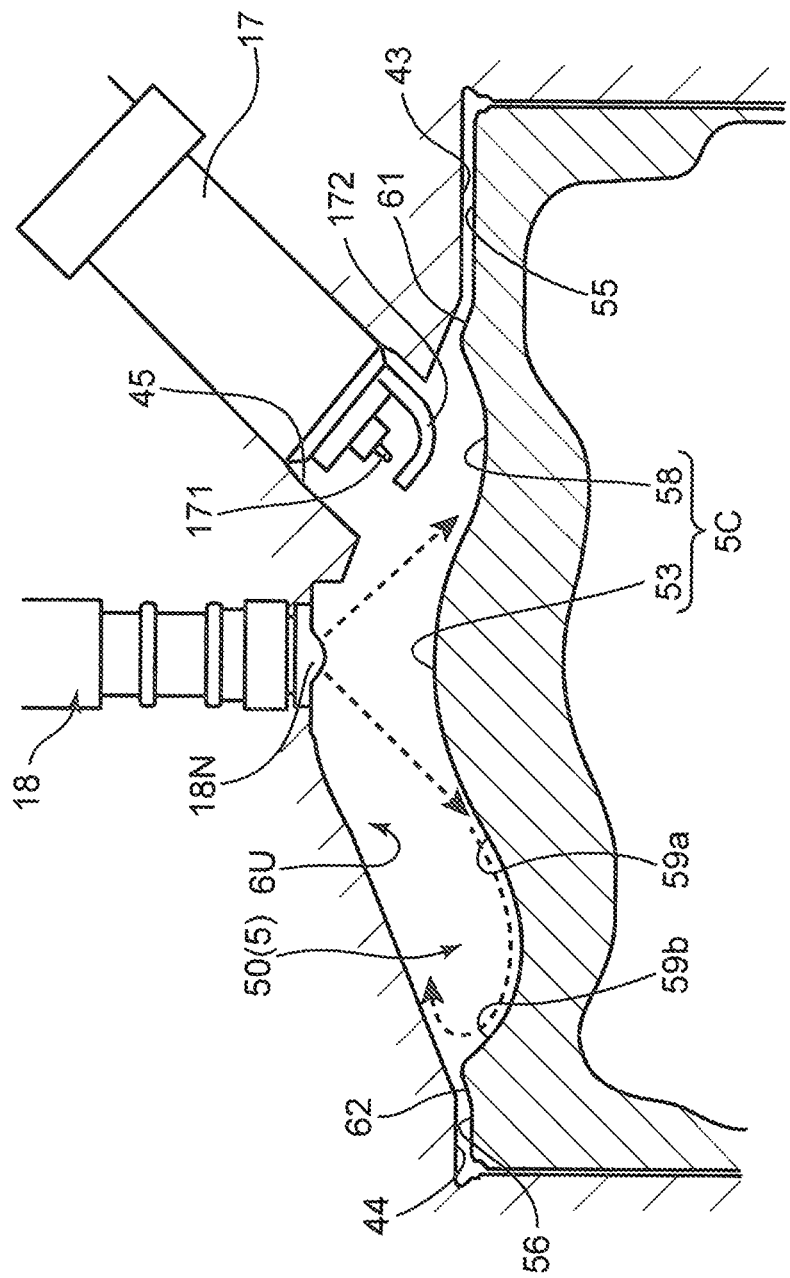
FIG. 39 is a cross-sectional view illustrating a combustion chamber, when the piston is at a top dead center.

The intake-side slope portion 61 is a flat slope inclined obliquely upwardly from a distal end of the intake-side flat portion 55 toward the exhaust port side. The exhaust-side slope portion 62 is a flat slope inclined obliquely upwardly from a distal end of the exhaust-side flat portion 56 toward the intake side. As illustrated in FIG. 39, each of the slope portions 61 and 62 is a surface, which is in proximity to and opposed to a pent-roof portion of the combustion chamber ceiling surface 6U, and extends substantially in parallel to the pent-roof portion, when the piston 5 is in a top dead center position.

The annular cavity 58 is formed off-center on the exhaust port side in the crown surface 50. As illustrated in FIG. 31, the projection portion 53 has a size 53Y in the Y-direction larger than a size 53X in the X-direction, when viewed in the cylinder axis direction, in other words, has an oval shape (elliptical shape) being long in the Y-direction and thin. A center 53a of the projection portion 53 is offset on the exhaust port side with respect to a center 5a of the crown surface 50 (center 2a of the cylinder 2) in association with the injector 18. Thus, the center of the projection portion 53 is located at a position immediately below the injector 18 (nozzle head 18N).

The annular cavity 58 includes an inner rim 581 and an outer rim 582, which are perimeters for defining the annular cavity 58. The inner rim 581 serves as a borderline with respect to the projection portion 53, and the outer rim 582 serves as a borderline with respect to the intake-side slope portion 61, the exhaust-side slope portion 62, and the lateral upper surfaces 57.

Regarding the outer rim 582, a portion (exhaust-side outer rim 582b), which is on the exhaust side with respect to the center 5a (line XXXV-XXXV in FIG. 31) of the crown surface 50 and serves as a borderline with respect to the lateral upper surface 57, has an arc shape along a substantially true circle with respect to the center 5a as a center. On the other hand, a portion (intake-side outer rim 582a), which is on the intake port side with respect to the center 5a of the crown surface 50 and serves as a borderline with respect to the lateral upper surface 57, has an arc shape along an ellipse with respect to the center 5a as a center, or an oblong circle with a long length in the X-direction. As a result of the annular cavity 58 and the projection portion 53 being formed in this way, the annular cavity 58 is off-center on the exhaust port side in the crown surface 50.

Figure 40:
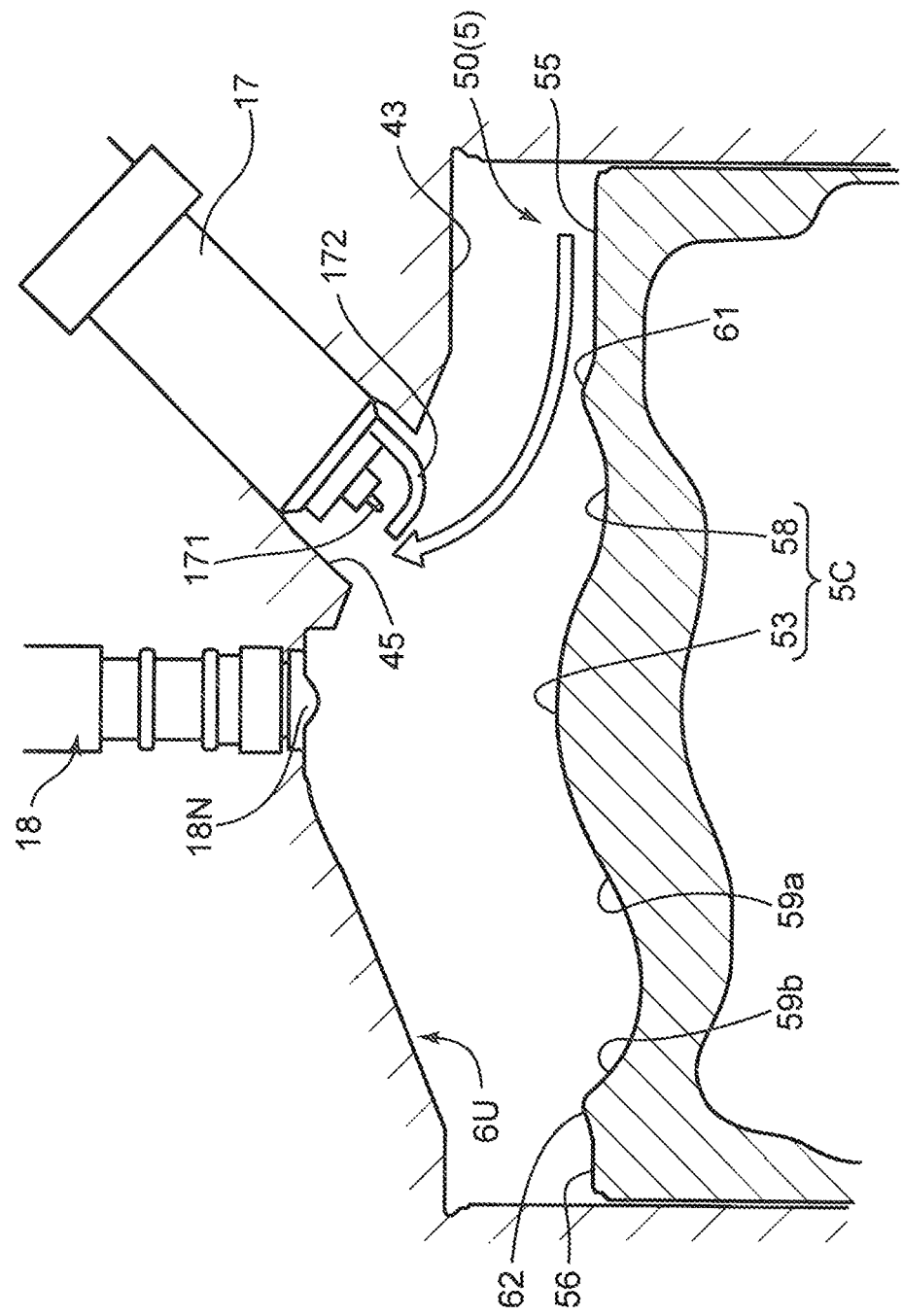
FIG. 40 is a cross-sectional view illustrating the combustion chamber in a compression stroke.

In the third embodiment, as illustrated in FIGS. 27 and 29, the ignition plug 17 is disposed on the combustion chamber ceiling surface 6U in a direction opposite to the reference example. In concrete terms, the ignition plug 17 is disposed, within a plug recess portion 45 formed in the combustion chamber ceiling surface 6, in such a way that a distal end of a ground electrode 172, specifically, a distal end of an opposing portion 173 on a side opposite to a base portion faces radially inwardly of the combustion chamber 6 when viewed in the cylinder axis direction. In the third embodiment in which the combustion chamber ceiling surface 6U has a deep pent-roof shape, and the intake-side slope portion 61 is formed on the crown surface 50, with the ignition plug 17 being disposed in this way, the scavenging effect around the ignition portion 170 in a compression stroke is enhanced. That is, in the third embodiment in which the intake-side slope portion 61 associated with a pent-roof portion of the combustion chamber ceiling surface 6U is formed on the crown surface 50 of the piston 5, as intake air or an air-fuel mixture is compressed in a portion between the intake-side top surface portion 43 of the combustion chamber ceiling surface 6U and the intake-side flat portion 55 of the piston 5 in a compression stroke, a squish flow flowing toward the combustion chamber ceiling surface 6U along the intake-side slope portion 61 is generated, as illustrated by the arrow in FIG. 40. At this occasion, with the ignition plug 17 being disposed in such a way that a distal end of the ground electrode 172 faces radially inwardly of the combustion chamber 6, residual gas within the plug recess portion 45 is easily expelled by the squish flow. In other words, the scavenging effect around the ignition portion 170 is enhanced.

The cavity shape of the annular cavity 58 is formed into a shape capable of smoothly raising fuel injected from the injector 18 along the combustion chamber ceiling surface 6U, when the piston 5 is in a compression top dead center position or in the vicinity thereof in the mode I. Specifically, as illustrated in FIG. 39, the annular cavity 58 includes: an entrance portion 59a, which is located on an inner peripheral side of the annular cavity 58 and is configured to guide fuel injected from the injector 18 outwardly along the projection portion 53, when the piston 5 is in a compression top dead center position or in the vicinity thereof; and a raising portion 59b, which is located on an outer peripheral of the entrance portion 59a and raises the fuel guided along the entrance portion 59a toward the combustion chamber ceiling surface 6U. The entrance portion 59a has an arc shape in cross section, which is smoothly continued to the projection portion 53. The raising portion 59b has an arc shape in cross section, which has a curvature radius smaller than a curvature radius of the entrance portion 59a. On a portion of the annular cavity 58 associated with the intake-side slope portion 61 and the exhaust-side slope portion 62, the raising portion 59b is raised high by a height corresponding to an area where the slope portions 61 and 62 are formed. Thus, as illustrated by the broken-line arrows in FIG. 39, fuel injected from the nozzle head 18N is advantageously raised along a pent-roof portion of the combustion chamber ceiling surface 6U, and fuel atomization is promoted.

Portions (portions surrounded by the broken-line circles in FIG. 30) associated with distal ends of the paired lateral upper surfaces 57 on the intake-side outer rim 582a of the annular cavity 58 are curved and directed to the ignition portion 170 of the ignition plug 17 when viewed in the cylinder axis direction. Specifically, when it is assumed that the intake-side outer rim 582a extends from portions associated with distal ends of the paired lateral upper surfaces 57, portions associated with the distal ends of the paired lateral upper surfaces 57 on the intake-side outer rim 582a are formed in such a way that the intake-side outer rim 582a passes through the ignition portion 170. Thus, as illustrated by the arrows in FIG. 30, an air-fuel mixture flowing from the exhaust port side toward the intake port side along the annular cavity 58 is guided toward the ignition portion 170.

In the piston 5 in the third embodiment, as illustrated in FIGS. 32 to 34, a step portion 63 is formed on an outer periphery of an upper end of a piston head portion 5A of the piston 5. The step portion 63 forms a gap, through which unburnt gas escapes, between an outer peripheral surface of the upper end of the piston head portion 5A and an inner peripheral surface of the cylinder 2 in an expansion stroke. Thus, occurrence of knocking phenomenon is suppressed.

The structure of a combustion chamber according to the third embodiment is as described above. The structure of a combustion chamber according to the third embodiment is configured in such a way that the combustion chamber ceiling surface 6U has a deep pent-roof shape in order to reduce a compression ratio by increasing a volume of the combustion chamber 6. However, a basic structure of the third embodiment is the same as the reference example. Therefore, the structure of a combustion chamber according to the third embodiment is also able to provide operations and advantageous effects substantially equivalent to those of the structures of a combustion chamber according to the reference example. Specifically, the nozzle head 18N is configured to inject fuel toward the exhaust port side (−Y side) of a relatively high temperature. Thus, even when fuel is injected when the piston is in the vicinity of a compression top dead center in order to suppress occurrence of pre-ignition, it is possible to perform sufficient fuel atomization within a short time. In addition, fuel migrates along a shape of a bottom surface of the annular cavity 58 after having been injected into the annular cavity 58. Hence, as compared with a case where a cavity is not formed, it is possible to secure a migration distance of fuel necessary for fuel atomization. Furthermore, when the piston 5 is lowered toward the −Z side in an expansion stroke, a reverse squish flow which draws an air-fuel mixture toward the intake port side is generated, and it is possible to cause combustion using oxygen within the entirety of the combustion chamber 6, and to suppress lowering of emission performance.

Furthermore, when the piston 5 is lifted toward the +Z side in a compression stroke, a swirl component (swirl flow FS) within the annular cavity 58 is raised toward the ignition portion 170 of the ignition plug 17. Therefore, it is possible to expel residual gas in the vicinity of the ignition portion 170 of the ignition plug 17 to thereby improve ignition stability.

7. Modifications

In the foregoing, the reference example is described. A specific configuration of the present invention, however, is not limited to the above. For example, the following modifications can be employed.

(1) In the above reference example, an example in which the small cavity 51 and the large cavity 52 are disposed to come into contact with each other via the ridge line 54 is described. The present invention, however, is not limited to the above. For example, a small cavity as a first cavity and a large cavity as a second cavity may be disposed to be substantially adjacent to each other in terms of flow (swirl flow FS) of air-fuel mixture, and flame propagation. The small cavity and the large cavity may be away from each other in terms of structure.

Furthermore, in the above reference example, the cavity 5C is formed by combination of the small cavity 51 and the large cavity 52. Alternatively, an integral annular cavity may be formed, or an annular cavity may be formed by combination of three or more cavities.

In addition, it is not necessarily required to form the first cavity, and the second cavity may be formed at least in a region on the exhaust port side.

(2) In the above reference example and the third embodiment, each of the intake-side flat portion 55 and the intake-side top surface portion 43 is formed of a flat surface. The present invention, however, is not limited to the above. For example, the intake-side flat portion 55 and the intake-side top surface portion 43 may be formed of curved surfaces opposed to each other.

(3) In the above reference example, regarding the small cavity 51 and the large cavity 52 formed in the crown surface 50 of the piston 5, a configuration in which a projection area of the large cavity 52 is larger than a projection area of the small cavity 51, and the depth h2 of the large cavity 52 is deeper than the depth h1 of the small cavity 51 is described as an example. The present invention, however, is not limited to the above. For example, it is possible to make a volume of the large cavity larger than a volume of the small cavity only by a difference in projection area, while setting the depths of the large cavity and the small cavity equal to each other.

(4) In the above reference example and the third embodiment, an example in which the two intake openings 41 are formed in the combustion chamber ceiling surface 6U is described. Alternatively, it is possible to employ a configuration, in which a swirl control valve is provided in an intake port 9 communicating with one of the intake openings 41, and which is able to actively generate the swirl flow FS within the combustion chamber 6.

In a case where the swirl flow FS is actively used, it is easy to generate a swirl flow being a vortex flow around a cylinder shaft (cylinder axis) by closing one of the intake openings 41 by the swirl control valve. In view of the above, for example, it is desirable to operate the swirl control valve in SI combustion or SICI combustion (mode II).

(5) In the above reference example and the third embodiment, the intake opening 41 and the exhaust opening 42 are opened in the combustion chamber ceiling surface 6U. The present invention, however, is not limited to the above. For example, the intake opening 41 and the exhaust opening 42 may be opened in a lateral peripheral surface of the cylinder 2 in an upper portion of the combustion chamber 6.

(6) In the above reference example and the third embodiment, a ceiling surface (combustion chamber ceiling surface 6U) of the combustion chamber 6 is formed into a flat pent-roof shape. The present invention, however, is not limited to the above. For example, the combustion chamber ceiling surface 6U may be formed into a pent-roof shape having a higher ratio. This is advantageous in generating a strong tumble flow.

(7) In the above reference example, a reverse squish flow generation portion is formed by a difference in the volume of the combustion chamber between the portion A and the portion B as illustrated in FIG. 23, and combination of the intake-side flat portion 55 and the intake-side top surface portion 43 as illustrated in FIGS. 24A and 24B. The present invention, however, is not limited to the above. For example, a reverse squish flow generation portion may be formed only by a difference in the volume of the combustion chamber between the portion A and the portion B. Conversely, a reverse squish flow generation portion may be formed only by combination of the intake-side flat portion 55 and the intake-side top surface portion 43.

The following is an overview of the present invention on the basis of the first to third embodiments described above.

A structure of a combustion chamber for a spark ignited engine according to one aspect of the present invention includes: a crown surface of a piston; a cylinder wall surface along which the piston is slidingly movable; a combustion chamber ceiling surface formed on a cylinder head; and an ignition plug, which is mounted on the combustion chamber ceiling surface, includes an ignition portion disposed in such a way as to face the combustion chamber, and is configured to ignite at a predetermined timing, when the piston is at a compression top dead center or in the vicinity thereof. The crown surface of the piston includes: a cavity which is recessed in a cylinder axis direction in a region including a position below the ignition portion of the ignition plug in a plan view in the cylinder axis direction; a parallel surface portion, which is formed on a part of an outer peripheral portion surrounding the cavity in a plan view in the cylinder axis direction, and is parallel to a corresponding region with a gap when the piston is at a compression top dead center, the corresponding region including a position above the cylinder axis direction on the combustion chamber ceiling surface; and an inclined surface portion, which is formed in a region between the parallel surface portion and a rim of the cavity in a plan view in the cylinder axis direction, is formed to be continued from the parallel surface portion, and is formed to be directed to the ignition portion of the ignition plug when the piston is at a compression top dead center. A combination of the parallel surface portion and the corresponding region constitutes a squish flow generation portion which generates a squish flow when the piston is lifted.

In the structure of a combustion chamber for the engine according to the above aspect, the inclined surface portion is formed to be directed to the ignition portion of the ignition plug, when the piston is at a compression top dead center. Thus, it is possible to feed a squish flow generated in the squish flow generation portion constituted by combination of the parallel surface portion and the corresponding region toward the ignition portion. Therefore, the structure of a combustion chamber for the engine according to the above aspect is able to expel residual gas from the ignition portion of the ignition plug and its periphery using the squish flow.

Furthermore, in the structure of a combustion chamber for the engine according to the above aspect, since the cavity is formed in the crown surface of the piston, it is possible to set a long migration distance of fuel and fresh air, and to securely perform fuel atomization before ignition is performed.

Accordingly, in the structure of a combustion chamber for the engine according to the above aspect, by forming the cavity in the crown surface of the piston, it is possible to securely expel residual gas in the vicinity of the combustion chamber ceiling surface (particularly, in the ignition portion of the ignition plug and its periphery), while securing a migration distance for fuel atomization, and to secure high ignitability of air-fuel mixture.

The structure of a combustion chamber for the engine according to another aspect of the present invention is configured such that, in the above aspect, the cavity is formed in such a way that a bottom portion of the cavity is located at a deep position on a side opposite to the combustion chamber ceiling surface with respect to an inclined top portion of the inclined surface portion on a side of the combustion chamber ceiling surface.

In the structure of a combustion chamber for the engine according to the above aspect, since the bottom portion of the cavity is located at a deep position with respect to the inclined top portion of the inclined surface portion, it is possible to allow an air-fuel mixture of fuel and fresh air to stay within the cavity. Specifically, in the structure of a combustion chamber for the engine according to the above aspect, the bottom portion of the cavity is disposed as described above. Thus, it is possible to suppress that the air-fuel mixture within the combustion chamber may flow in a direction away from the ignition portion by being affected by a flow toward the ignition portion of the ignition plug along the inclined surface portion. Therefore, in the structure of a combustion chamber for the engine according to the above aspect, it is possible to further improve ignitability of air-fuel mixture.

The structure of a combustion chamber for the engine according to another aspect is configured such that, in the above aspect, the cavity is formed into a cup shape projecting in a direction away from the combustion chamber ceiling surface in the cylinder axis direction.

In the structure of a combustion chamber for the engine according to the above aspect, the cavity of a cup shape projecting (downwardly projecting) in a direction away from the combustion chamber ceiling surface, in other words, the cup-shaped cavity in which there is no obstacle that projects upwardly on the bottom surface portion, is employed. Thus, flame propagation after ignition is smoothly performed within the entirety of the combustion chamber.

The structure of a combustion chamber for the engine according to another aspect is configured such that, in the above aspect, the ignition plug includes a ground electrode of an L-shape in a side view, and a center electrode provided to be opposed to a distal end of the ground electrode with a discharge gap. The ignition portion of the ignition plug is constituted by combination of the ground electrode and the center electrode. The ignition plug is disposed in such a way that the discharge gap between the ground electrode and the center electrode is opened toward the inclined surface portion.

In the structure of a combustion chamber for the engine according to the above aspect, the discharge gap of the ignition plug is disposed in such a way as to be opened toward the inclined surface portion. Thus, the squish flow reaches the discharge gap without being blocked, and it is possible to acquire a scavenging effect of residual gas more efficiently. Therefore, in the structure of a combustion chamber for the engine according to the above aspect, it is possible to further enhance ignitability of air-fuel mixture.

The structure of a combustion chamber for the engine according to another aspect is configured such that, in the above aspect, the inclined surface portion is in parallel to a corresponding inclined region on the combustion chamber ceiling surface at a position above the cylinder axis direction with a gap, when the piston is at a compression top dead center. The inclined surface portion and the corresponding inclined region, in combination, constitute a second squish flow generation portion which generates a squish flow when the piston is lifted.

In the structure of a combustion chamber for the engine according to the above aspect, the inclined surface portion of the piston, and the corresponding inclined region of the combustion chamber ceiling surface are in parallel to each other with the gap, and the second squish flow generation portion is constituted by combination of the inclined surface portion and the corresponding inclined region. Therefore, it is possible to more securely expel residual gas in the vicinity of the combustion chamber ceiling surface.

The invention claimed is:
1. A structure of a combustion chamber for a spark ignited engine, comprising:
 a crown surface of a piston;
 a cylinder wall surface along which the piston is slidingly movable;
 a combustion chamber ceiling surface formed on a cylinder head; and
 an ignition plug, which is mounted on the combustion chamber ceiling surface, includes an ignition portion disposed in such a way as to face the combustion chamber, and is configured to ignite at a predetermined timing, when the piston is at a compression top dead center or in the vicinity thereof, wherein a side where an intake opening is opened is defined as an intake port side of the combustion chamber, and a side where an exhaust opening is opened is defined as an exhaust port side of the combustion chamber, with respect to a center portion of the combustion chamber as a reference, in a plan view in a cylinder axis direction, the crown surface of the piston includes:
a cavity which is recessed in a cylinder axis direction in a region including a position below the ignition portion of the ignition plug in a plan view in the cylinder axis direction;
an intake-side flat portion, which is formed on an intake side of an outer peripheral portion surrounding the cavity in a plan view in the cylinder axis direction, and is in parallel to a corresponding region with a gap when the piston is at a compression top dead center, the corresponding region including a portion in the combustion chamber ceiling surface above the intake-side flat portion in the cylinder axis direction; and
an intake-side slope portion, which is formed in a region between the intake-side flat portion and a rim of the cavity in a plan view in the cylinder axis direction, is formed to be continued from the intake-side flat portion, and is formed to be directed to the ignition portion of the ignition plug when the piston is at a compression top dead center, wherein the cavity includes an exhaust-side upright portion and an intake-side upright portion, which are formed on a rim portion of the cavity in the plan view of the crown surface of the piston, and the exhaust-side upright portion and the intake-side upright portion are formed to be raised upward with respect to a bottom surface portion of the cavity, wherein a combination of the intake-side flat portion and the corresponding region constitutes a squish flow generation portion which generates a squish flow when the piston is lifted, and wherein the intake-side upright portion and the exhaust-side upright portion are formed in such a way that a height of the exhaust-side upright portion in the cylinder axis direction is taller than a height of the intake-side upright portion in the cylinder axis direction in a side view in the cylinder axis direction, and a width of the exhaust-side upright portion in an engine output axis direction is narrower than a width of the intake-side upright portion in a plan view in the cylinder axis direction.

2. The structure of a combustion chamber for a spark ignited engine according to claim 1, wherein
the cavity is formed in such a way that a bottom portion of the cavity is located at a deep position on a side opposite to the combustion chamber ceiling surface with respect to an inclined top portion of the intake-side slope portion on a side of the combustion chamber ceiling surface.

3. The structure of a combustion chamber for a spark ignited engine according to claim 1, wherein
the cavity is formed into a cup shape projecting in a direction away from the combustion chamber ceiling surface in the cylinder axis direction.

4. The structure of a combustion chamber for a spark ignited engine according to claim 1, wherein the ignition plug includes a ground electrode of an L-shape in a side view, and a center electrode provided to be opposed to a distal end of the ground electrode with a discharge gap, the ignition portion of the ignition plug is constituted by combination of the ground electrode and the center electrode, and the ignition plug is disposed in such a way that the discharge gap between the ground electrode and the center electrode is opened toward the intake-side slope portion.

5. The structure of a combustion chamber for a spark ignited engine according to claim 1, wherein
the intake-side slope portion is in parallel to a corresponding inclined region on the combustion chamber ceiling surface at a position above the cylinder axis direction with a gap, when the piston is at a compression top dead center, and
the intake-side slope portion and the corresponding inclined region, in combination, constitute a second squish flow generation portion which generates a squish flow when the piston is lifted.

6. A spark ignited engine, comprising:
a crown surface of a piston;
a cylinder wall surface along which the piston is slidingly movable;
a combustion chamber ceiling surface formed on a cylinder head;
an ignition plug, which is mounted on the combustion chamber ceiling surface, includes an ignition portion disposed in such a way as to face the combustion chamber, and is configured to ignite at a predetermined timing, when the piston is at a compression top dead center or in the vicinity thereof;
an injector which is disposed on the combustion chamber ceiling surface and injects fuel into the combustion chamber; and
an intake opening and an exhaust opening opened in the combustion chamber ceiling surface,
wherein the intake opening is constituted by a first intake opening and a second intake opening which are formed to be arranged side-by-side in an engine output axis direction,
wherein the ignition portion of the ignition plug is provided between the first intake opening and the second intake opening,
wherein the crown surface of the piston includes:
a cavity which is recessed in a cylinder axis direction in a region including a position below the ignition portion of the ignition plug in a plan view in the cylinder axis direction, and includes an intake-side upright portion and an exhaust-side upright portion;
an intake-side flat portion, which is formed on a part of an outer peripheral portion surrounding the cavity in a plan view in the cylinder axis direction, and is in parallel to a corresponding region with a gap when the piston is at a compression top dead center, the corresponding region including a portion in the combustion chamber ceiling surface above the intake-side flat portion in the cylinder axis direction; and
an intake-side slope portion, which is formed in a region between the intake-side flat portion and the ignition portion in a plan view in the cylinder axis direction, is formed to be continued from the intake-side flat portion and a rim of the cavity, and is formed to be directed to the ignition portion of the ignition plug when the piston is at a compression top dead center, an area of the intake-side slope portion being smaller than an area of the intake-side flat portion, wherein a side where the intake opening is opened is defined as an intake port side of the combustion chamber, and a side where the exhaust opening is opened is defined as an exhaust port side of the combustion chamber, with respect to a position, as a reference, where the ignition portion of the ignition plug is disposed in a plan view from one side in the cylinder axis direction, wherein a first portion of the intake port side of the combustion chamber ceiling surface is formed in parallel to the intake-side flat portion, wherein a second portion of the intake port side of the combustion chamber ceiling surface is formed in parallel to the intake-side slope portion, wherein a combination of a portion of the exhaust port side of the combustion chamber ceiling surface and the second portion is formed into a pent-roof shape in which a portion where the injector is disposed in a vertex, wherein both ends of the intake-side slope portion in the engine output axis direction interpose the ignition portion in a view in the cylinder axis direction, wherein an entirety of the intake-side slope portion is positioned between the ignition portion and the intake-side flat portion in an intake-exhaust direction, wherein the combustion chamber ceiling surface, and the intake-side flat portion and the intake-side slope portion constitute a squish flow generation portion which generates a squish flow when the piston is lifted, wherein opposing ends of the intake-side slope portion in the engine output axis direction are respectively connected to corresponding opposing exterior sides of the intake-side slope portion in the engine output axis direction via stepped portions in such a way that the intake-side slope portion is closer to the combustion chamber ceiling surface, as compared with the opposing exterior sides of the intake-side slope portion in the engine output axis direction, and wherein the exhaust-side upright portion and the intake-side upright portion are formed to be raised upward with respect to the bottom surface portion of the cavity, the exhaust-side upright portion is formed in such a way that a height of the exhaust-side upright portion is taller than a height of the intake-side upright portion in the cylinder axis direction and a width of the exhaust-side upright portion in the engine output axis direction is narrower than a width of the intake-side upright portion in a plan view in the cylinder axis direction.

7. The structure of a combustion chamber for a spark ignited engine according to claim 1, wherein
an area of the intake-side flat portion is larger than an area of the exhaust-side flat portion formed on the outer peripheral portion on the exhaust side with respect to the cavity.

8. The structure of a combustion chamber for a spark ignited engine according to claim 4, wherein
the ignition plug includes an ignition plug body provided with the ignition portion on a distal end the ignition plug body, and
the intake-side slope portion is formed to be directed to a region between the ignition plug body and the center electrode of the ignition portion when the piston is at the compression top dead center.

9. The structure of a combustion chamber for a spark ignited engine according to claim 1, wherein
the engine includes a gasoline engine, and further includes an injector provided on the combustion chamber ceiling surface, and
when an ignition by the ignition plug is performed at the predetermined timing, the injector starts a fuel injection at a timing in a middle stage of an intake stroke, and finishes at a timing in a first half of a compression stroke in such a way that SI combustion of air-fuel mixture is performed in a middle portion of the combustion chamber and CI combustion of air-fuel mixture is performed in the outer peripheral portion of the combustion chamber, to thereby form an air-fuel mixture for the CI combustion in the outer peripheral portion of the combustion chamber, and an air-fuel mixture for the SI combustion in the middle portion of the combustion chamber.

10. The structure of a combustion chamber for a spark ignited engine according to claim 4, further comprising:
an injector provided on the combustion chamber ceiling surface; wherein
the ignition portion of the ignition plug is provided between the injector and the intake-side flat portion in a plan view in the cylinder axis direction, and
the ignition plug is disposed in such a way that the distal end of the ground electrode of an L-shape faces a side opposite to the injector.

* * * * *